United States Patent
Uchiyama et al.

(10) Patent No.: US 10,652,805 B2
(45) Date of Patent: May 12, 2020

(54) INFORMATION PROCESSING DEVICE, INFORMATION PROCESSING METHOD, AND A PROGRAM FOR INFORMATION PROCESSING FOR PERFORMING MEASUREMENT OF FIRST AND SECOND FREQUENCY BANDS BASED ON FIRST AND SECOND DISCOVERY REFERENCE SIGNALS WITHIN FIRST AND SECOND PERIODS RESPECTIVELY

(71) Applicant: SONY CORPORATION, Tokyo (JP)

(72) Inventors: Hiromasa Uchiyama, Tokyo (JP); Hiroaki Takano, Saitama (JP); Sho Furuichi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/233,149

(22) Filed: Dec. 27, 2018

(65) Prior Publication Data
US 2019/0132789 A1 May 2, 2019

Related U.S. Application Data

(63) Continuation of application No. 16/019,272, filed on Jun. 26, 2018, now Pat. No. 10,200,942, which is a (Continued)

(30) Foreign Application Priority Data

May 9, 2014 (JP) .................................. 2014-097822

(51) Int. Cl.
*H04W 48/16* (2009.01)
*H04W 24/10* (2009.01)
(Continued)

(52) U.S. Cl.
CPC .......... *H04W 48/16* (2013.01); *H04L 5/0048* (2013.01); *H04W 24/10* (2013.01);
(Continued)

(58) Field of Classification Search
CPC . H04W 24/10; H04W 48/16; H04W 72/0453; H04W 76/048; H04W 88/02;
(Continued)

(56) References Cited

U.S. PATENT DOCUMENTS

| | | |
|---|---|---|
| 2009/0312023 A1 | 12/2009 | Kazmi |
| 2012/0287911 A1 | 11/2012 | Takano et al. |

(Continued)

FOREIGN PATENT DOCUMENTS

| | | | |
|---|---|---|---|
| JP | 2010-514342 A | 4/2010 |
| JP | 2013-219507 A | 10/2013 |

(Continued)

OTHER PUBLICATIONS

International Search Report dated Jun. 9, 2015, in PCT/JP2015/054271 filed Feb. 17, 2015.

(Continued)

*Primary Examiner* — Allahyar Kasraian
(74) *Attorney, Agent, or Firm* — Xsensus LLP

(57) ABSTRACT

A device including a measurement unit configured to perform measurement of each of one or more frequency bands that are a part of a plurality of frequency bands that are not used by a terminal device. The measurement wait does not perform measurement of each of the remaining frequency bands among the plurality of frequency bands or performs measurement of each of the remaining frequency bands at a frequency lower than a frequency of the measurements of each of the one or more frequency bands, which makes it possible to improve measurement performed by a terminal device.

10 Claims, 46 Drawing Sheets

Related U.S. Application Data continuation of application No. 15/307,561, filed as application No. PCT/JP2015/054271 on Feb. 17, 2015, now abandoned.

(51) Int. Cl.
*H04W 72/04* (2009.01)
*H04L 5/00* (2006.01)
*H04W 52/02* (2009.01)
*H04W 88/02* (2009.01)

(52) U.S. Cl.
CPC ....... *H04W 52/0209* (2013.01); *H04W 72/04* (2013.01); *H04W 72/0453* (2013.01); *H04W 88/02* (2013.01); *Y02D 70/00* (2018.01); *Y02D 70/1222* (2018.01); *Y02D 70/1262* (2018.01); *Y02D 70/1264* (2018.01); *Y02D 70/142* (2018.01); *Y02D 70/164* (2018.01); *Y02D 70/166* (2018.01); *Y02D 70/21* (2018.01)

(58) Field of Classification Search
CPC . H04W 8/005; H04W 72/0446; H04W 72/04; H04W 52/0209; H04W 72/0406; H04L 5/0048; H04L 5/005; H04L 5/0005; H04L 5/0053

USPC ................. 370/329, 330; 455/434, 450–455, 455/509–516

See application file for complete search history.

(56) References Cited

U.S. PATENT DOCUMENTS

| | | |
|---|---|---|
| 2013/0322279 A1 | 12/2013 | Chincholi et al. |
| 2014/0112180 A1 | 4/2014 | Axmon et al. |
| 2015/0050889 A1 | 2/2015 | Axmon et al. |
| 2015/0373598 A1 | 12/2015 | Tsuboi et al. |
| 2017/0013674 A1 | 1/2017 | Soldati |
| 2017/0223667 A1 | 8/2017 | Yi et al. |

FOREIGN PATENT DOCUMENTS

| | | |
|---|---|---|
| JP | 2014-053971 A | 3/2014 |
| WO | 2008/076063 A1 | 6/2008 |
| WO | 2014/003432 A1 | 1/2014 |

OTHER PUBLICATIONS

Extended Search Report issued in European Application 19171347.8-1219 dated May 28, 2019.
Alcatel-Lucent, "Further Discussion on Relaxed Performance Requirement for HetNet", 3GPP TSG-RAN WG4 Meeting #70, R140643, 4 Pages total, (Feb. 10-14, 2014).

FIG. 5

| SFN | | SUBFRAME | | | | | | | | | |
|---|---|---|---|---|---|---|---|---|---|---|---|
| | | 0 | 1 | 2 | 3 | 4 | 5 | 6 | 7 | 8 | 9 |
| 0 | GAP | G | G | G | G | G | G | | | | |
| 1 | | | | | | | | | | | |
| 2 | | | | | | | | | | | |
| 3 | | | | | | | | | | | |
| 4 | GAP | G | G | G | G | G | G | | | | |
| 5 | | | | | | | | | | | |
| 6 | | | | | | | | | | | |
| 7 | | | | | | | | | | | |
| 8 | GAP | G | G | G | G | G | G | | | | |
| 9 | | | | | | | | | | | |

INFORMATION PROCESSING DEVICE, INFORMATION PROCESSING METHOD, AND A PROGRAM FOR INFORMATION PROCESSING FOR PERFORMING MEASUREMENT OF FIRST AND SECOND FREQUENCY BANDS BASED ON FIRST AND SECOND DISCOVERY REFERENCE SIGNALS WITHIN FIRST AND SECOND PERIODS RESPECTIVELY

CROSS-REFERENCE TO RELATED APPLICATIONS

This application is a continuation application of, and claims the benefit of priority under 35 U.S.C. § 120 from, U.S. application Ser. No. 16/019,272, filed Jun. 26, 2018, which is a continuation of U.S. application Ser. No. 15/307,561, filed Oct. 28, 2016, herein incorporated by reference, which is a National Stage Application of International Application No. PCT/JP2015/054271, filed Feb. 17, 2015. The present document also incorporates by reference the entire contents of Japanese priority document, 2014-097822, filed in Japan on May 9, 2014.

TECHNICAL FIELD

The present disclosure relates to a device.

BACKGROUND ART

In cellular systems according to communication standards such as Long Term Evolution (LTE), a terminal device performs measurement based on a reference signal for cell selection/cell reselection and a handover. For example, measurement of a frequency band that the terminal device does not use is referred to as inter-frequency measurement and is performed in a measurement gap.

Various technologies for measurement performed by a terminal device are proposed. For example, Patent Literature 1 discloses a technology in which a measurement gap is assigned to more component carriers as channel quality decreases.

CITATION LIST

Patent Literature

Patent Literature 1 JP 2014-53971A

SUMMARY OF INVENTION

Technical Problem

However, when more frequency bands (for example, component carriers) are assigned to a system, for example, more measurements are necessary. For example, more inter-frequency measurements are necessary. In this case, for example, a terminal device performs inter-frequency measurement at a higher frequency. As a result, power consumption of the terminal device increases and system throughput may decrease or inter-frequency measurement may consume much time.

Therefore, it is preferable to provide a mechanism through which measurement performed by a terminal device can be improved.

Solution to Problem

According to the present disclosure, there is provided a device including; a measurement unit configured to perform measurement of each of one or more frequency bands that are a part of a plurality of frequency bands that are not used by a terminal device. The measurement unit does not perform measurement of each of remaining frequency bands among the plurality of frequency bands or performs the measurement of each of the remaining frequency bands at a frequency lower than a frequency of the measurements of each of the one or more frequency bands.

According to the present disclosure, there is provided a device including: an acquiring unit configured to acquire information about a plurality of frequency bands that are not used by a terminal device; and a control unit configured to instruct the terminal device to perform measurement of each of one or more frequency bands that are a part of the plurality of frequency bands, and not to perform measurement of each of remaining frequency bands among the plurality of frequency bands or to perform the measurement of each of the remaining frequency bands at a frequency lower than a frequency of the measurements of each of the one or more frequency bands.

According to the present disclosure, there is provided a device including; a measurement unit configured to perform measurement of a first frequency band based on a discovery reference signal transmitted in the first frequency band within a first period included in a measurement gap and perform measurement of a second frequency band based on a reference signal transmitted in the second frequency band within a second period included in the measurement gap.

According to the present disclosure, there is provided a device including: an acquiring unit configured to acquire information indicating a first frequency band in which a discovery reference signal is transmitted within at least a first period included in a measurement gap; and a control unit configured to notify a terminal device of the first frequency band and the measurement gap.

According to the present disclosure, there is provided a device including: an acquiring unit configured to acquire information about a first frequency band in which a discovery reference signal is transmitted; and a control unit configured to decide an extended measurement gap including at least a part of a transmission period in which a discovery reference signal is transmitted in the first frequency band.

According to the present disclosure, there is provided a device including: an acquiring unit configured to acquire information about two or more frequency bands in which a discovery reference signal is transmitted; and a control unit configured to decide a frequency group including at least a first frequency band and a second frequency band among the two or more frequency bands. The first frequency band is a frequency band in which a discovery reference signal is transmitted within at least a first period included in a measurement gap, and the second frequency band is a frequency band in which a discovery reference signal is transmitted within at least a second period included in the measurement gap.

According to the present disclosure, there is provided a device including: a measurement unit configured to perform first measurement of each of a plurality of frequency bands and perform second measurement of each of one or more frequency bands that are a part of the plurality of frequency bands. The first measurement is measurement that is performed based on a reference signal transmitted within a period having a first length, and the second measurement is measurement that is performed based on a reference signal transmitted within a period having a second length that is greater than the first length.

Advantageous Effects of Invention

As described above, according to the present disclosure, it is possible to improve measurement performed by a terminal device. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is an explanatory diagram for describing an example of a measurement gap.

DESCRIPTION OF EMBODIMENT(S)

Figure 1:
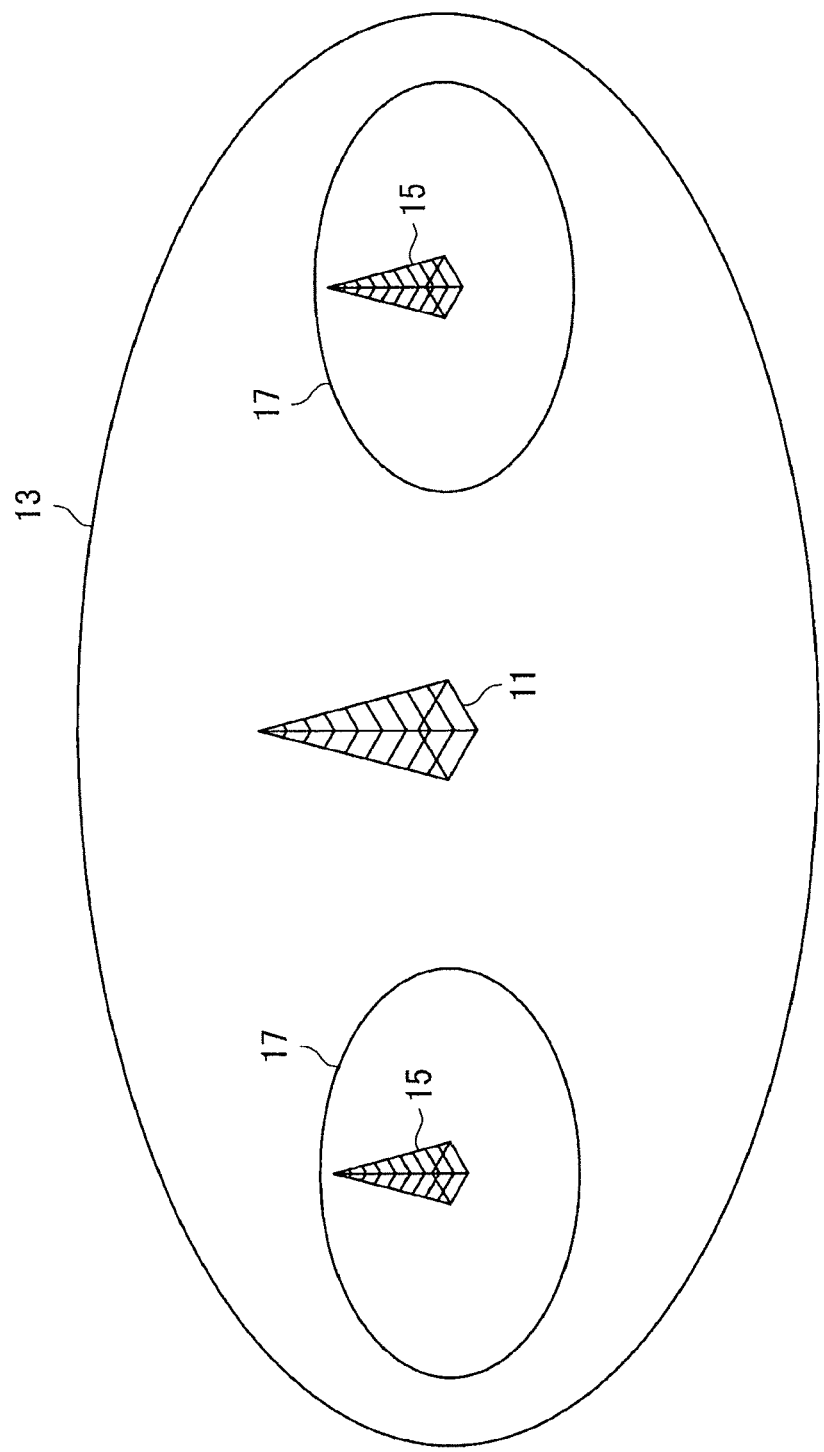
FIG. 1 is an explanatory diagram for describing an example of a small cell.

Hereinafter, (a) preferred embodiments) of the present disclosure will be described in detail with reference to the appended drawings. In this specification and the drawings, elements that have substantially the same function and structure are denoted with the same reference signs, and repeated explanation is omitted.

In this specification and the drawings, there are cases in which components having substantially the same functional configuration are distinguished by adding different alphabets to the end of the same reference numeral. For example, a plurality of components having substantially the same functional configuration are distinguished like small base stations 15A, 15B, and 15C as necessary. However, when a plurality of components having substantially the same functional configuration need not be particularly distinguished, only the same reference numeral is added. For example, when the small base stations 15A, 15B, and 15C need not be particularly distinguished, they are referred to simply as a "small base stations 15."

The description, will proceed in the following order.
1. Introduction
1.1. Related technology
1.2. Problems related to measurement
2. Schematic configuration of communication system
3. First embodiment
3.1. Configuration of terminal device
3.2. Configuration of base station
3.3. Process flow
3.4. Modification example
4. Second embodiment
4.1. Configuration of terminal device
4.2. Configuration of base station
4.3. Configuration of control entity
4.4. Process flow
4.5. First modification example
4.6. Second modification example
5. Third embodiment
5.1. Configuration of terminal device
5.2. Configuration of base station
5.3. Configuration of control entity
5.4. Process flow
5.5. First modification example
5.6. Second modification example
6. Third embodiment
6.1. Configuration of terminal device
6.2. Process flow
7. Application examples
7.1. Application examples for control entity
7.2. Application examples for base station
7.3. Application examples for terminal device
8. Conclusion 1. Introduction First, a technology related to an embodiment of the present disclosure and problems related to an embodiment of the present disclosure will be described with reference to FIG. 1 to FIG. 10.

1.1. Related Technology

A technology related to an embodiment of the present disclosure will be described with reference to FIG. 1 to FIG. 8. Specifically, a small cell, a measurement and carrier aggregation will be described.
(Small Cell)
(a) Small Cell A small cell is a cell smaller than a macro cell. For example, the small cell partially or entirely overlaps the macro cell. Hereinafter, an example of the small cell will be described with reference to FIG. 1.

FIG. 1 is an explanatory diagram for describing an example of a small cell. Referring to FIG. 1, a macro base station 11, a macro cell 13, a small base station 15 and a small cell 17 are shown. The macro base station 11 is a base station of the macro cell 13. The small, base station 15 is a base station of the small cell 17. In other words, the macro cell 13 is a coverage area of the macro base station 11 (that is, a communication area), and the small cell 17 is a coverage area of the small base station 15 (that is, a communication area).

A base station of LTE is referred to as an evolved node B (eNB). Here, a macro base station of LTE is referred to as a macro eNB, and a small base station of LTE is referred to as a small eNB. In addition, a terminal device of LTE is referred to as user equipment (UE).
(b) Small Cell Cluster Small cells arranged at a high density form a small cell cluster. Hereinafter, an example of the small cell cluster will be described with reference to FIG. 2.

Figure 2:
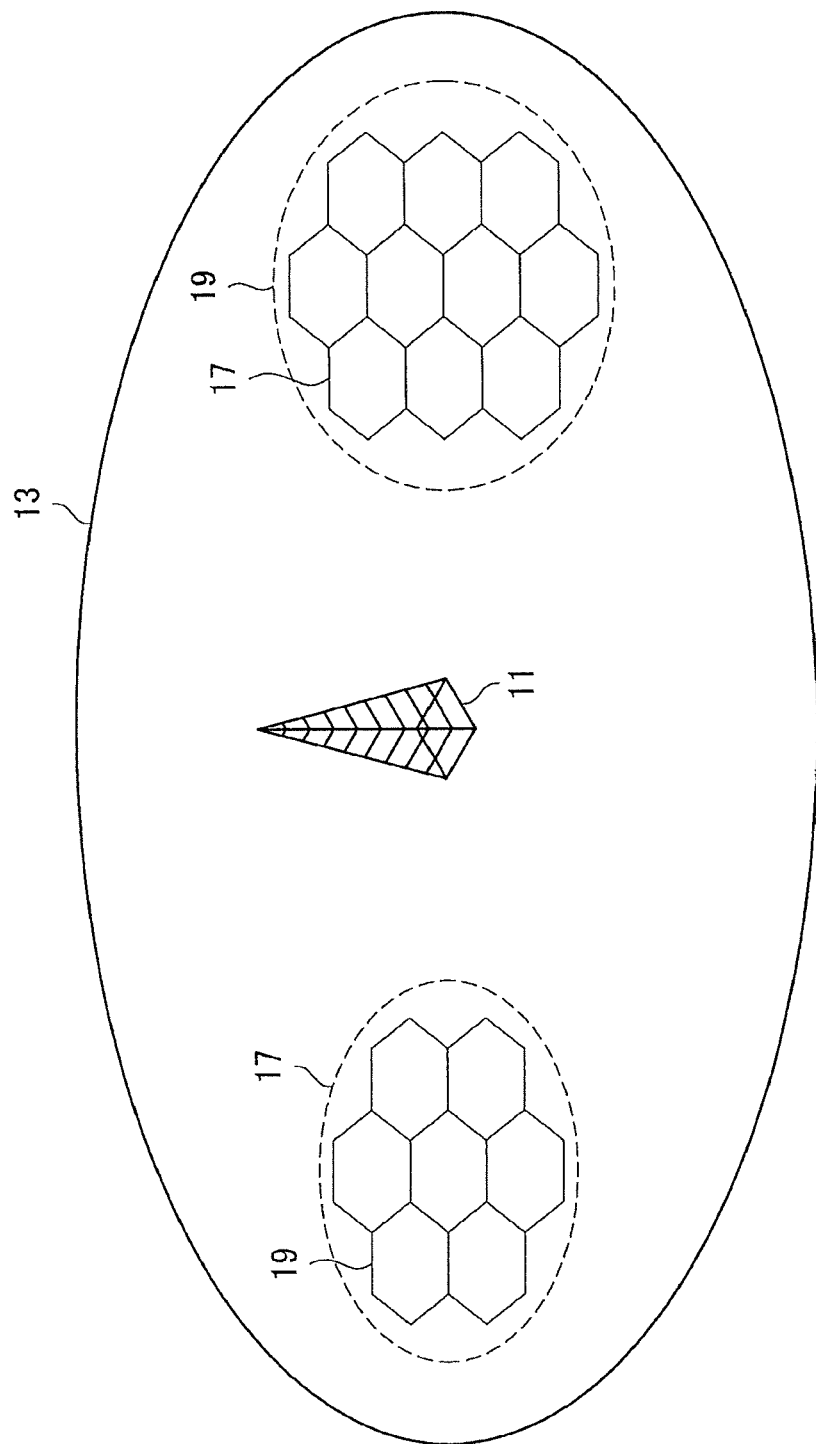
FIG. 2 is an explanatory diagram for describing an example of a small cell cluster.

FIG. 2 is an explanatory diagram for describing an example of a small cell cluster. Referring to FIG. 2, the macro base station 11, the macro cell 13 and the small cell 17 are shown. For example, small cells 17 arranged at a high density form a small cell cluster 19.
(c) Small Cell On/Off In a case in which small cells are arranged at a high density, inter-cell interference causes a serious problem. In general, the small base station transmits a cell-specific reference signal (CRS) regardless of the presence or absence of traffic of the small cell. In the case in which small cells are arranged at a high density, it is known that a CRS causes large interference in a neighbor cell. Therefore, various technologies for reducing interference are being studied.

As a technology for reducing such inter-cell interference, a small cell on/off technology has currently been focused on. In the small cell on/off technology, an on/off state of a small cell is adaptively switched, and thus it is possible to suppress interference in a surrounding cell of the small cell. While a trigger for switching an on/off state of the small cell has not yet been specifically decided, a trigger for switching based on, for example, a traffic amount, association of a terminal device, or arrival of a packet is being studied. Hereinafter, an example of a small cell on/off procedure will foe described with reference to FIG. 3.

Figure 3:
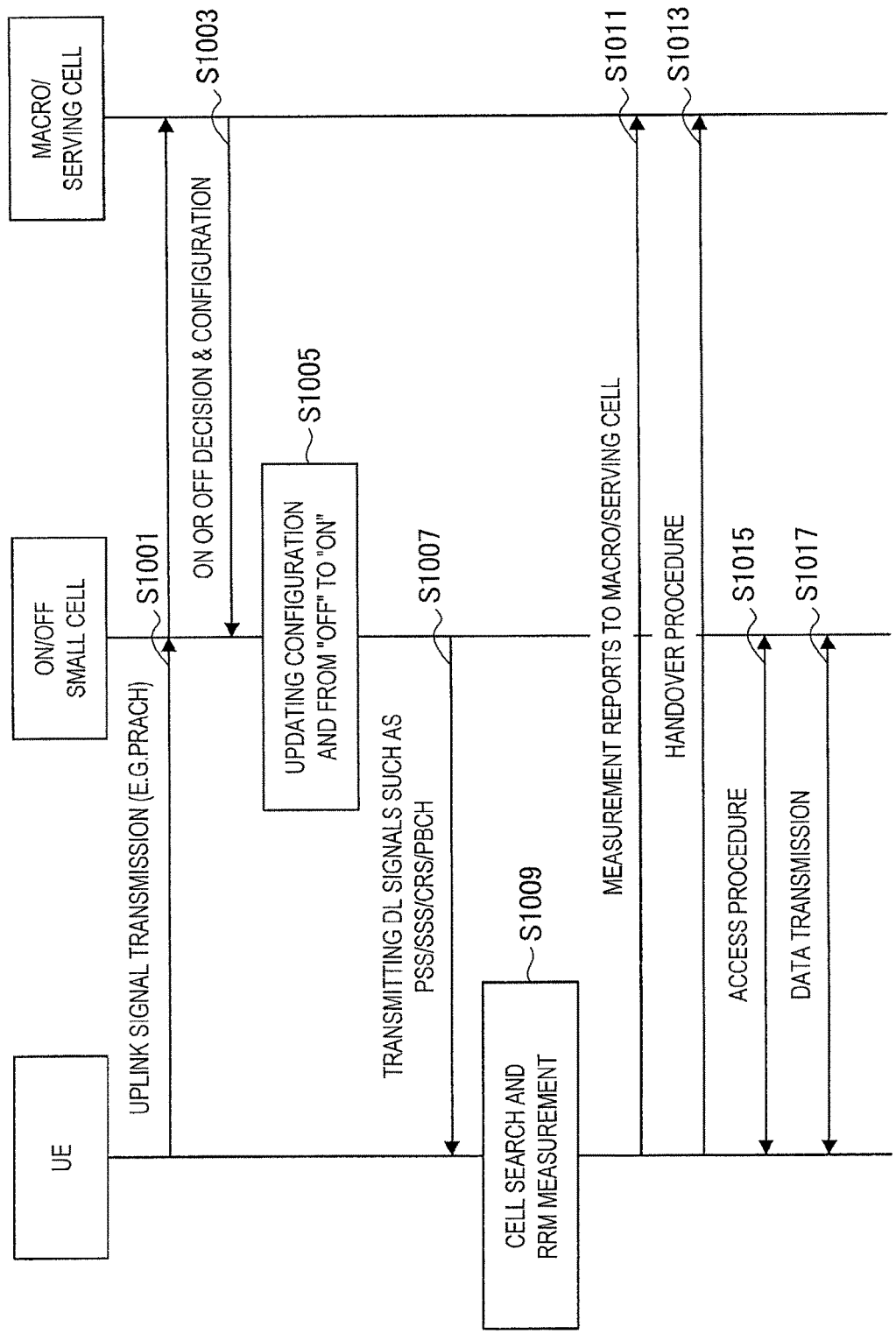
FIG. 3 is a sequence diagram illustrating an example of a schematic flow of an on/off process of a small cell.

FIG. 3 is a sequence diagram illustrating an example of a schematic flow of a small cell on/off process. The small cell on/off process is a process that is disclosed in R1-134318 of the Third Generation Partnership Project (3GPP). When data to be transmitted is generated, the UE transmits an uplink signal to a macro eNB of a macro cell that is a serving cell (S1001). Then, the macro eNB searches for a small eNB in an off state that is positioned around the UE, and instructs the appropriate small eNB to switch to an on state when there is an appropriate small eNB (S1003). Then, the small eNB performs switching from the off state to the on state (S1005). Then, the small eNB transmits downlink signals such as a primary synchronization signal (PSS), a secondary synchronization signal (SSS), a cell-specific reference signal (CRS) and a physical broadcast channel (PBCH) signal (S1007). In addition, the UE performs a cell search and RRM measurement (S1009), and performs measurement reporting to the macro eNB (S1011). Then, a handover of the UE from the macro cell to the small cell is performed (S1013). Then, the UE and the small eNB perform an access procedure (S1015) and perform data transmission (S1017).

According to the procedure shown in FIG. 3, it is possible to switch an on/off state of a small cell. However, according to the procedure, a transition time may become relatively longer. That is, according to the procedure, a time from when a terminal device attempts to transmit data until the terminal device actually transmits the data may become relatively longer. Therefore, large improvement of throughput is difficult. In order to improve the transition time, while the small cell is in the off state, a measurement process that serves as a main delay factor is preferably performed by the terminal device.

(d) Discovery Reference Signal

Introduction of a discovery reference signal (DRS) is being studied in order to reduce the transition time. The DRS enables measurement of a small cell in the off state. The DRS is also referred to as a discovery signal (DS). A small base station (for example, a small eNB) transmits a DRS while a small cell (or a small base station) is in the off state, and a terminal device (for example, UE) performs measurement based on a DRS. Hereinafter, an example of a small cell on/off procedure when a DRS is used will be described with reference to FIG. 4.

Figure 4:
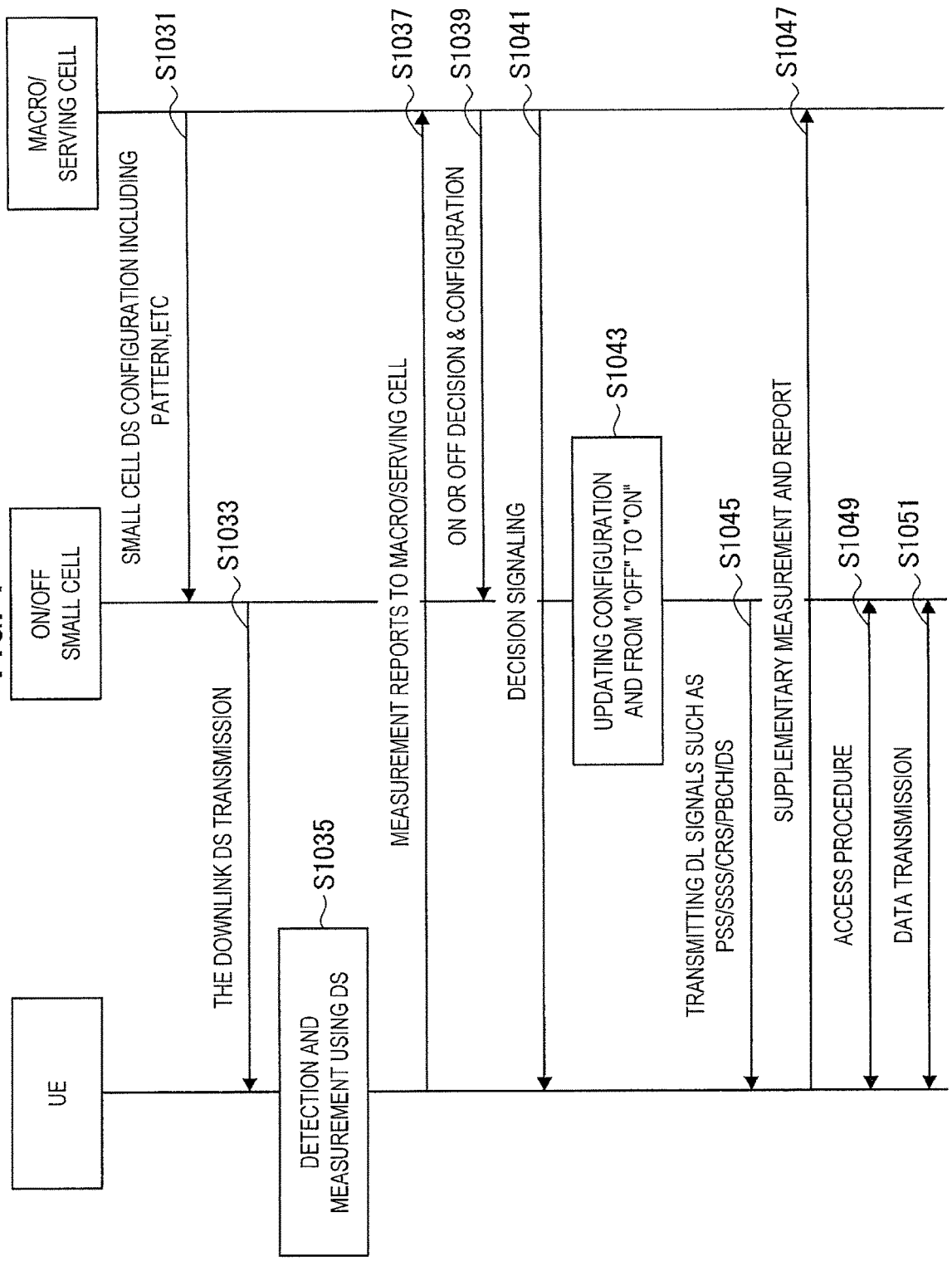
FIG. 4 is a sequence diagram illustrating an example of a schematic flow of an on/off process of a small cell when a DRS is used.

FIG. 4 is a sequence diagram illustrating an example of a schematic flow of a small cell on/off process when a DRS is used. The small cell on/off process is a process that is disclosed in R1-134318 of the 3GPP. A macro eNB instructs a small eNB to transmit a DS (S1031), and the small eNB transmits the DS in downlink (S1033). The UE performs measurement based on the DS (S1035) and reports a result of the measurement to the macro eNB (that is an eNB of a macro cell that is a serving cell) (S1037). The UE and the small eNB perform data transmission through subsequent procedures (S1041 to S1049) (S1051).

According to the procedure shown in FIG. 4, while the small cell is in the off state, the terminal device can perform measurement. Therefore, the transition time is removed and throughput may be improved.

As various technologies for reducing interference, enhancement on a transmission side and a reception side such as muting, multiple instance and interference cancellation is also being studied.

(Measurement)

(a) CRS Measurement

In LTE, a terminal device performs measurement based on a CRS transmitted by a base station. Specifically, the terminal device receives a CRS transmitted by a base station and thus performs measurement of quality of a propagation path between the base station and the terminal device. The measurement is referred to as "radio resource management (RRM) measurement," or is simply referred to as "measurement."

A result of the measurement is used to select a cell for a terminal device. As a specific example, the result of the measurement is used for cell selection/cell reselection by a terminal device that is in a radio resource control (RRC) idle (RRC Idle) state. In addition, for example, the result of the measurement is reported to a base station by a terminal device that is in an RRC connected state and is used for a handover decision by the base station.

(b) RSRP and RSRQ

In LTE, CRS measurement is measurement of reference signal received power (RSRP) and/or reference signal received quality (RSRQ). In other words, a terminal device acquires RSRP and/or RSRQ as a result of the measurement of the CRS. The RSRQ is calculated from the RSRP and a received signal strength indicator (RSSI).

The RSRP is reception power of a CRS for each single resource element. That is, the RSRP is an average value of reception power of the CRS. The reception power of the CRS is obtained by detecting a correlation between a reception signal in a resource element of the CRS and a known signal CRS. The RSRP corresponds to a desired signal "Signal (S)."

The RSSI is total power of signals for each Orthogonal Frequency Division Multiple Access (OFDMA) symbol. Therefore, the RSSI includes a desired signal, an interference signal and noise. That is, the RSSI corresponds to "Signal (S)+Interference (I)+Noise (N)."

The RSRQ is RSRP/(RSRI/N). N denotes the number of resource blocks used for calculating an RSSI. The resource blocks are resource blocks that are arranged in a frequency direction. Therefore, the RSRQ is a value that is obtained by dividing the RSRP using the RSRI for each resource block. That is, the RSRQ corresponds to a signal-to-interference-plus-noise ratio (SINR).

As described above, according to the measurement of the CRS, reception power (that is, RSRP) and reception quality (that is, RSRQ) such as an SINR are obtained.

(c) Measurement Timing

Measurement of a frequency band that a terminal device uses is referred to as intra-frequency measurement. Conversely, measurement of a frequency band that a terminal device does not use is referred to as inter-frequency measurement.

The terminal device can receive a CRS transmitted in a frequency band that is used without switching a frequency of a radio frequency (RF) circuit. That is, it is unnecessary to switch a frequency of the RF circuit for intra-frequency measurement.

Conversely, in order for the terminal device to receive a CRS transmitted in a frequency band that is not used, it is necessary to switch a frequency of a radio frequency (RF) circuit. That is, it is necessary to switch a frequency of the RF circuit for inter-frequency measurement. Therefore, a period called a measurement gap is used for inter-frequency measurement.

During the measurement gap, the base station does not transmit a downlink signal addressed to a terminal device. In addition, the measurement gap is shared between the base station and the terminal device. For example, the base station transmits a message (for example, an RRC connection reconfiguration message) including information indicating a measurement gap to the terminal device. For example, the measurement gap is indicated by a measurement gap length (MGL), a measurement gap repetition period (MGRP) and a gap offset. In addition, a combination of the MGL and the MGRP is determined as, for example, a gap pattern. Hereinafter, an example of the measurement gap will be described with reference to FIG. 5.

FIG. 5 is an explanatory diagram for describing an example of a measurement gap. FIG. 5 shows a matrix including columns of radio frames whose SFNs are 0 to 9 and rows of 10 subframes (subframes whose subframe numbers are 0 to 9) included in radio frames. In this example, the MGL is 6 milliseconds (ms), the MGRP is 40 ms, and the gap offset is 0. Therefore, the measurement gap has a length of 6 ms and appears every 40 ms. More specifically, for example, six subframes whose subframe numbers are 0 to 5 among radio frames whose SFNs are 0, 4 and 8 are the measurement gap. Inter-frequency measurement is performed during the measurement gap.

(d) Measurement Reporting

The terminal device reports a measurement result to the base station. The reporting is referred to as measurement reporting.

The measurement reporting is periodic reporting or event-triggered reporting. The periodic reporting is reporting that is performed at set periods. Conversely, the event-triggered reporting is reporting that is performed when a reporting event is generated. Reporting events A1 to A5 are events associated with a handover within a system, and reporting events B1 to B2 are events associated with a handover between systems.

TABLE 1

| Event Type | Description |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

(Carrier Aggregation)

Carrier aggregation (CA) is a technology through which communication is performed using a plurality of component carriers (CCs) at the same time. The component carrier is a frequency band having a maximum of a 20 MHz bandwidth. The carrier aggregation includes three scenarios. Hereinafter, three scenarios of the carrier aggregation will be described with reference to FIG. 6 to FIG. 8.

Figure 6:
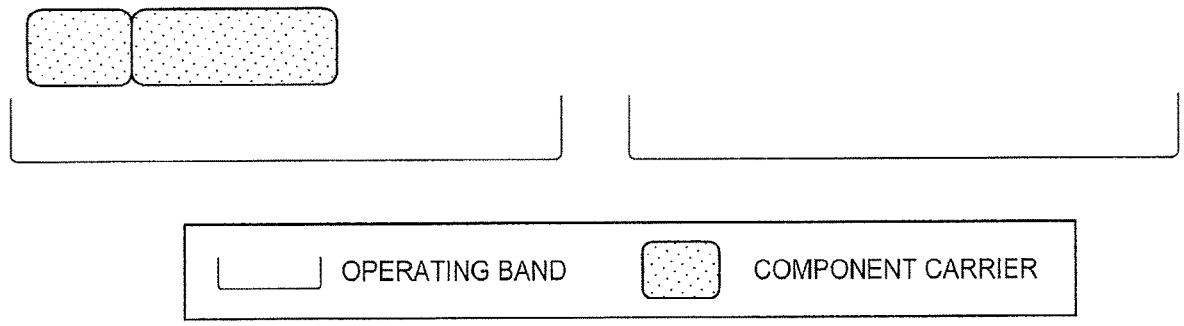
FIG. 6 is an explanatory diagram for describing a first scenario of carrier aggregation (CA).
Figure 7:
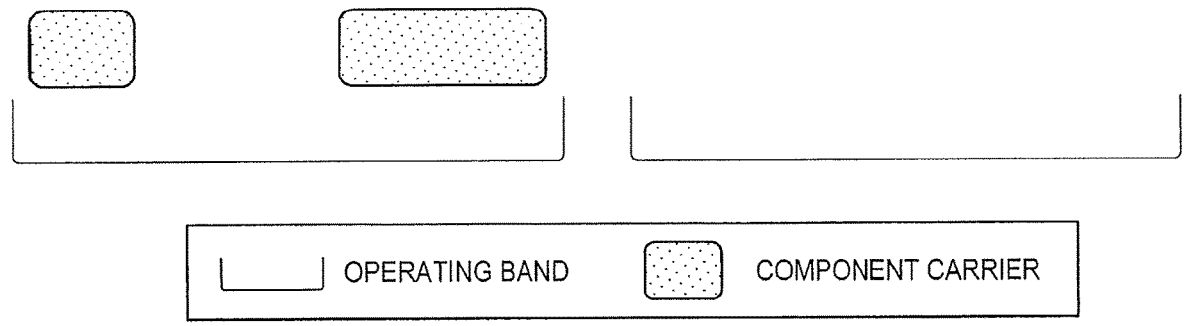
FIG. 7 is an explanatory diagram for describing a second scenario of carrier aggregation (CA).
Figure 8:
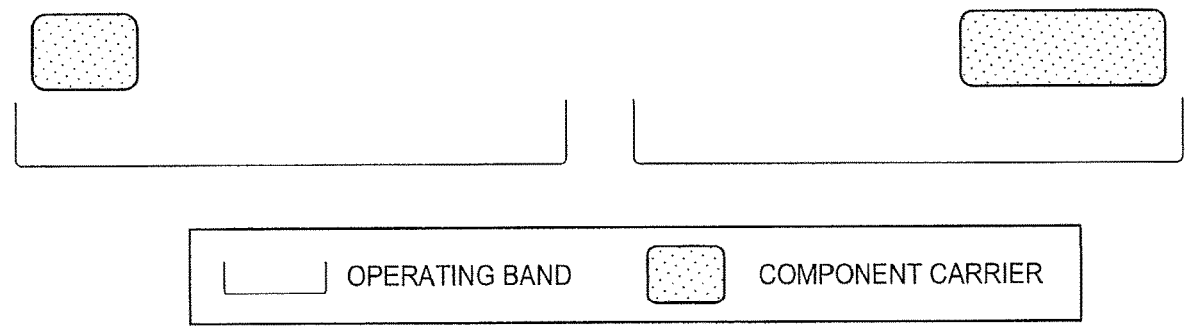
FIG. 8 is an explanatory diagram for describing a third scenario of carrier aggregation (CA).

FIG. 6 to FIG. 8 are explanatory diagrams for describing first to third scenarios of carrier aggregation (CA). As illustrated in FIG. 6, in the first scenario (intra-band contiguous) of CA, the terminal device uses CCs adjacent in the same operating. As illustrated in FIG. 7, in the second scenario (intra-band non-contiguous) of CA, the terminal device uses CCs that are not adjacent in the same operating. As illustrated in FIG. 8, in the third scenario (inter-band non-contiguous) of CA, the terminal device uses CCs that are not adjacent in different operating.

1.2. Problems Related to Measurement (Problem caused when Plurality of Frequency Bands are Used)

When more frequency bands (for example, component carriers) are assigned to a system, for example, more measurements are necessary. For example, more inter-frequency measurements are necessary. In this case, for example, the terminal device performs inter-frequency measurement at a higher frequency. As a result, power consumption of the terminal device increases and system throughput may decrease or inter-frequency measurement may consume much time.

Accordingly, in the embodiment of the present disclosure, for example, it is possible to improve measurement performed by the terminal device.

(Problem caused in Small Cell On/Off Environment)

In addition, in current standards of 3GPP, inter-frequency measurements are performed at periods of 40 ms or 80 ms. That is, the inter-frequency measurement is frequently performed. Conversely, in the current RAN2/RAN4, improvement of inter-frequency measurement is being studied. For example, when a measurement period increases, a measurement frequency decreases. As a result, throughput and power consumption may be improved. The measurement is referred to as relax measurement. However, when relax measurement is introduced into an environment in which an on/off state of a small cell is switched (hereinafter referred to as a "small cell on/off environment"), for example, a discovery of a small cell in the off state is delayed. This is because a base station of a small cell (that is, a small base station) in the off state periodically transmits a DRS.

Measurement in Current Cellular System

In a current cellular system, a terminal device generally performs measurement based on a CRS transmitted in each subframe. For example, the terminal device can perform intra-frequency measurement based on a CRS transmitted in any subframe. In addition, for example, the terminal device can perform inter-frequency measurement based on a CRS transmitted in a measurement gap.

Measurement in Small Cell On/Off Environment

As described above, transmission of a DRS in a small cell on/off environment is being studied. A case in which a DRS is transmitted for a relatively long period (for example, a period of several tens to several hundreds of ms) in a small cell in the off state is assumed. In addition, a case in which a DRS is transmitted not only in a small cell in the off state but also in a small cell in the on state is being studied. That is, in the small cell on/off environment, only a DRS is transmitted in the small cell in the off state and, conversely, a CRS and a DRS or only a CRS is transmitted in the small cell in the on state.

The above-described measurements are summarized as follows.

TABLE 2

| Scenario | Reference Signal | Transmission Period | Measurement Period |
|---|---|---|---|
| Existing | CRS | Always | 40 ms or 80 ms |
| Small cell On/Off | (on)DRS + CRS or CRS only (off)DRS | CRS: Always DRS: per dozens/hundreds of millisecond | not yet determined |

Specific Example

Hereinafter, an example of measurement in a small cell on/off environment will be described with reference to FIG. 9 and FIG. 10.

Figure 9:
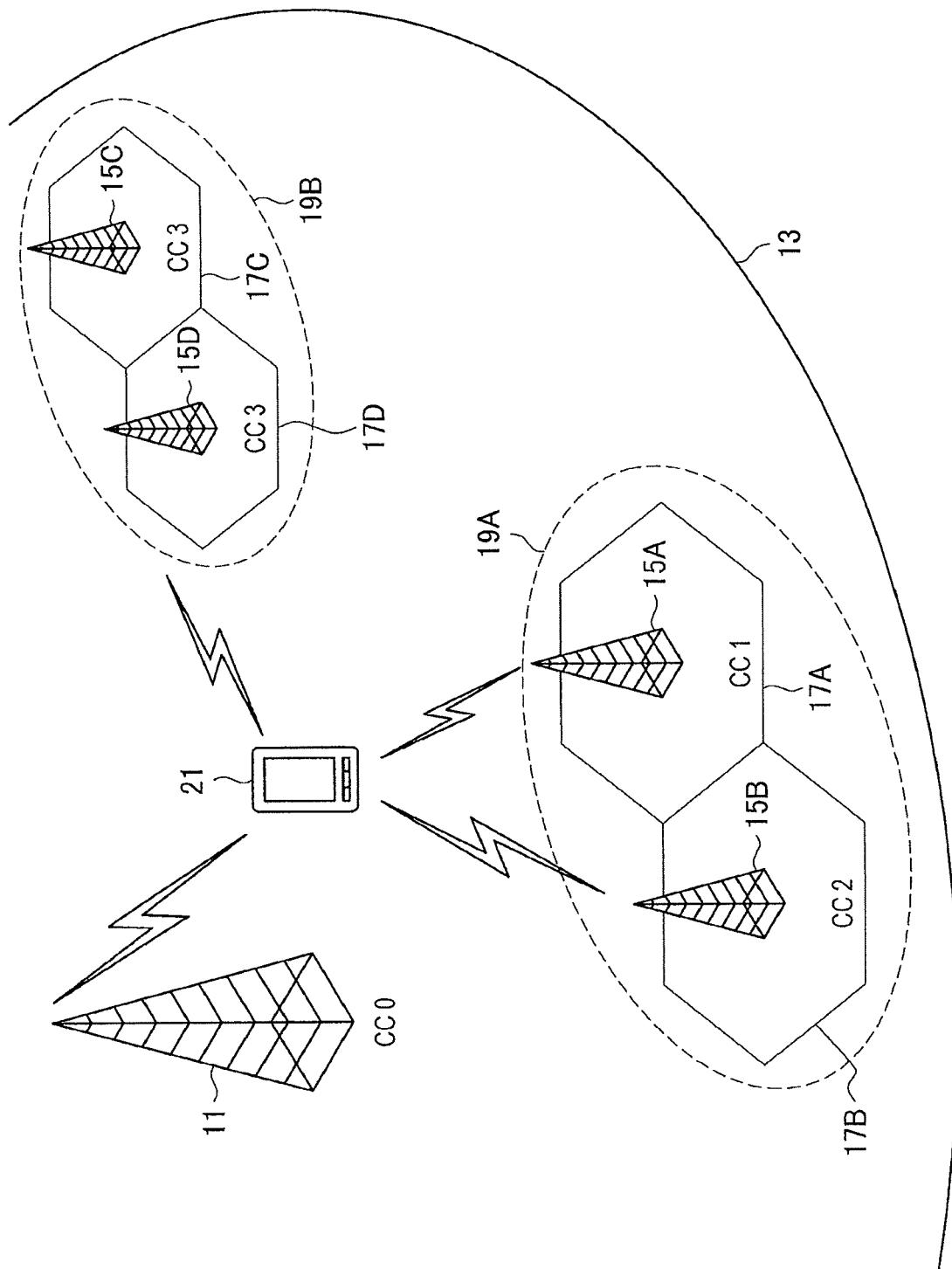
FIG. 9 is a first explanatory diagram for describing an example of measurement in a small cell on/off environment.

FIG. 9 is a first explanatory diagram for describing an example of measurement in a small cell on/off environment. Referring to FIG. 9, the macro base station 11, the macro cell 13, the small base station 15, the small cell 17 and a terminal device 21 are shown. A small cell 17A and a small cell 17B are included in a small cell cluster 19A. A small cell 17C and a small cell 17D are included in a small cell cluster 19B. The terminal device 21 is connected to the macro base station 11.

In the macro cell 13, a CC0 is used by the macro base station 11. Therefore, a CRS is transmitted by the macro base station 11 in the CC0.

The small cell 17A is in the on state. A CC1 is used by the small base station 15A in the small cell 17A. Therefore, in the CC1, a CRS is transmitted by the small base station 15A.

The small cell 17B is in the off state and a CC2 is used by the small base station 15B in the small cell 17B. Therefore, a DRS is transmitted by the small base station 15B in the CC2.

The small cell 17C is in the on state and a CC3 is used by the small base station 15C in the small cell 17C. Further, the small cell 17D is in the off state and a CC3 is used by the small base station 15D in the small cell 17D. Therefore, in the CC3, a CRS is transmitted by the small base station 15C and a DRS is transmitted by the small base station 15D.

Figure 10:
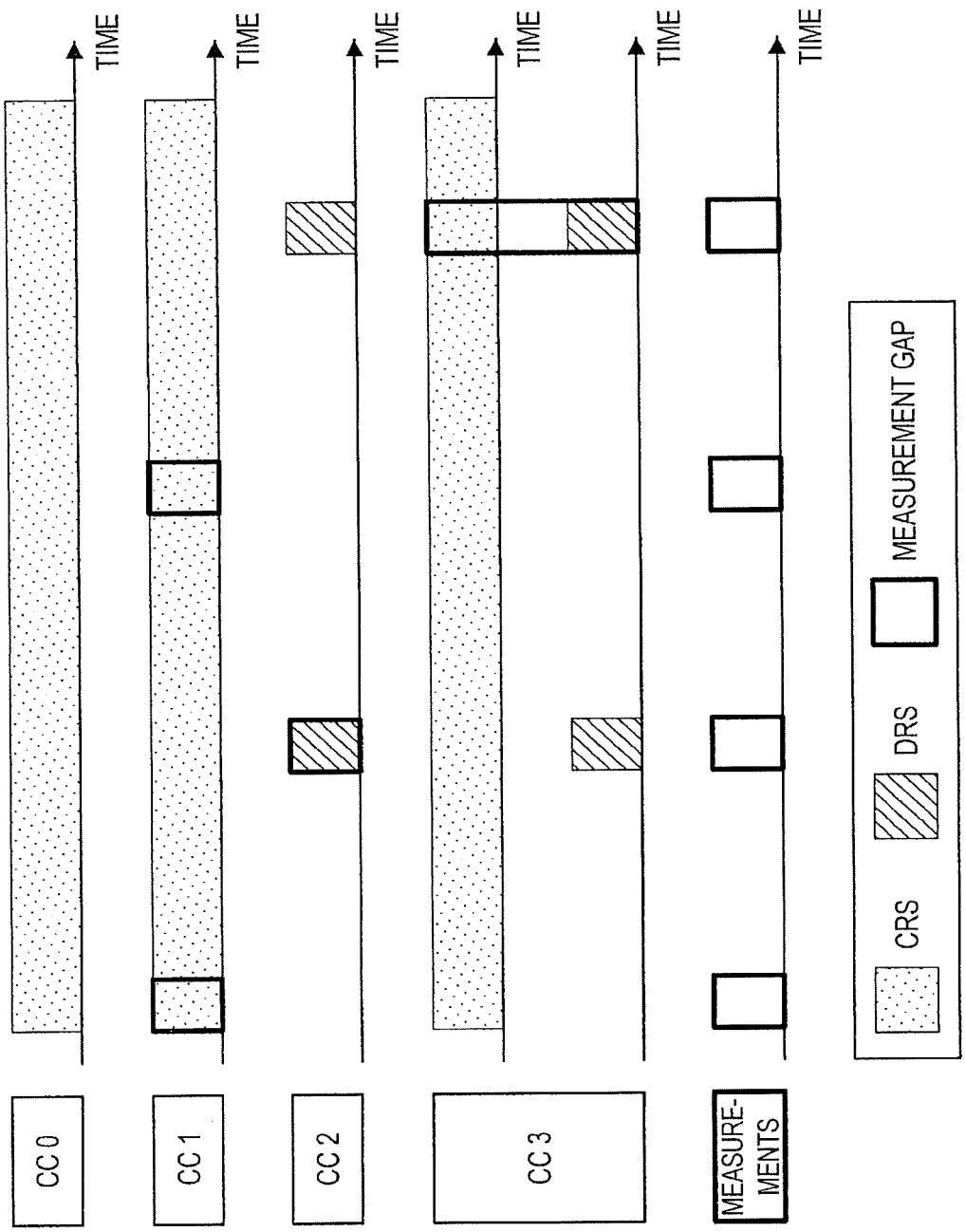
FIG. 10 is a second explanatory diagram for describing an example of measurement in a small cell on/off environment.

FIG. 10 is a second explanatory diagram for describing an example of measurement in a small cell on/off environment. Referring to FIG. 10, a CRS is transmitted in a CC0, a CRS is transmitted in a CC1, a DRS is transmitted in a CC2 and a CRS and a DRS are transmitted, in a CC3 identically to those described with reference to FIG. 9. The terminal device 21 performs intra-frequency measurement of the CC0. In addition, the terminal device 21 performs inter-frequency measurement of the CC1, CC2 and the CC3 using a measurement gap having a period of 40 ms or 80 ms.

As shown in the example, an inter-frequency measurement frequency may increase when the number of CCs increases. In addition, since a DRS is transmitted even when a small cell is in the off state in the small cell on/off environment, an inter-frequency measurement frequency may increase regardless of an on/off state of the small cell. Alternatively, an inter-frequency measurement frequency is maintained and, as a result, inter-frequency measurement may consume much time.

In addition, it is necessary for the terminal device 21 to perform inter-frequency measurement in consideration of a timing at which a DRS is transmitted. Therefore, since inter-frequency measurement based on a DRS whose transmission period is long has a limited opportunity, the inter-frequency measurement based on a DRS may consume much time.

In the embodiment of the present disclosure, it is possible to improve inter-frequency measurement based on a DRS.

2. Schematic Configuration of Communication System

Figure 11:
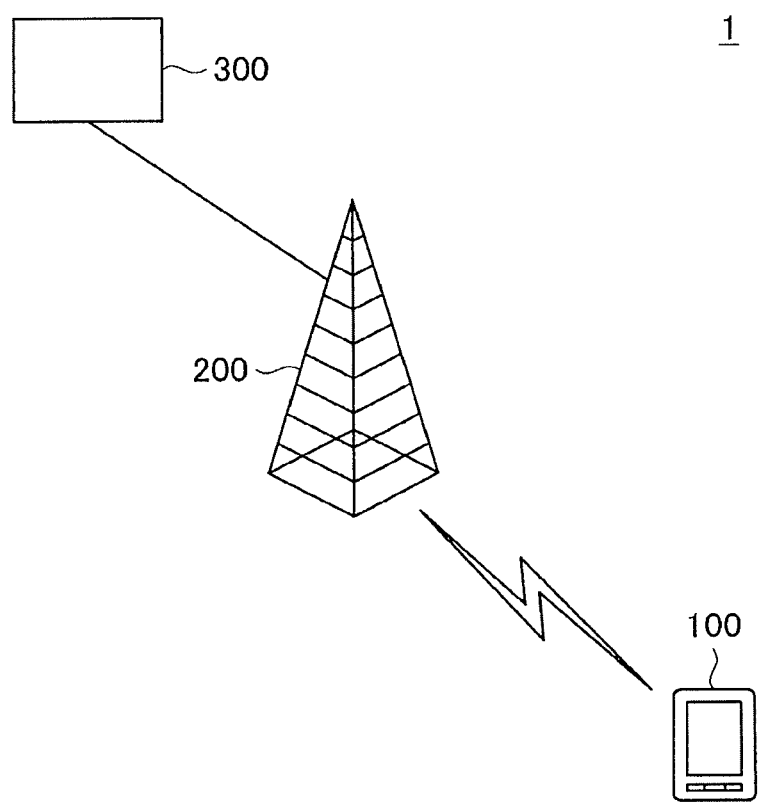
FIG. 11 is an explanatory diagram illustrating an example of a schematic configuration of a communication system according to an embodiment of the present disclosure.

Next, a schematic configuration of a communication system 1 according to an embodiment of the present disclosure will be described with reference to FIG. 11. FIG. 11 is an explanatory diagram illustrating an example of a schematic configuration of the communication system 1 according to art embodiment of the present disclosure. As illustrated in FIG. 11, the communication system 1 includes a terminal device 100, a base station 200 and a control entity 300. The communication system 1 is a system supporting, for example, LTE, LTE-Advanced or a communication standard equivalent thereto.

The terminal device 100 wirelessly communicates with the base station 200. In addition, the terminal device 100 performs measurement of each frequency band that is used by the base station. In addition, the terminal device 100 reports a result of the measurement to the base station 200.

The base station 200 wirelessly communicates with one or more terminal devices including the terminal device 100. The base station 200 may be a base station of a macro cell (that is, a macro base station) or a base station of a small cell (that is, a small base station).

The control entity 300 performs control according to each embodiment of the present disclosure. The control entity 300 is, for example, an existing or new core network node. Alternatively, when the base station 200 is a small base station, the control entity 300 may be a macro base station.

3. First Embodiments

Next, a first embodiment of the present disclosure will be described with reference to FIG. 12 to FIG. 21.

A terminal device 100-1 according to the first embodiment performs measurement of each of one or more frequency bands that are a part of a plurality of frequency bands that are not used by the terminal device 100-1. Specifically, according to the first embodiment, the terminal device 100-1 does not perform measurement of each of the remaining frequency bands among the plurality of frequency bands or performs the measurement of each of the remaining frequency bands at a frequency lower than a frequency of the measurements of each of the one or more frequency bands. Accordingly, for example, it is possible to improve measurement performed by the terminal device 100-1. As a specific example, a measurement load on the terminal device 100-1 may be reduced.

3.1. Configuration of Terminal Devices

Figure 12:
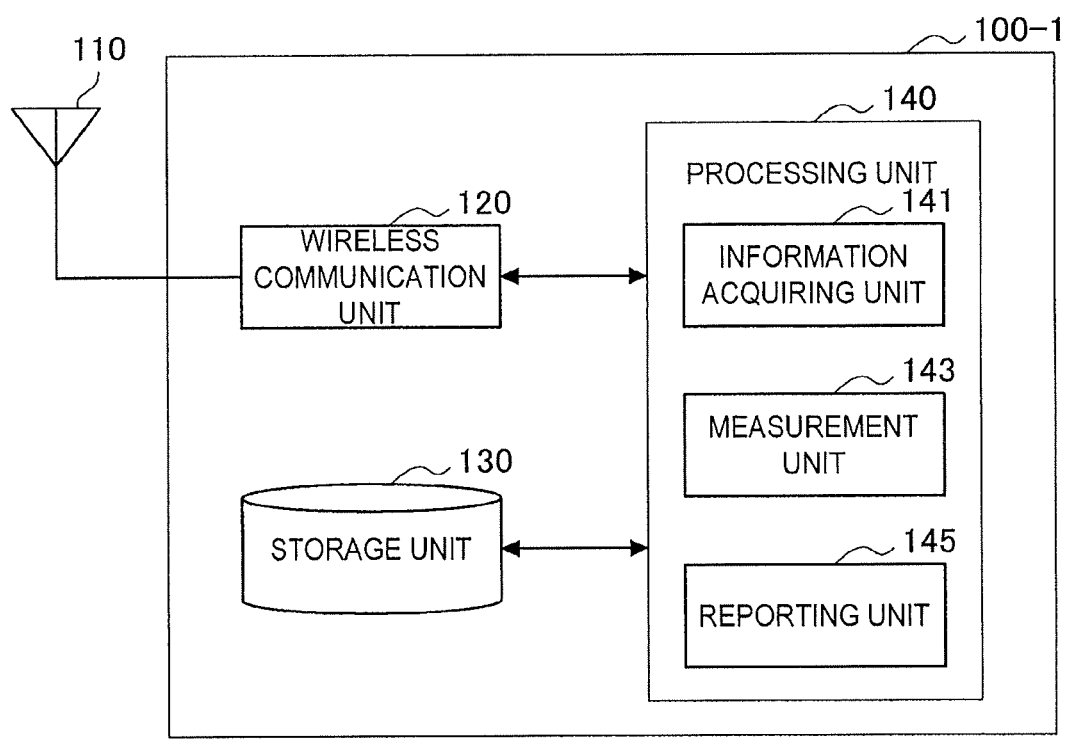
FIG. 12 is a block diagram illustrating an example of a configuration of a terminal device according to a first embodiment.

First, an example of a configuration of the terminal device 100-1 according to the first embodiment will be described with reference to FIG. 12 to FIG. 15. FIG. 12 is a block diagram illustrating an example of a configuration of the terminal device 100-1 according to the first embodiment. As illustrated in FIG. 12, the terminal device 100-1 includes an antenna unit 110, a wireless communication unit 120, a storage unit 130 and a processing unit 140.

(Antenna Unit 110)

The antenna unit 110 emits a signal output by the wireless communication unit 120 into space as radio waves. In addition, the antenna unit 110 converts spatial radio waves into a signal and outputs the signal to the wireless communication unit 120.

(Wireless Communication Unit 120)

The wireless communication unit 120 transmits and receives signals. For example, the wireless communication unit 120 receives a downlink signal from a base station and transmits an uplink signal to the base station.

(Storage Unit 130)

The storage unit 130 temporarily or permanently stores programs and data for operations of the terminal device 100-1.

(Processing Unit 140)

The processing unit 140 provides various functions of the terminal device 100-1. The processing unit 140 includes an information acquiring unit 141, a measurement unit 143 and a reporting unit 145. Alternatively, the processing unit 140 may further include a component other than these components. That is, the processing unit 140 may also perform an operation other than operations of these components.

(Information Acquiring Unit 141)

The information acquiring unit 141 acquires information about a frequency band.

For example, the information acquiring unit 141 acquires a measurement configuration of a frequency band. For example, a base station 200-1 transmits an RRC connection reconfiguration message including the measurement configuration to the terminal device 100-1, and the information acquiring unit 141 acquires the measurement configuration. The measurement configuration includes information such as measurement objects, reporting configurations, measurement identities (measurement IDs) and measurement gaps.

For example, the information acquiring unit 141 acquires a neighboring cell list (NCL). For example, the information acquiring unit 141 acquires an intra-frequency NCL and an inter-frequency NCL. For example, the base station 200-1 informs the information acquiring unit 141 of an intra-frequency NCL within a system information block (SIB) 4, and the information acquiring unit 141 acquires the intra-frequency NCL. In addition, for example, the base station 200-1 informs the information acquiring unit 141 of an inter-frequency NCL within an SIB5, and the information acquiring unit 141 acquires the inter-frequency NCL.

(Measurement Unit 143)

The measurement unit 143 performs measurement of a frequency band.

In the first embodiment, the measurement unit 143 performs measurement of each of one or more frequency bands that are a part of a plurality of frequency bands that are not used by the terminal device 100-1. Conversely, the measurement unit 143 does not perform measurement of each of the remaining frequency bands among the plurality of frequency bands or performs the measurement of each of the remaining frequency bands at a frequency lower than a frequency of the measurements of each of the one or more frequency bands. Accordingly, for example, it is possible to improve measurement performed by the terminal device 100-1.

(a) Frequency Band

Component Carrier (CC)

For example, each of the plurality of frequency bands is a component carrier (CC) of carrier aggregation.

The Same Operating Band

For example, the remaining frequency bands are frequency bands included in the same operating band as the one or more frequency bands. That is, the plurality of frequency bands are included in a single operating band.

Accordingly, for example, general measurement of a representative frequency band among a plurality of frequency bands that are assumed to have similar characteristics (that is, a plurality of frequency bands in a single operating band) is performed. Therefore, for example, when there is a frequency band through which favorable communication quality can be provided to the terminal device 100-1, the terminal device 100-1 can use the frequency band with a high probability while reducing a measurement load.

Further, for example, each of the remaining frequency bands is a frequency band adjacent to any frequency band included in the one or more frequency bands.

Accordingly, for example, general measurement of a representative frequency band between two frequency bands that are assumed to have fairly similar characteristics (that is, two adjacent frequency bands) is performed. Therefore, for example, when there is a frequency band through which favorable communication quality can be provided to the terminal device 100-1, the terminal device 100-1 can use the frequency band with a fairly high probability while reducing a measurement load.

Frequency Band of Small Cell

For example, each of the plurality of frequency bands is a frequency band that is used by a base station of a small cell.

Accordingly, for example, in an environment in which small cells are arranged, it is possible to reduce a measurement load.

The plurality of frequency bands have been described above. The first embodiment is not limited thereto. For example, the plurality of frequency bands may include frequency bands included in a different operating band. In addition, the plurality of frequency bands may include a frequency band that is used only by a macro base station.

(b) Measurement (b-1) Measurement Based on Reference Signal

For example, the measurement of each of the one or more frequency bands is measurement based on a reference signal transmitted in each of the one or more frequency bands. In addition, the measurement of each of the remaining frequency bands is measurement based on a reference signal transmitted in each of the remaining frequency bands.

For example, the reference signal is a cell-specific reference signal (CRS). Accordingly, for example, it is possible to reduce a measurement load regarding a small cell in the on state. A measurement load regarding a macro cell may also be reduced.

The measurement of each of the one or more frequency bands is RRM measurement. For example, the measurement of each of the one or more frequency bands is measurement of reception power or reception quality. More specifically, for example, the measurement of each of the one or more frequency bands is measurement of RSRP or RSRQ. In addition, for example, the measurement of each of the one or more frequency bands is performed for each cell in which each of the one or more frequency bands is used (that is, a base station that uses each of the one or more frequency bands).

(b-2) Measurement of remaining Frequency Bands

First Example (without Measurement)

As a first example, the measurement unit 143 does not perform the measurement of each of the remaining frequency bands. Hereinafter, this will be described with reference to a specific example of FIG. 13.

Figure 13:
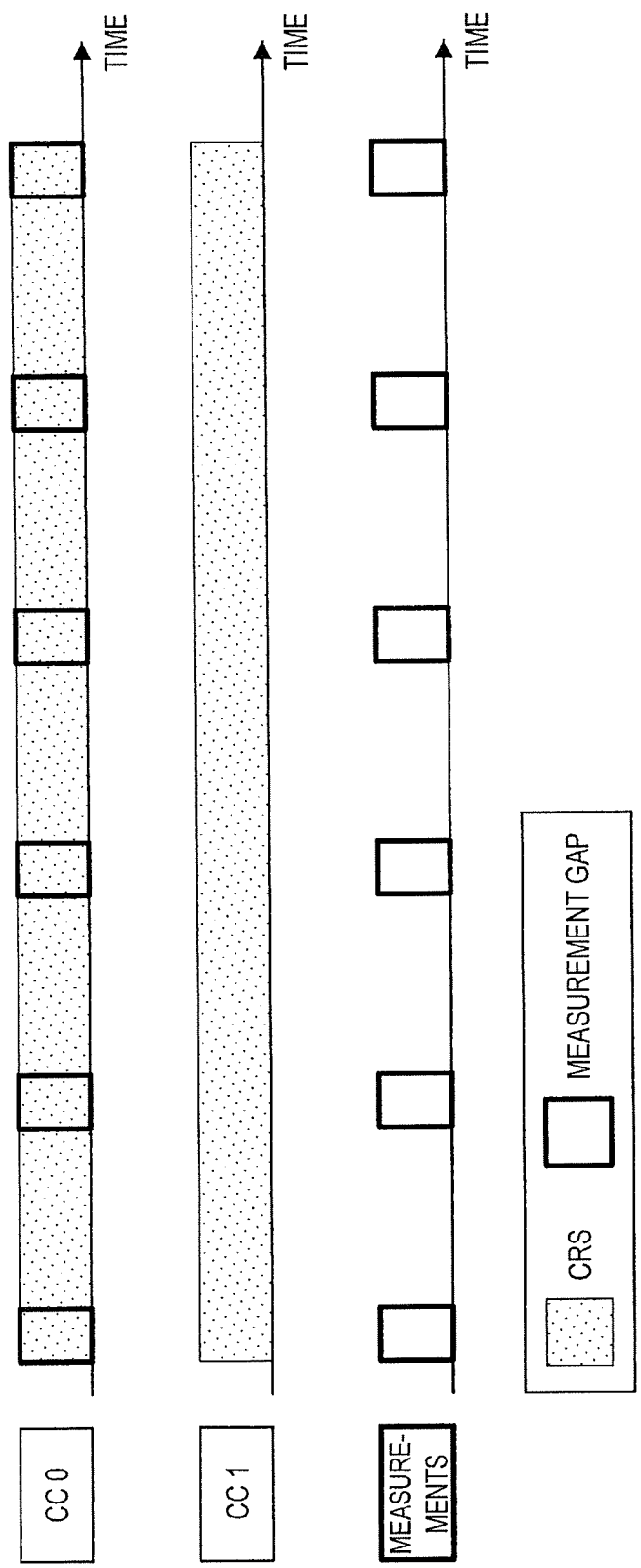
FIG. 13 is an explanatory diagram for describing a first example of measurement according to the first embodiment.

FIG. 13 is an explanatory diagram for describing a first example of measurement according to the first embodiment. As illustrated in FIG. 13, a CRS is transmitted in a CC0 and a CC1. In this example, the terminal device 100-1 performs inter-frequency measurement of the CC0. Conversely, inter-frequency measurement of the CC1 is not performed.

Accordingly, for example, a frequency band that is a measurement (that is, inter-frequency measurement) target is limited. Therefore, it is possible to further decrease a frequency of measurements performed by the terminal device 100-1. As a result, a load of measurements performed by the terminal device 100-1 may be reduced. In addition, power consumption of the terminal device 100-1 may decrease and throughput may be improved. Alternatively, measurement of a specific frequency band can be intensively performed for a short period. As a result, measurement of the specific frequency band may be performed more quickly.

Second Example (Measurement at Low Frequency)

As a second example, the measurement unit 143 performs the measurement of each of the remaining frequency bands at a frequency lower than a frequency of the measurements of each of the one or more frequency bands.

More specifically, for example, the measurement unit 143 performs the measurement of each of the remaining frequency bands using fewer measurement gaps than measurement gaps used for the measurement of each of the one or more frequency bands.

As an example, the measurement unit 143 skips a pan of the measurement gaps assigned to each of the remaining frequency bands without measurement. Hereinafter, this will be described with reference to a specific example of FIG. 14.

Figure 14:
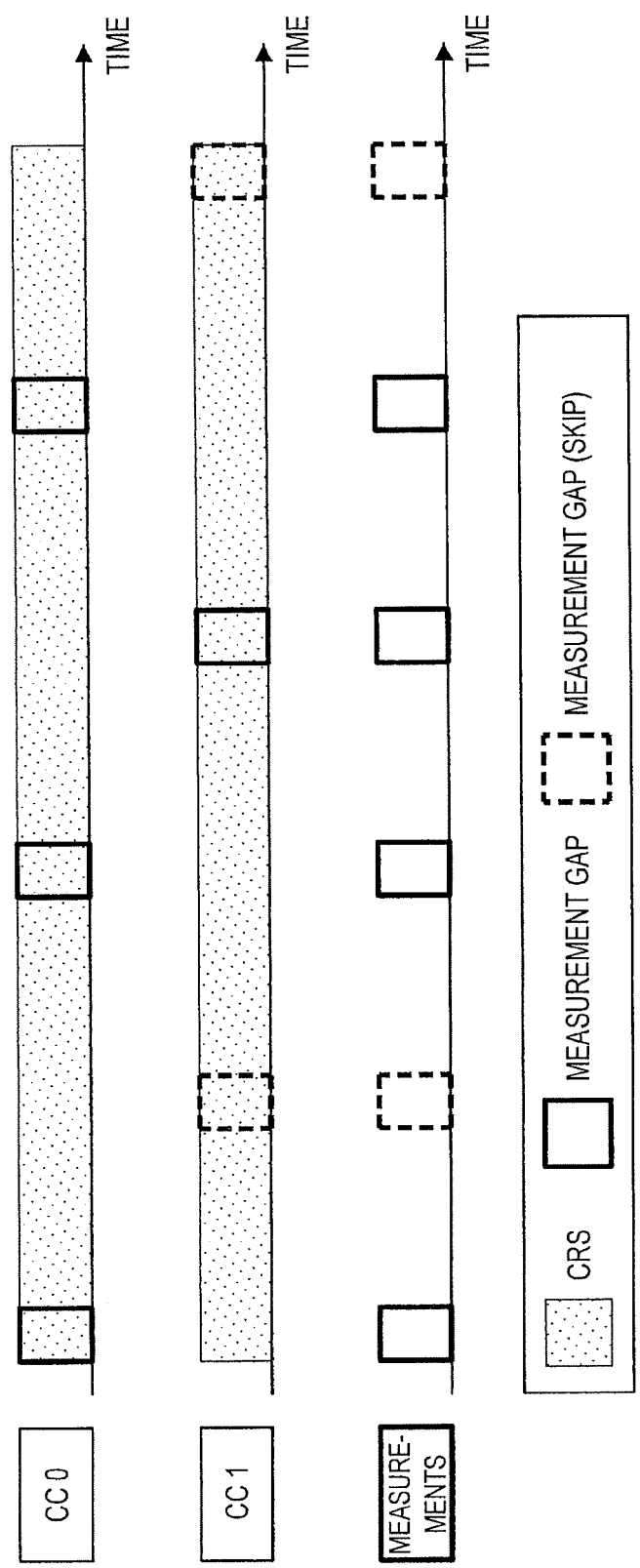
FIG. 14 is an explanatory diagram for describing a second example of measurement according to the first embodiment.

FIG. 14 is an explanatory diagram for describing a second example of measurement according to the first embodiment. As illustrated in FIG. 14, a CRS is transmitted in a CC0 and a CC1. In this example, the same number of measurement gaps is assigned to the CC0 and CC1. The terminal device 100-1 performs measurement of the CC0 using all measurement gaps assigned to the CC0. Conversely, the terminal device 100-1 skips a part of all measurement gaps assigned to the CC1 without measurement of the CC1, and performs measurement of the CC1 using the rest of the all measurement gaps assigned to the CC1.

Accordingly, for example, a frequency of measurements performed by the terminal device 100-1 (that is, inter-frequency measurement) decreases. As a result, a load of measurements performed by the terminal device 100-1 may be reduced. In addition, power consumption of the terminal device 100-1 may decrease and throughput may be improved.

As another example, measurement gaps assigned to each of the remaining frequency bands may be fewer than measurement gaps assigned to each of the one or more frequency bands. Hereinafter, this will be described with reference to a specific example of FIG. 15.

Figure 15:
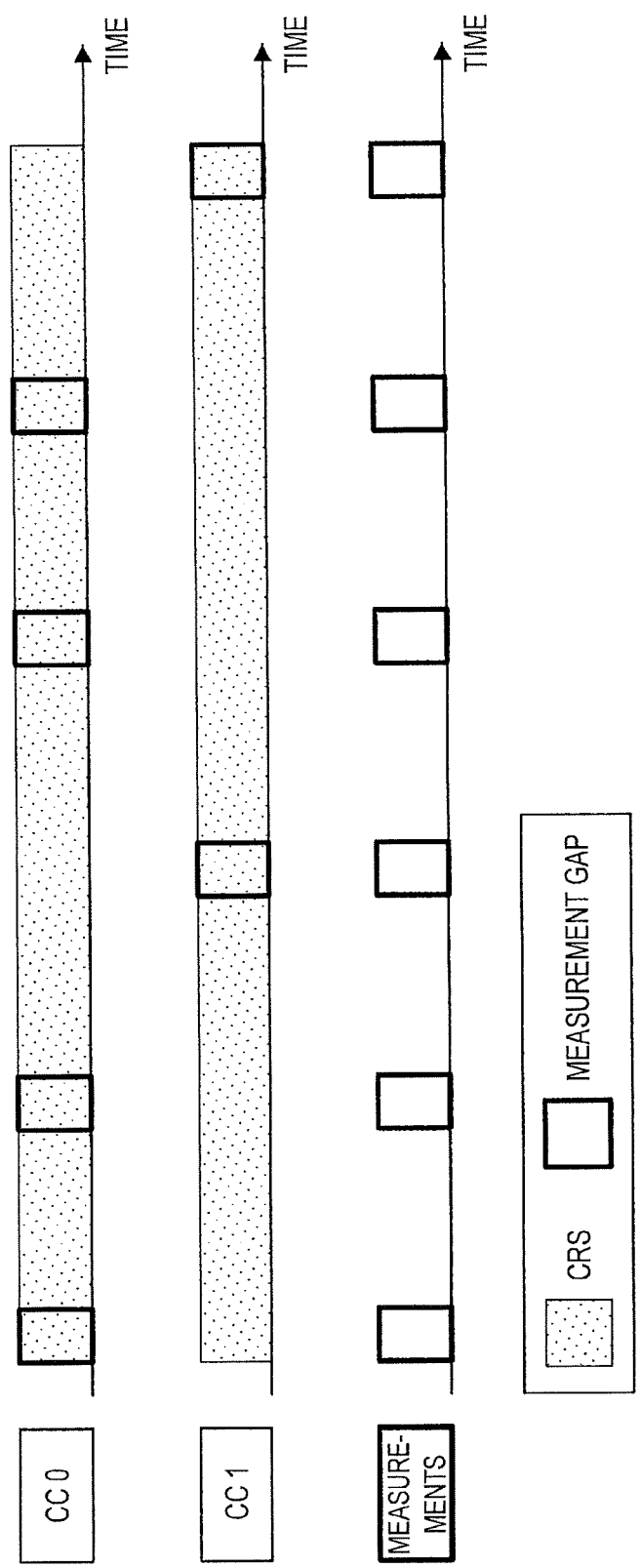
FIG. 15 is an explanatory diagram for describing a third example of measurement according to the first embodiment.

FIG. 15 is an explanatory diagram for describing a third example of measurement according to the first embodiment. As illustrated in FIG. 15, a CRS is transmitted in a CC0 and a CC1. In this example, more measurement gaps are assigned to the CC0 and fewer measurement gaps are assigned to the CC1. The terminal device 100-1 performs measurement of the CC0 using the more measurement gaps assigned to the CC0, and performs measurement of the CC1 using the fewer measurement gaps assigned to the CC1.

Accordingly, for example, measurement of a specific frequency band can be intensively performed for a short period. As a result, measurement of the specific frequency band may be performed more quickly.

The measurement of each of the remaining frequency bands is RRM measurement. For example, the measurement of each of the remaining frequency bands is measurement of reception power or reception quality. More specifically, for example, the measurement of each of the remaining frequency bands is measurement of RSRP or RSRQ. In addition, for example, the measurement of each of the remaining frequency bands is performed for each cell in which each of the remaining frequency bands is used (that is, a base station that uses each of the remaining frequency bands).

(c) Measurement Control

For example, the measurement by the measurement unit 143 is performed according to an instruction from the base station 200-1. That is, the terminal device 100-1 performs the measurement by the measurement unit 143 according to an instruction from the base station 200-1.

The measurement by the measurement unit 143 may be voluntarily performed. That is, the terminal device 100-1 may voluntarily perform the measurement by the measurement unit 143. In this case, the base station 200-1 may not perform some or all of operations which will be described.

(Reporting Unit 145)

The reporting unit 145 reports a result of the measurement of a frequency band to the base station 200-1.

(a) Reporting of result of Measurement of One or more Frequency Bands

The reporting unit 145 reports a result of the measurement of each of the one or more frequency bands to the base station 200-1.

(b) Reporting of result of Measurement of remaining Frequency Bands

First Example (without Measurement)

As described above, as a first example, the measurement unit 143 does not perform the measurement of each of the remaining frequency bands. In this case, the reporting unit 145 does not report a result of the measurement of each of the remaining frequency bands to the base station 200-1.

The reporting unit 145 may substitute a result of measurement of a first frequency band included in the one or more frequency bands with a result of measurement of a second frequency band included in the remaining frequency bands, and thus may report the result of the measurement of the second frequency band to the base station 200-5. Accordingly, for example, a frequency band that is not actually measured may be selected as a frequency band that is used by the terminal device 100-1.

Second Example (Measurement at Low Frequency)

As described above, as the second example, the measurement unit 143 performs the measurement of each of the remaining frequency bands at a frequency lower than a frequency of the measurements of each of the one or more frequency bands. In this case, the reporting unit 145 reports a result of the measurement of each of the remaining frequency bands to the base station 200-1.

(e) Reporting Method

For example, the reporting unit 145 reports a result of measurement to the base station 200-1 according to a reporting configuration included in the measurement configuration from the base station 200-1.

For example, the reporting unit 145 reports the result of the measurement to the base station 200-1 through the antenna unit 110 and the wireless communication unit 120.

3.2. Configuration of Base Station

Figure 16:
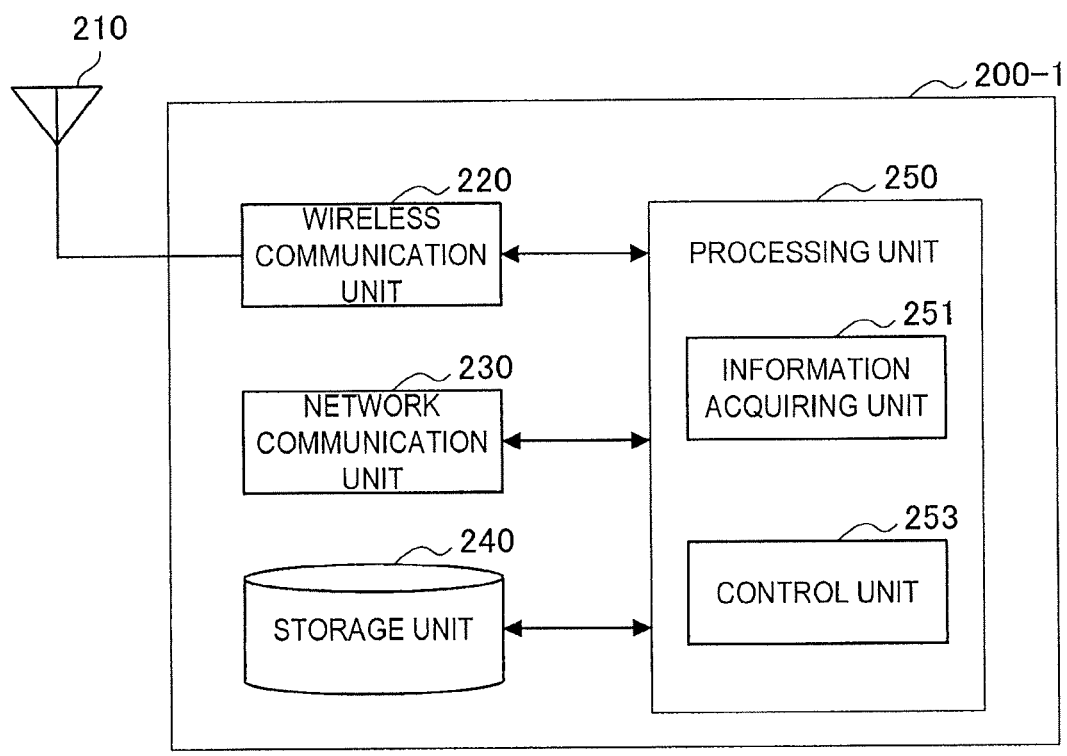
FIG. 16 is a block diagram illustrating an example of a configuration of a base station according to the first embodiment.

Next, an example of a configuration of the base station 200-1 according to the first embodiment will be described with reference to FIG. 16. FIG. 16 is a block diagram illustrating an example of a configuration of the base station 200-1 according to the first embodiment. Referring to FIG. 16, the base station 200-1 includes an antenna unit 210, a wireless communication unit 220, a network communication unit 230, a storage unit 240, and a processing unit 250.

(Antenna Unit 210)

The antenna unit 210 radiates a signal output from the wireless communication unit 220 into the air as radio waves. The antenna unit 210 converts the radio waves in the air into a signal, and outputs the signal to the wireless communication unit 220.

(Wireless Communication Unit 220)

The wireless communication unit 220 transmits or receives a signal. For example, the wireless communication unit 220 transmits the downlink signal to the terminal device, and receives the uplink signal from the terminal device.

(Network Communication Unit 230)

The network communication unit 230 communicates with other nodes. For example, the network communication unit 230 communicates with a core network node and other base stations. For example, the network communication unit 230 communicates with a control entity 300-1.

(Storage Unit 240)

The storage unit 240 temporarily or permanently stores a program and data for an operation of the base station 200-1.

(Processing Unit 250)

The processing unit 250 provides various functions of the base station 200-1. The processing unit 250 includes an information acquiring unit 251 and a control unit 253. The processing unit 250 may further include any other component in addition to the above-mentioned components. In other words, the processing unit 250 may also perform an operation other than operations of the above-mentioned components.

(Information Acquiring Unit 251)

The information acquiring unit 251 acquires information about a plurality of frequency bands that are not used by the terminal device 100-1.

Descriptions of the plurality of frequency bands are the same as those described above in the measurement unit 143 of the terminal device 100-1. Therefore, redundant descriptions will be omitted here.

The information about the plurality of frequency bands includes information indicating each of the plurality of frequency bands (for example, a downlink carrier frequency or identification information).

(Control Unit 253)

The control unit 253 instructs the terminal device 100-1 to perform measurement of each of one or more frequency bands that are a part of the plurality of frequency bands, and not to perform measurement of each of the remaining frequency bands among the plurality of frequency bands or perform the measurement of each of the remaining frequency bands at a frequency lower than a frequency of the measurements of each of the one or more frequency bands.

(a) Frequency Band

For example, the control unit 253 selects the one or more frequency bands from among the plurality of frequency bands. Alternatively, the control unit 253 may select the remaining frequency bands other than the one or more frequency bands from among the plurality of frequency bands.

Descriptions of the one or more frequency bands and the remaining frequency bands are the same as those described above in the measurement unit 143 of the terminal device 100-1. Therefore, redundant descriptions will be omitted here.

(b) Measurement of Remaining Frequency Bands (b-1) First Example (without Measurement)

As a first example, the control unit 253 instructs the terminal device 100-1 to perform the measurement of each of the one or more frequency bands and not to perform measurement of each of the remaining frequency bands among the plurality of frequency bands.

The control unit 253 may substitute a result of measurement of a first frequency band included in the one or more frequency bands with a result of measurement of a second frequency band included in the remaining frequency bands. For example, the control unit 253 substitutes a result of measurement of the first frequency band with a result of measurement of the second frequency band and thus may perform a handover decision. As an example, the second frequency band may be a frequency band that is adjacent to the first frequency band. Accordingly, for example, a frequency band that is not actually measured may be selected as a frequency band that is used by the terminal device 100-1.

(b-2) Second Example (Measurement at Low Frequency)

As a second example, the control unit 253 instructs the terminal device 100-1 to perform the measurement of each of the remaining frequency bands at a frequency lower than a frequency of the measurements of each of the one or more frequency bands.

As a specific example, the control unit 253 instructs the terminal device 100-1 to perform the measurement of each of the remaining frequency bands using fewer measurement gaps than measurement gaps used for the measurement of each of the one or more frequency bands.

As an example, the control unit 253 instructs the terminal device 100-1 to skip a part of measurement gaps assigned to each of the remaining frequency bands without measurement.

As another example, the control unit 253 may instruct the terminal device 100-1 to assign fewer measurement gaps to each of the remaining frequency bands than to each of the one or more frequency bands. Alternatively, the control unit 253 may decide measurement gap assignment such that the measurement gaps assigned to each of the remaining frequency bands are fewer than measurement gaps assigned to each of the one or more frequency bands. Thus, the control unit 253 may instruct the terminal device 100-1 to perform the decided assignment.

(c) Specific Process

For example, the control unit 253 performs an instruction according to individual signaling to the terminal device 100-1. For example, the individual signaling is RRC signaling.

As an example, the control unit 253 may transmit an RRC connection reconfiguration message including a measurement configuration through the antenna unit 210 and the wireless communication unit 220, and thus may perform the instruction.

3.3. Process Flow

Next, examples of processes according to the first embodiment will be described with reference to FIG. 17 and FIG. 18.

(First Example: without Measurement)

Figure 17:
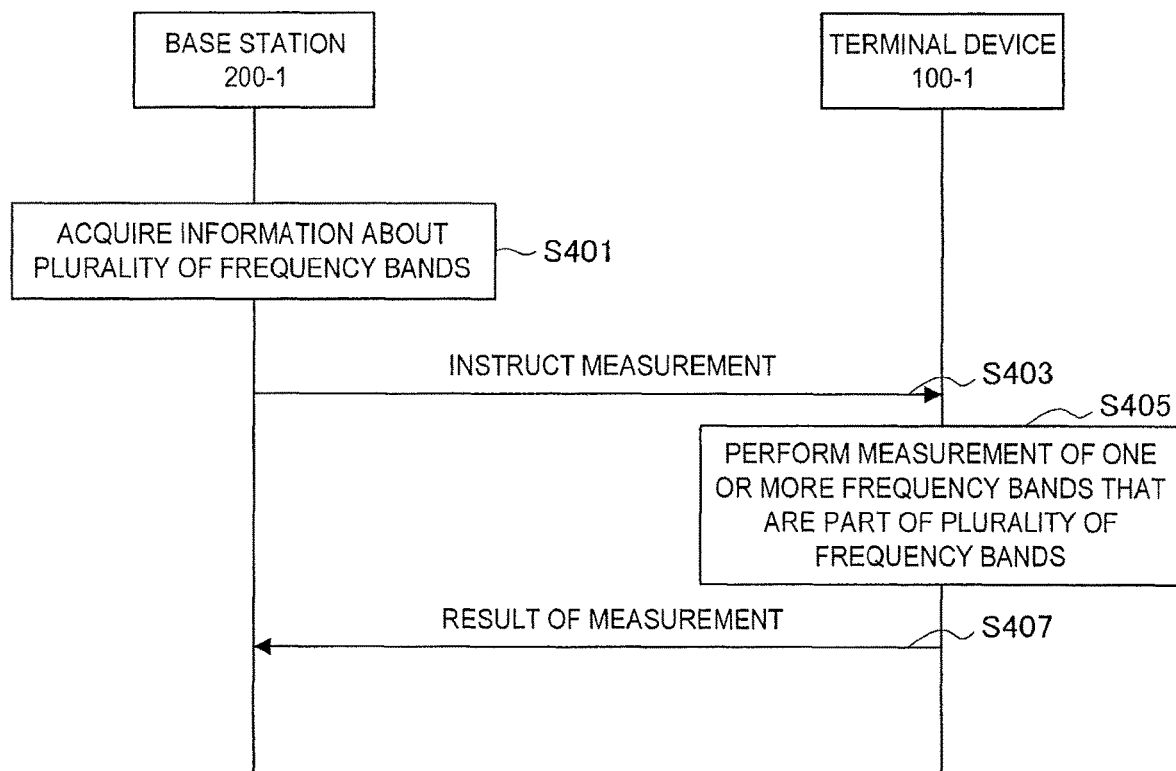
FIG. 17 is a sequence diagram illustrating a first example of a schematic How of a process according to the first embodiment.

FIG. 17 is a sequence diagram illustrating a first example of a schematic flow of a process according to the first embodiment.

The base station 200-1 (the information acquiring unit 251) acquires information about a plurality of frequency bands that are not used by the terminal device 100-1 (S401).

Then, the base station 200-1 (the control unit 253) instructs the terminal device 100-1 to perform measurement of each of one or more frequency bands that are a part of the plurality of frequency bands and not to perform measurement of each of the remaining frequency bands among the plurality of frequency bands (S403).

Then, the terminal device 100-1 (the measurement unit 143) performs measurement of each of the one or more frequency bands (S405). The terminal device 100-1 (the measurement unit 143) does not perform measurement of each of the remaining frequency bands.

Then, the terminal device 100-1 (the reporting unit 145) reports a result of the measurement to the base station 200-1 (S407).

(Second Example: Measurement at Low Frequency)

Figure 18:
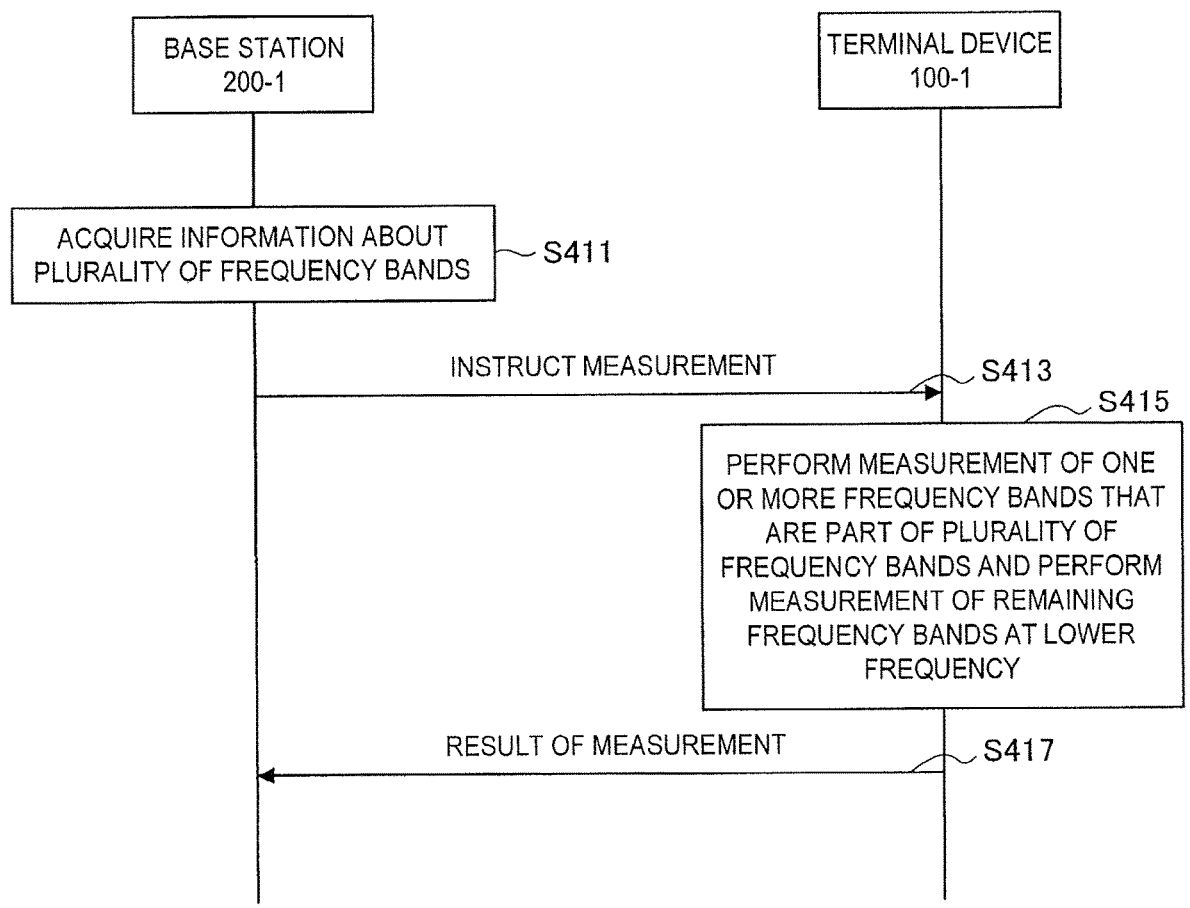
FIG. 18 is a sequence diagram illustrating a second example of a schematic flow of a process according to the first embodiment.

FIG. 18 is a sequence diagram illustrating a second example of a schematic flow of a process according to the first embodiment.

The base station 200-1 (the information acquiring unit 251) acquires information about a plurality of frequency bands that are not used by the terminal device 100-1 (S411).

Then, the base station 200-1 (the control unit 253) instructs the terminal device 100-1 to perform measurement of each of one or more frequency bands that are a part of the plurality of frequency bands and perform measurement of each of the remaining frequency bands among the plurality of frequency bands at a frequency lower than a frequency of the measurements of each of the one or more frequency bands (S413).

Then, the terminal device 100-1 (the measurement unit 143) performs measurement of each of the one or more frequency bands, and performs the measurement of each of the remaining frequency bands at a frequency lower than a frequency of the measurements of each of the one or more frequency bands (S415).

Then, the terminal device 100-1 (the reporting unit 145) reports a result of the measurement to the base station 200-1 (S417).

3.4. Modification Example

Next, a modification example of the first embodiment will be described with reference to FIG. 19 to FIG. 21.

As described above, for example, the measurement of each of the one or more frequency bands is measurement based on a reference signal transmitted in each of the one or more frequency bands. In addition, the measurement of each of the remaining frequency bands is measurement based on a reference signal transmitted in each of the remaining frequency bands. In addition, in the above-described example of the first embodiment, the reference signal is a CRS. Conversely, in the modification example of the first embodiment, the reference signal is a discovery reference signal (DRS).

(Terminal Device 100-1: Measurement Unit 143)

(b) Measurement (b-1) Measurement Based on Reference Signal

As described above, for example, the measurement of each of the one or more frequency bands is measurement based on a reference signal transmitted in each of the one or more frequency bands. In addition, the measurement of each of the remaining frequency bands is measurement based on a reference signal transmitted in each of the remaining frequency bands.

Specifically, in the modification example of the first embodiment, the reference signal is a discovery reference signal (DRS). Accordingly, for example, it is possible to reduce a measurement load regarding a small cell in the off state.

The DRS is a reference signal that is transmitted by a base station of the small cell in an off state. The DRS may also be referred to as a discovery signal (DR).

(b-2) Measurement of Remaining Frequency Bands

First Example (without Measurement)

As a first example, the measurement unit 143 does not perform the measurement of each of the remaining frequency bands. Hereinafter, this will be described with reference to a specific example of FIG. 19.

Figure 19:
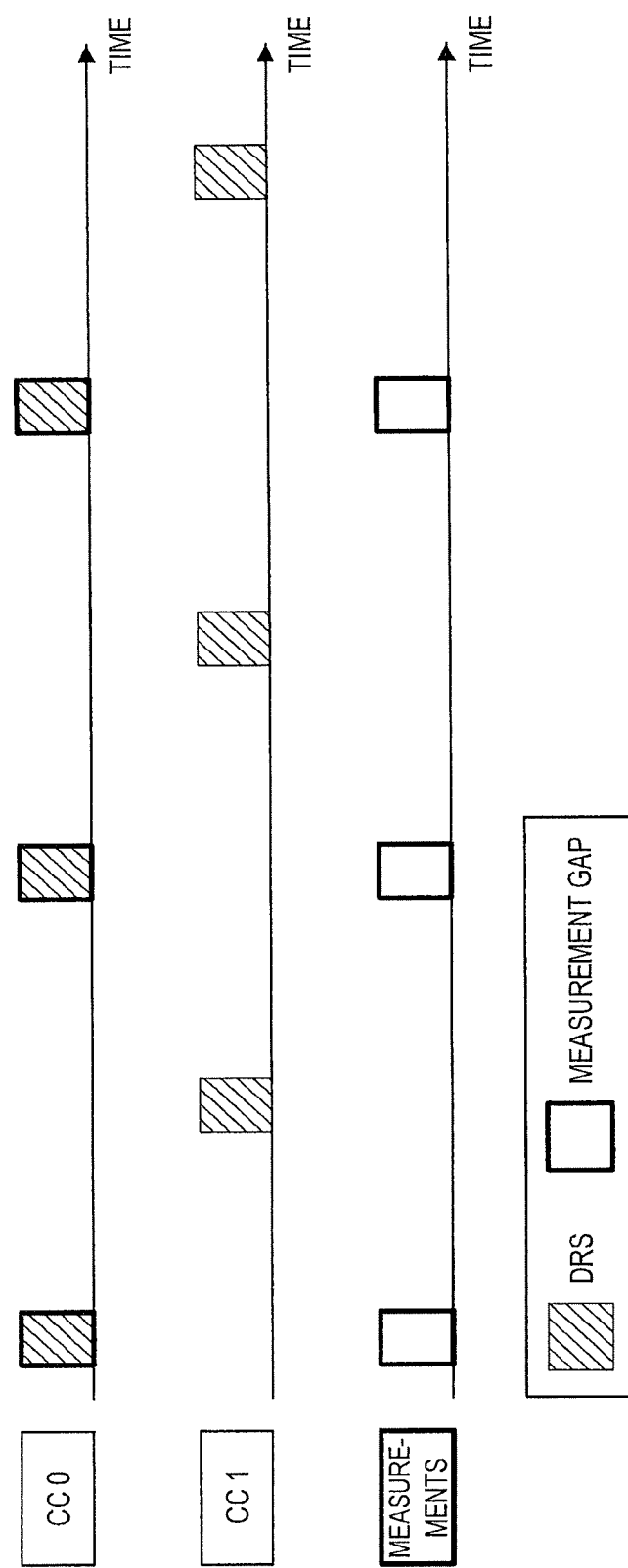
FIG. 19 is an explanatory diagram for describing a first example of measurement according to a modification example of the first embodiment.

FIG. 19 is an explanatory diagram for describing a first example of measurement according to a modification example of the first embodiment. As illustrated in FIG. 19, a DRS is transmitted in a CC0 and a CC1. In this example, in the terminal device 100-1, inter-frequency measurement of the CC0 is performed. Conversely, inter-frequency measurement of the CC1 is not performed.

Second Example (Measurement at Low Frequency)

As a second example, the measurement unit 143 performs the measurement of each of the remaining frequency bands at a frequency lower than a frequency of the measurements of each of the one or more frequency bands.

As an example, the measurement unit 143 skips a part of measurement gaps assigned to each of the remaining frequency bands without measurement. Hereinafter, this will be described with reference to a specific example of FIG. 20.

Figure 20:
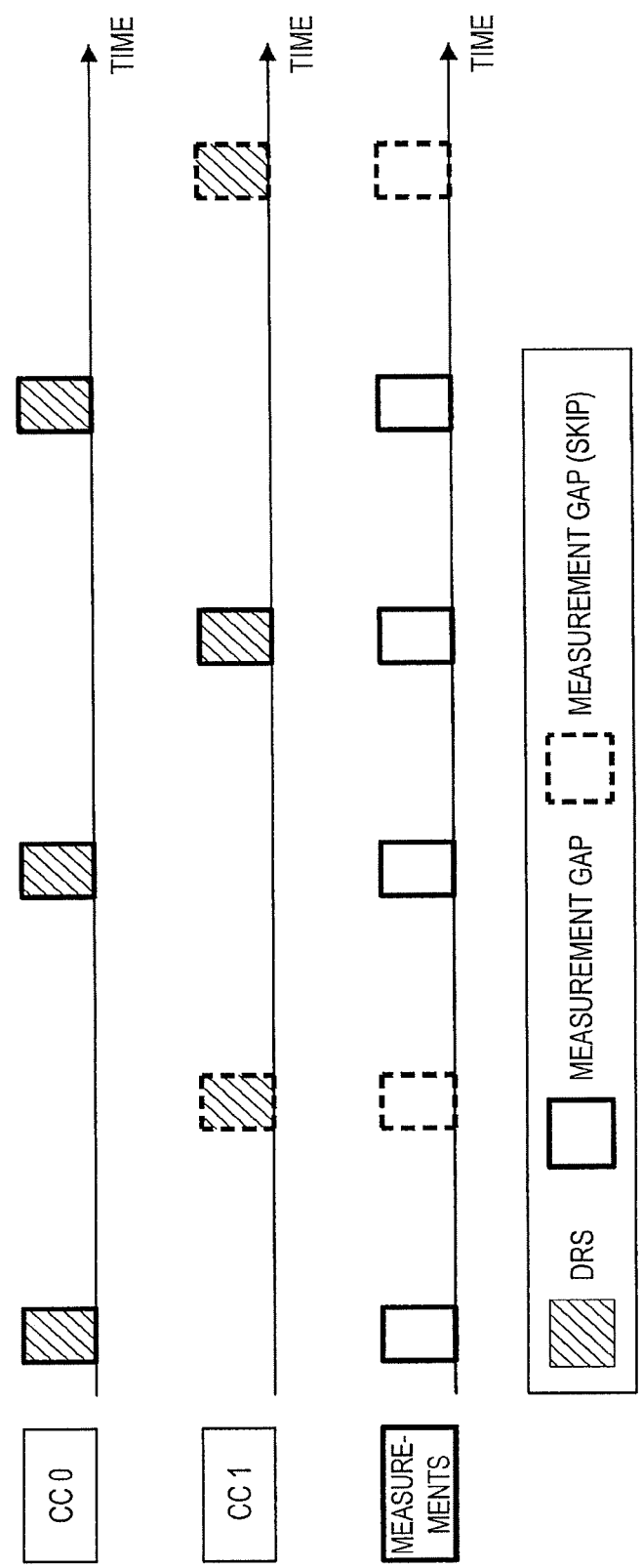
FIG. 20 is an explanatory diagram for describing a second example of measurement according to a modification example of the first embodiment.

FIG. 20 is an explanatory diagram for describing a second example of measurement according to a modification example of the first embodiment. As illustrated in FIG. 20, a DRS is transmitted in a CC0 and a CC1. In this example, the same number of measurement gaps is assigned to the CC0 and the CC1. The terminal device 100-1 performs measurement of the CC0 using all measurement gaps assigned to the CC0. Conversely, the terminal device 100-1 skips a part of all measurement gaps assigned to the CC1 without measurement of the CC1 and performs measurement of the CC1 using the rest of the all measurement gaps assigned to the CC1.

As another example, measurement gaps assigned to each of the remaining frequency bands may be fewer than measurement gaps assigned to each of the one or more frequency bands. Hereinafter, this will be described with reference to a specific example of FIG. 21.

Figure 21:
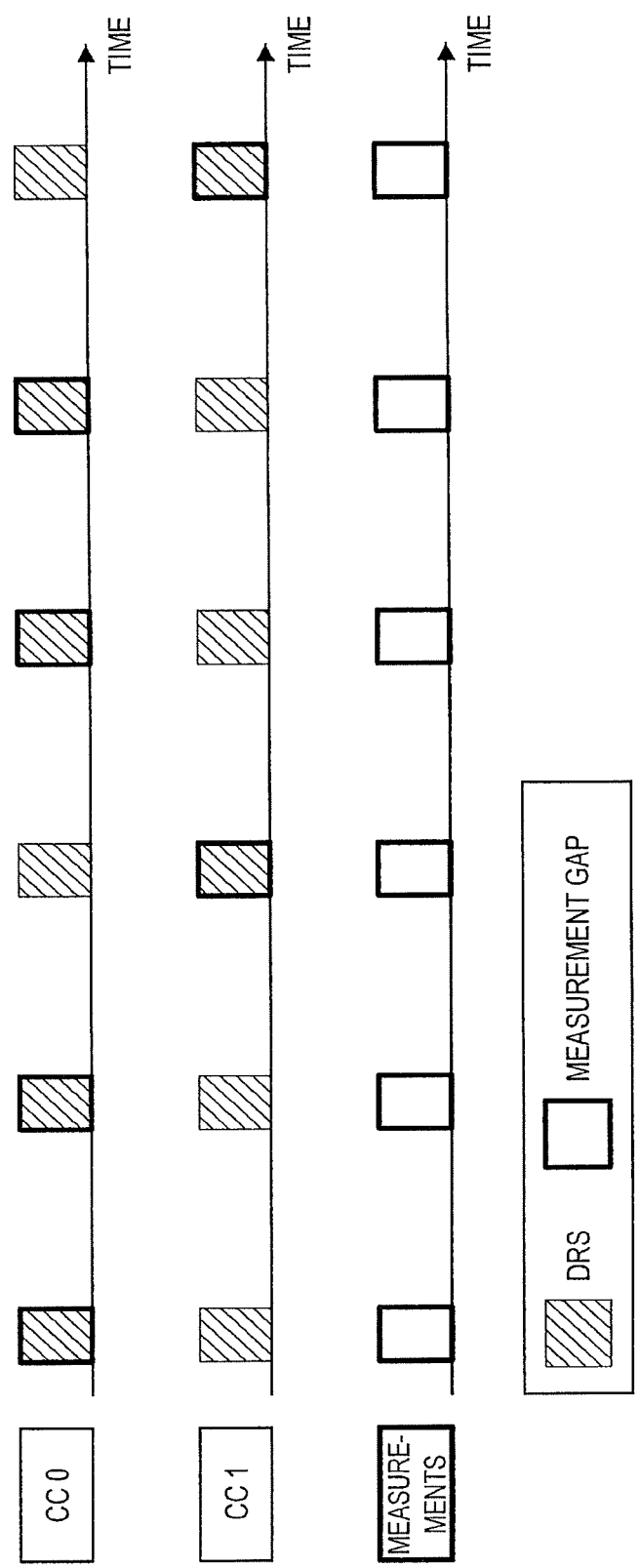
FIG. 21 is an explanatory diagram for describing a third example of measurement according to a modification example of the first embodiment.

FIG. 21 is an explanatory diagram for describing a third example of measurement according to a modification example of the first embodiment. As illustrated in FIG. 21, a DRS is transmitted in a CC0 and a CC1. In this example, more measurement gaps are assigned to the CC0 and fewer measurement gaps are assigned to the CC1. The terminal device 100-1 performs measurement of the CC0 using the more measurement gaps assigned to the CC0, and performs measurement of the CC1 using the fewer measurement gaps assigned to the CC1.

4. Second Embodiment

Next, a second embodiment of the present disclosure will be described with reference to FIG. 22 to FIG. 30.

A terminal device 100-2 according to the second embodiment performs measurement of a first frequency band based on a discovery reference signal transmitted in the first frequency band within a first period included in a measurement gap, and performs measurement of a second frequency band based on a reference signal transmitted in the second frequency band within a second period included in the measurement gap. Specifically, in the second embodiment, the reference signal transmitted in the second frequency band is a DRS. That is, in the second embodiment, the terminal device 100-2 performs measurement of a frequency group including the first frequency band and the second frequency band using the measurement gap. Accordingly, for example, it is possible to improve measurement performed by a terminal device 100-3.

4.1. Configuration of Terminal Device

Figure 22:
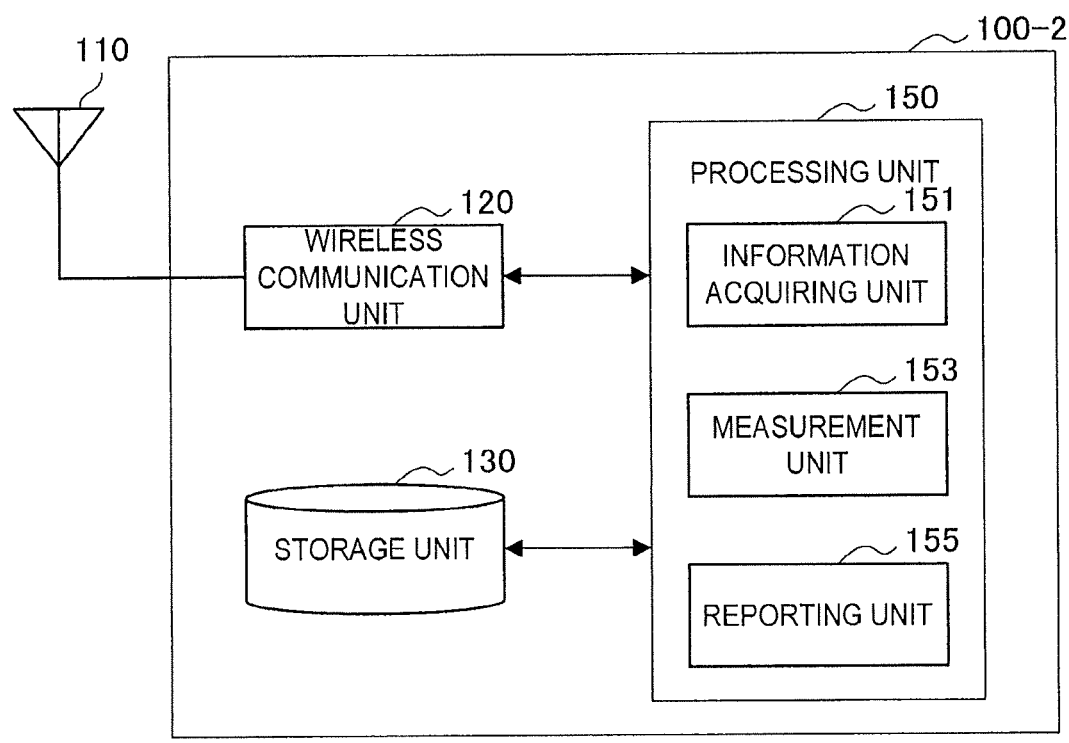
FIG. 22 is a block diagram illustrating an example of a configuration of a terminal device according to a second embodiment.

First, an example of a configuration of the terminal device 100-2 according to the second embodiment will be described with reference to FIG. 22 to FIG. 25. FIG. 22 is a block diagram illustrating an example of a configuration of the terminal device 100-2 according to the second embodiment. As illustrated in FIG. 22, the terminal device 100-2 includes the antenna unit 110, the wireless communication unit 120, the storage unit 130 and a processing unit 150.

There is no difference in descriptions of the antenna unit 110, the wireless communication unit 120 and the storage unit 130 between the first embodiment and the second embodiment except for different reference numerals. Therefore, redundant descriptions will be omitted here, and only the processing unit 150 will be described.

(Processing Unit 150)

The processing unit 150 provides various functions of the terminal device 100-2. The processing unit 150 includes an information acquiring unit 151, a measurement unit 153 and a reporting unit 155. The processing unit 150 may further include a component other than these components. That is, the processing unit 150 may also perform an operation other than operations of these components.

(Information Acquiring Unit 151)

The information acquiring unit 151 acquires information indicating a first frequency band in which a DRS is transmitted within at least a first period included in a measurement gap. Specifically, in the second embodiment, the information acquiring unit 151 acquires information indicating a frequency group including the first frequency band and a second frequency band. For example, the second frequency band is a frequency band in which a DRS is transmitted within at least a second period included in the measurement gap.

In addition, the information acquiring unit 151 acquires information indicating the measurement gap.

For example, a base station 200-2 notifies the terminal device 100-2 of the frequency group and the measurement gap. As a specific example, the base station 200-2 transmits information indicating the frequency group and information indicating the measurement gap to the terminal device 100-2. As an example, the base station 200-2 transmits an RRC connection reconfiguration message including a measurement configuration including the information indicating the frequency group and the information indicating the measurement gap to the terminal device 100-2. Then, the information acquiring unit 151 acquires the information indicating the frequency group and the information indicating the measurement gap.

(Measurement Unit 153)

The measurement unit 153 performs measurement of a frequency band.

In the second embodiment, the measurement unit 153 performs measurement of a first frequency band based on a DRS transmitted in the first frequency band within a first period included in a measurement gap. In addition, the measurement unit 153 performs measurement of a second frequency band based on a reference signal transmitted in the second frequency band within a second period included in the measurement gap. Accordingly, for example, it is possible to improve measurement performed by the terminal device 100-3.

(a) Frequency Band

Component Carrier (CC)

For example, the first frequency band and the second frequency band each are component carriers (CCs) of carrier aggregation.

Frequency Band of Small Cell

For example, each of the first frequency band and the second frequency band is a frequency band that is used by a base station of a small cell.

Frequency Band that is not Used

For example, each of the first frequency band and the second frequency band is a frequency band that is not used by the terminal device 100-2.

In view of the above points, for example, each of the first frequency band and the second frequency band is a CC that is used by a base station of a small cell, and the CC is not used by the terminal device 100-2.

(b) Measurement

The measurement of the first frequency band and the measurement of the second frequency band are RRM measurements, for example, measurements of reception power or reception quality. As a specific example, the measurement of the first frequency band and the measurement of the second frequency band are measurements of RSRP or RSRQ.

In addition, for example, measurement is performed in units of a combination of a frequency band and a cell (a base station). For example, the measurement of the first frequency band is performed for each cell in which the first frequency band is used (that is, a base station that uses the first frequency band). In addition, for example, the measurement of the second frequency band is performed for each cell in which the second frequency band is used (that is, a base station that uses the second frequency band).

(c) Reference Signal

Specifically, in the second embodiment, the reference signal transmitted in the second frequency band is a DRS. That is, the measurement unit 153 performs measurement of the first frequency band and the second frequency band in which a DRS is transmitted using the measurement gap.

The DRS is a reference signal that is transmitted by a base station of a small cell in the off state. The DRS may also be referred to as a discovery signal (DR).

(d) Measurement Gap

For example, the measurement gap is a period having a length of 6 milliseconds. That is, the measurement gap is a general measurement gap.

For example, each of the first period and the second period is a period shorter than 6 milliseconds. That is, a shorter period is used for measurement based on a DRS than general measurement based on a CRS.

(e) Specific Example of Measurement

Hereinafter, a first example of measurement according to the second embodiment will be described with reference to FIG. 23.

Figure 23:
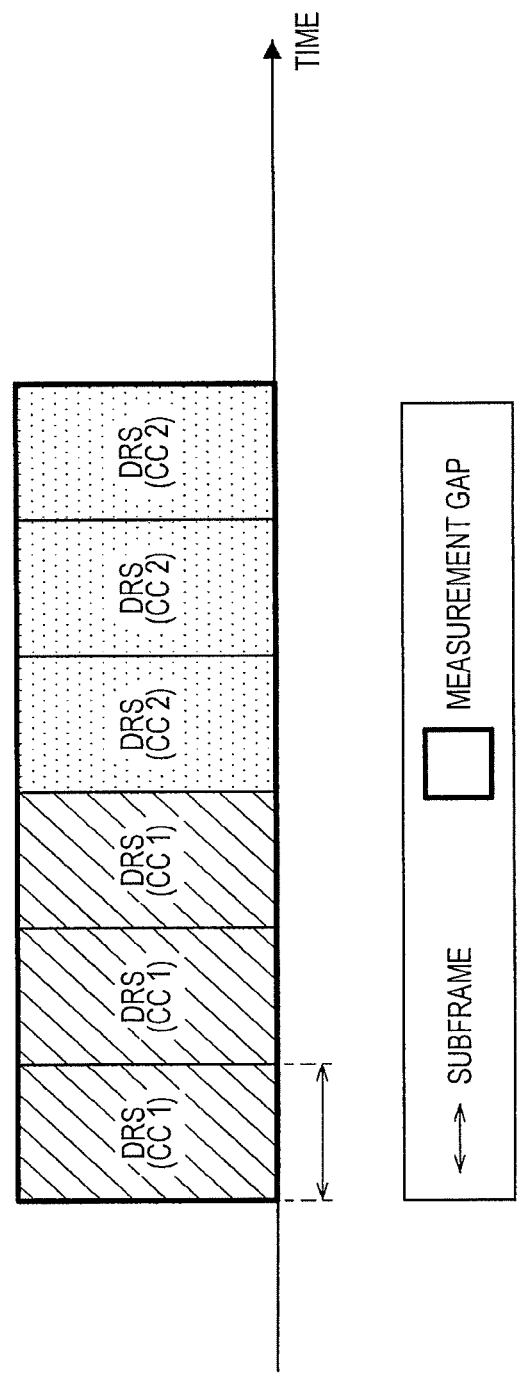
FIG. 23 is an explanatory diagram for describing a first example of measurement according to the second embodiment.

FIG. 23 is an explanatory diagram for describing a first example of measurement according to the second embodiment. Referring to FIG. 23, a measurement gap having a length of 6 subframes is shown. In this example, the measurement unit 153 performs measurement of a CC1 based on a DRS transmitted in the CC1 (a first frequency band) within a period (a first period) from a 1st subframe to a 3rd subframe within the measurement gap. In addition, the measurement unit 153 performs measurement of a CC2 based on a DRS transmitted in the CC2 (a second frequency band) within a period (a second period) from a 4th subframe to a 6th subframe within the measurement gap.

When measurement of the first frequency band and measurement of the second frequency band are collectively performed using the measurement gap, for example, it is possible to perform measurement of the first frequency band and measurement of the second frequency band using fewer measurement gaps. Therefore, measurement based on a DRS (that is, inter-frequency measurement of a frequency band that is used by a base station of a small cell) may be efficiently performed. As a specific example, measurement based on a DRS may be performed more quickly.

In addition, as described above, when measurement based on a DRS is performed using a short period, it is possible to actually perform measurement of two frequency bands for two or more frequency bands) using the same measurement gap.

(f) Measurement of Additional Frequency Band

The measurement gap may include an additional period. The measurement unit 153 may perform measurement of an additional frequency band based on a DRS transmitted in the additional frequency band within the additional period. Hereinafter, this will be described with reference to a specific example of FIG. 24.

Figure 24:
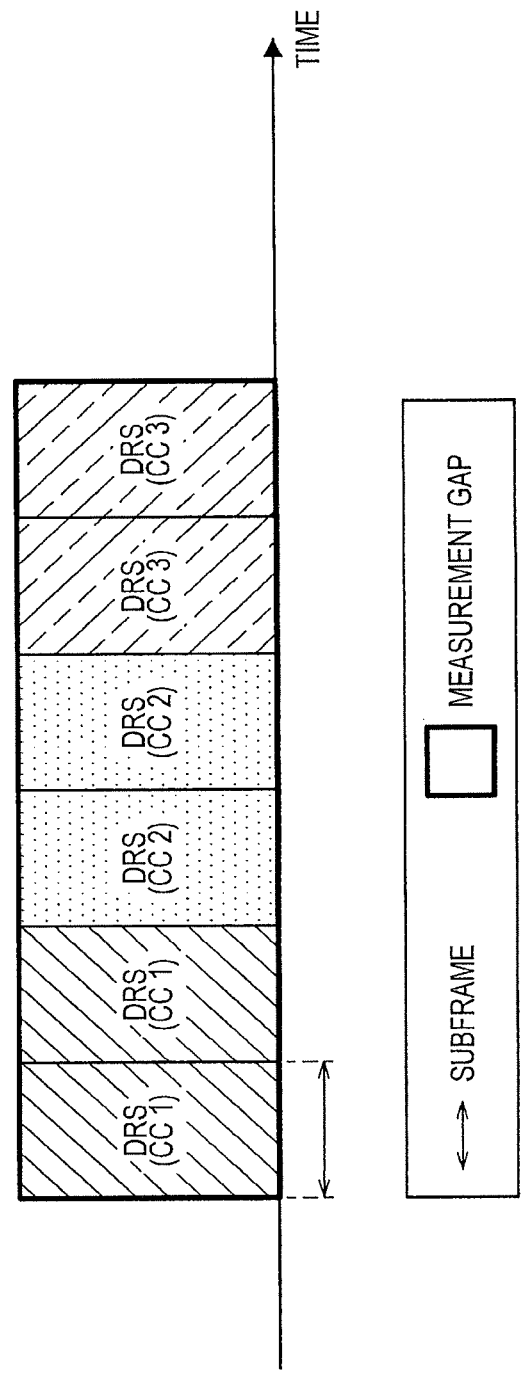
FIG. 24 is an explanatory diagram for describing a second example of measurement according to the second embodiment.

FIG. 24 is an explanatory diagram for describing a second example of measurement according to the second embodiment. Referring to FIG. 24, a measurement gap having a length of 6 subframes is shown. In this example, the measurement unit 153 performs measurement of a CC1 based on a DRS transmitted in the CC1 (a first frequency band) within a period (a first period) including a 1st subframe and a 2nd subframe within the measurement gap. In addition, the measurement unit 153 performs measurement of a CC2 based on a DRS transmitted in the CC2 (a second frequency band) within a period (a second period) including a 3rd subframe and a 4th subframe within the measurement gap. Further, the measurement unit 153 performs measurement of a CC3 based on a DRS transmitted in the CC3 (an additional frequency band) within a period (an additional period) including a 5th subframe and a 6th subframe within the measurement gap.

Accordingly, measurement based on a DRS (that is, inter-frequency measurement) may be further efficiently performed.

While an example in which the measurement gap includes one additional period and the measurement unit 153 performs measurement of one additional frequency band has been described, it should be understood that the second embodiment is not limited thereto. The measurement gap may include two or more additional periods and the measurement unit 153 may perform measurement of two or more additional frequency bands.

(g) Measurement Based on CRS and DRS

The measurement unit 153 may perform the measurement of the first frequency band that is used by the same base station based on a DRS and a CRS transmitted by the same base station in the first frequency band within the first period. Additionally or alternatively, the measurement unit 153 may perform the measurement of the second frequency band that is used by the same base station based on a DRS and a CRS transmitted by the same base station in the second frequency band within the second period. In this case, the first period may be a period shorter than 6 milliseconds.

As a specific example, a base station of a small cell in the on state transmits both a DRS and a CRS in the first frequency band. In this case, the measurement unit 153 may perform measurement of the first frequency band that is used by the base station based on the DRS and the CRS transmitted by the base station in the first frequency band within the first period. Hereinafter, hereinafter, this will be described with reference to a specific example of FIG. 25.

Figure 25:
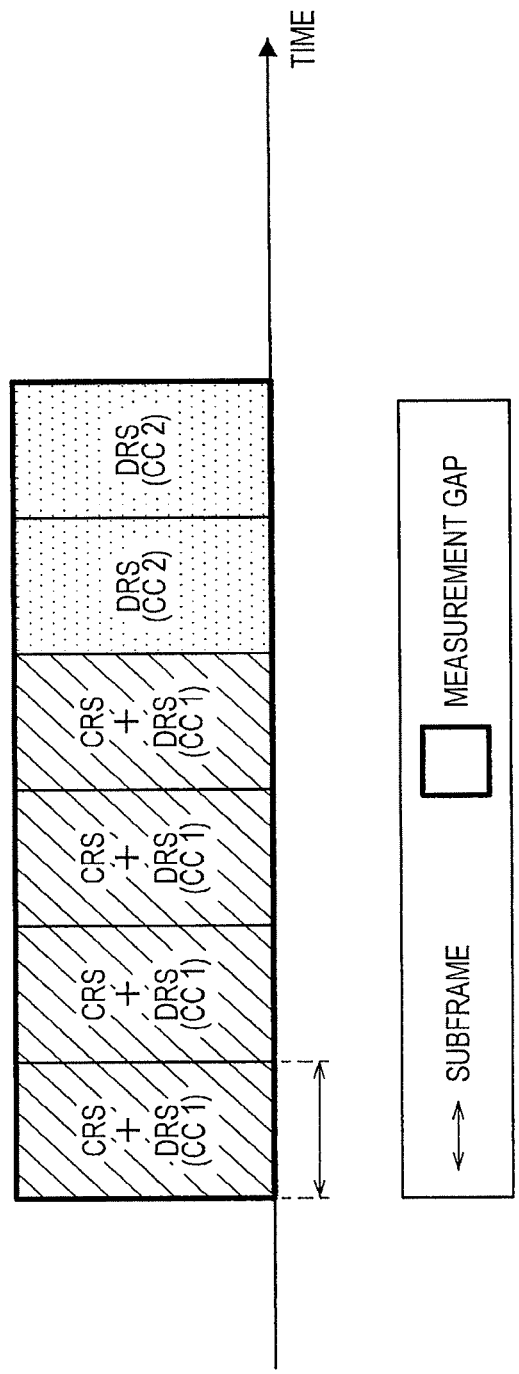
FIG. 25 is an explanatory diagram for describing a third example of measurement according to the second embodiment.

FIG. 25 is an explanatory diagram for describing a third example of measurement according to the second embodiment. Referring to FIG. 25, a measurement gap having a length of 6 subframes is shown. In this example, the measurement unit 153 performs measurement of a CC1 based on a DRS and a CRS transmitted by the same base station using the CC1 (a first frequency band) within a period (a first period) from a 1st subframe to a 4th subframe within the measurement gap. In addition, the measurement unit 153 performs measurement of a CC2 based on a DRS transmitted in the CC2 (a second frequency band) within a period (a second period) including a 5th subframe and a 6th subframe within the measurement gap.

Accordingly, for example, measurement of the first frequency band or the second frequency band (that is, inter-frequency measurement) is performed based on more reference signals. Therefore, the measurement of the first frequency band or the second frequency band used by the base station may be performed using a shorter period than when it is performed based on only a CRS. Therefore, measurement of the first frequency band and measurement of the second frequency band (that is, measurement of a frequency band that is used by a base station of a small cell in the on state and measurement of a frequency band that is used by a base station of another small cell) may be performed using the same measurement gap.

(h) Priority

Measurement Based on Priority

For example, the measurement unit 153 performs measurement of a frequency group and measurement of one or more other frequency bands or measurement of one or more other frequency groups based on a priority of the frequency group including the first frequency band and the second frequency band and a priority of the one or more other frequency bands or a priority of the one or more other frequency groups.

As a specific example, a frequency group or a frequency band having a higher priority is sequentially selected from among the frequency group including the first frequency band and the second frequency band, the one or more other frequency bands, and the one or more other frequency groups. Then, the measurement unit 153 performs measurement of the selected frequency group or frequency band.

As an example, the priority of the frequency band is a priority included in an inter-frequency NCL contained in the SIB5. As another example, the priority of the frequency band may be a priority that is decided by the terminal device 100-2.

The priority of the frequency group (and/or a priority of each of the one or more other frequency groups) may be decided in consideration of power consumption and/or a communication request of the terminal device 100-2. As an example, when suppression of power consumption is requested, the priority of the frequency group may be higher. This is because, when the priority of the frequency group is high, measurement of more frequency bands is performed using a measurement gap. As another example, when high throughput is requested, the priority of the frequency group may be lower. This is because, when the priority of the frequency group is low, measurement of a frequency band that is used by a base station of a cell in the on state is preferentially performed, and, as a result, a handover is preferentially performed without a transition time.

Measurement in Consideration of Transmission Period of DRS

For example, the measurement unit 153 performs the measurement of the frequency group, and the measurement of the one or more other frequency bands or the measurement of the one or more other frequency groups in consideration of a transmission period in which a DRS is transmitted in the first frequency band. As a specific example, the measurement unit 153 performs measurement of another frequency band or another frequency group whose priority is lower than the frequency group before the measurement of the frequency group outside of the transmission period.

Accordingly, for example, measurement may be performed more smoothly without wasting the measurement gap.

(Reporting Unit 155)

The reporting unit 155 reports a result of measurement of the frequency band to the base station 200-2.

For example, the reporting unit 155 reports a result of measurement of the first frequency band to the base station 200-2. In addition, for example, the reporting unit 155 reports a result of measurement of the second frequency band to the base station 200-2. In addition, the frequency group may include an additional frequency band, and the reporting unit 155 may report a result of measurement of the additional frequency band to the base station 200-2.

4.2. Configuration of Base Station

Figure 26:
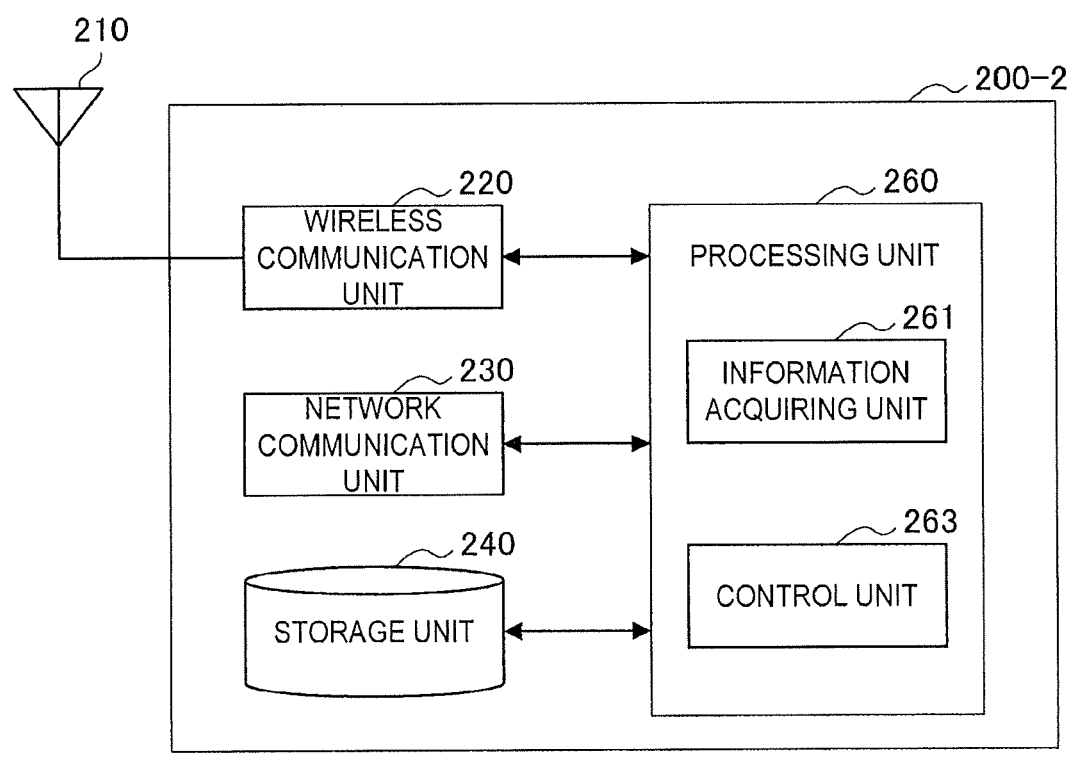
FIG. 26 is a block diagram illustrating an example of a configuration of a base station according to the second embodiment.

Next, an example of a configuration of the base station 200-2 according to the second embodiment will be described with reference to FIG. 26. FIG. 26 is a block diagram illustrating an example of a configuration of the base station 200-2 according to the second embodiment. Referring to FIG. 26, the base station 200-2 includes an antenna unit 210, a wireless communication unit 220, a network communication unit 230, a storage unit 240, and a processing unit 260.

There is no difference in descriptions of the antenna unit 210, the wireless communication unit 220, the network communication unit 230 and the storage unit 240 between the first embodiment and the second embodiment except for different reference numerals. Therefore, redundant descriptions will be omitted here, and only the processing unit 260 will be described.

(Processing Unit 260)

The processing unit 260 provides various functions of the base station 200-2. The processing unit 260 includes an information acquiring unit 261 and a control unit 263. The processing unit 260 may further include any other component in addition to the above-mentioned components. In other words, the processing unit 260 may also perform an operation other than operations of the above-mentioned components.

(Information Acquiring Unit 261)

(a) Frequency Group

The information acquiring unit 261 acquires information indicating a first frequency band in which a DRS is transmitted within at least a first period included in a measurement gap.

For example, the measurement gap further includes a second period in which a reference signal is transmitted in a second frequency band.

Specifically, in the second embodiment, the information acquiring unit 261 acquires information indicating the frequency group including the first frequency band and the second frequency band. The second frequency band is a frequency band in which a DRS is transmitted within at least a second period included in the measurement gap.

More specifically, for example, a control entity 300-2 decides the frequency group and notifies the base station 200-2 of the frequency group. Then, the information indicating the frequency group is stored in the storage unit 240. The information acquiring unit 261 acquires the information indicating the frequency group at any time thereafter.

(b) Measurement Gap

Further, for example, the information acquiring unit 261 acquires information indicating the measurement gap.

More specifically, for example, the control entity 300-2 decides the measurement gap and notifies the base station 200-2 of the measurement gap. Then, information indicating the measurement gap is stored in the storage unit 240. The information acquiring unit 261 acquires the information indicating the measurement gap at any time thereafter.

Alternatively, the measurement gap is decided by a device other than the control entity 300-2 and the base station 200-2 may be notified thereof. Alternatively, the measurement gap is decided by the base station 200-2, and may be stored in the storage unit 240.

(Control Unit 263)

(a) Notification of Frequency Group and Measurement Gap

The control unit 263 notifies the terminal device 100-2 of the first frequency band and the measurement gap. Specifically, in the second embodiment, the control unit 263 notifies the terminal device 100-2 of the frequency group including the first frequency band and the second frequency band and the measurement gap.

As a specific example, the control unit 263 transmits information indicating the frequency group and information indicating the measurement gap to the terminal device 100-2 through the antenna unit 210 and the wireless communication unit 220. As an example, the control unit 263 transmits an RRC connection reconfiguration message including a measurement configuration including the information indicating the frequency group and the information indicating the measurement gap to the terminal device 100-2 through the antenna unit 210 and the wireless communication unit 220.

(b) Priority Notification

For example, the control unit 263 notifies the terminal device 100-2 of a priority of the frequency group and a priority of one or more other frequency bands or a priority of one or more other frequency groups.

As a specific example, the control unit 263 transmits information indicating the priority of the frequency group and the priority of one or more other frequency bands or the priority of one or more other frequency groups to the terminal device 100-2 through the antenna unit 210 and the wireless communication unit 220. As an example, the information is included in the inter-frequency NCL within the SIB5, and the control unit 263 informs the terminal device 100-2 of the SIB5 including the inter-frequency NCL through the antenna unit 210 and the wireless communication unit 220.

4.3. Configuration of Control Entity

Figure 27:
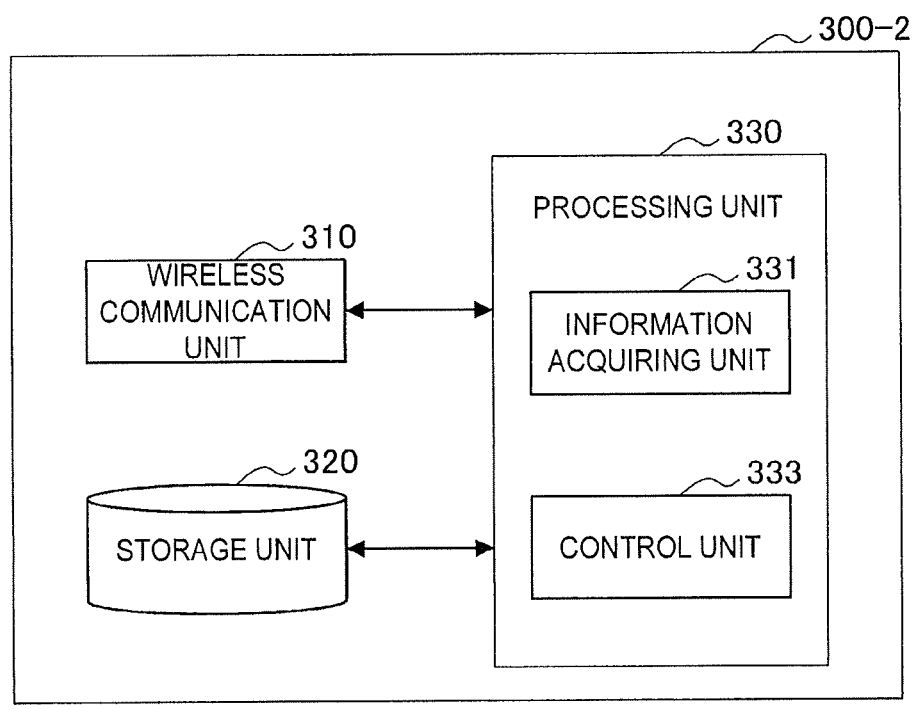
FIG. 27 is a block diagram illustrating an example of a configuration of a control entity according to the second embodiment.

Next, an example of a configuration of the control entity 300-2 according to the second embodiment will be described with reference to FIG. 27. FIG. 27 is a block diagram illustrating an example of a configuration of the control entity 300-2 according to the second embodiment. Referring to FIG. 27, the control entity 300-2 includes a communication unit 310, a storage unit 320, and a processing unit 330.

(Communication Unit 310)

The communication unit 310 communicates with other nodes. For example, the communication unit 310 communicates with a core network node and a base station. For example, the communication unit 310 communicates with the base station 200-2.

(Storage Unit 320)

The storage unit 320 temporarily or permanently stores a program and data for an operation of the control entity 300-2.

(Processing Unit 330)

The processing unit 330 provides various functions of the control entity 300-2. The processing unit 330 includes an information acquiring unit 331 and a control unit 333. The processing unit 330 may further include any other component in addition to the above-mentioned components. In other words, the processing unit 330 may also perform an operation other than operations of the above-mentioned components.

(Information Acquiring Unit 331)

The information acquiring unit 331 acquires information about two or more frequency bands in which a DRS is transmitted.

Each of the two or more frequency bands is a frequency band that is used by a base station of a small cell. When a base station of a small cell in the off state transmits a DRS and a base station of a small cell in the on state does not transmit a DRS, each of the two or more frequency bands is a frequency band that is used by the base station of the small cell in the off state. Conversely, when a base station of a small cell transmits a DRS regardless of an on/off state, each of the two or more frequency bands is a frequency band that is used by the base station of the small cell.

(Control Unit 333)

(a) Decision of Frequency Group

The control unit 333 decides a frequency group including at least a first frequency band and a second frequency band among the two or more frequency bands.

The first frequency band is a frequency band in which a DRS is transmitted within at least a first period included in a measurement gap. In addition, the second frequency band is a frequency band in which a DRS is transmitted within at least a second period included in the measurement gap.

In addition, for example, the control unit 333 decides the measurement gap.

(a-1) First Method

For example, as a first method, the control unit 333 controls a transmission period in which a DRS is transmitted in a first frequency band such that the DRS is transmitted in the first frequency band within at least the first period or controls a transmission period in which a DRS is transmitted in a second frequency band such that the DRS is transmitted in the second frequency band within at least the second period.

More specifically, for example, the control unit 333 decides a frequency group including at least the first frequency band and the second frequency band among the two or more frequency bands. For example, the frequency group is any frequency band among the two or more frequency bands and the number thereof is equal to or less than a predetermined maximum number. For example, when a measurement gap has a length of M subframes (for example, 6 subframes) and a period used for measurement based on a DRS is N subframes (for example, 3 subframes), the predetermined maximum number is M/N (for example, 2). Further, the control unit 333 decides the measurement gap. Then, the control unit 333 instructs a base station that transmits a DRS in each of the frequency bands included in the frequency group to transmit the DRS during the measurement gap. For example, the control unit 333 instructs a base station that transmits a DRS in the first frequency band and a base station that transmits a DRS in the second frequency band to transmit the DRSs during the measurement gap.

Accordingly, for example, it is possible to more reliably perform measurement of two or more frequency bands using the same measurement gap.

(a-2) Second Method

As a second method, the information about the two or more frequency bands (that is, information acquired by the information acquiring unit 331) may include information indicating a transmission period in which a DRS is transmitted in each of the two or more frequency bands. Then, the control unit 333 may decide the frequency group based on the transmission period.

More specifically, for example, based on the information indicating a transmission period in which a DRS is transmitted in each of the two or more frequency bands, the control unit 333 decides at least two frequency bands whose transmission periods of the DRSs are the same (or similar) among the two or more frequency bands as a frequency group. The control unit 333 decides frequency bands whose number is equal to or less than a predetermined maximum number as a frequency group. In addition, the control unit 333 decides a measurement gap that overlaps the transmission period of the DRS.

Accordingly, for example, it is possible to perform measurement of each of the two or more frequency bands using the same measurement gap without the control entity 300-2 instructing a base station.

(b) Provide Notification to Base Station 200-2

For example, the control unit 333 notifies the base station 200-2 of the frequency group. In addition, for example, the control unit 333 notifies the base station 200-2 of the measurement gap.

As a specific example, the control unit 333 transmits a message including information indicating the frequency group and information indicating the measurement gap to the base station 200-2 through the communication unit 310.

4.4. Process Flow

Next, examples of processes according to the second embodiment will be described with reference to FIG. 28 to FIG. 30.

(Overall Process Flow)

Figure 28:
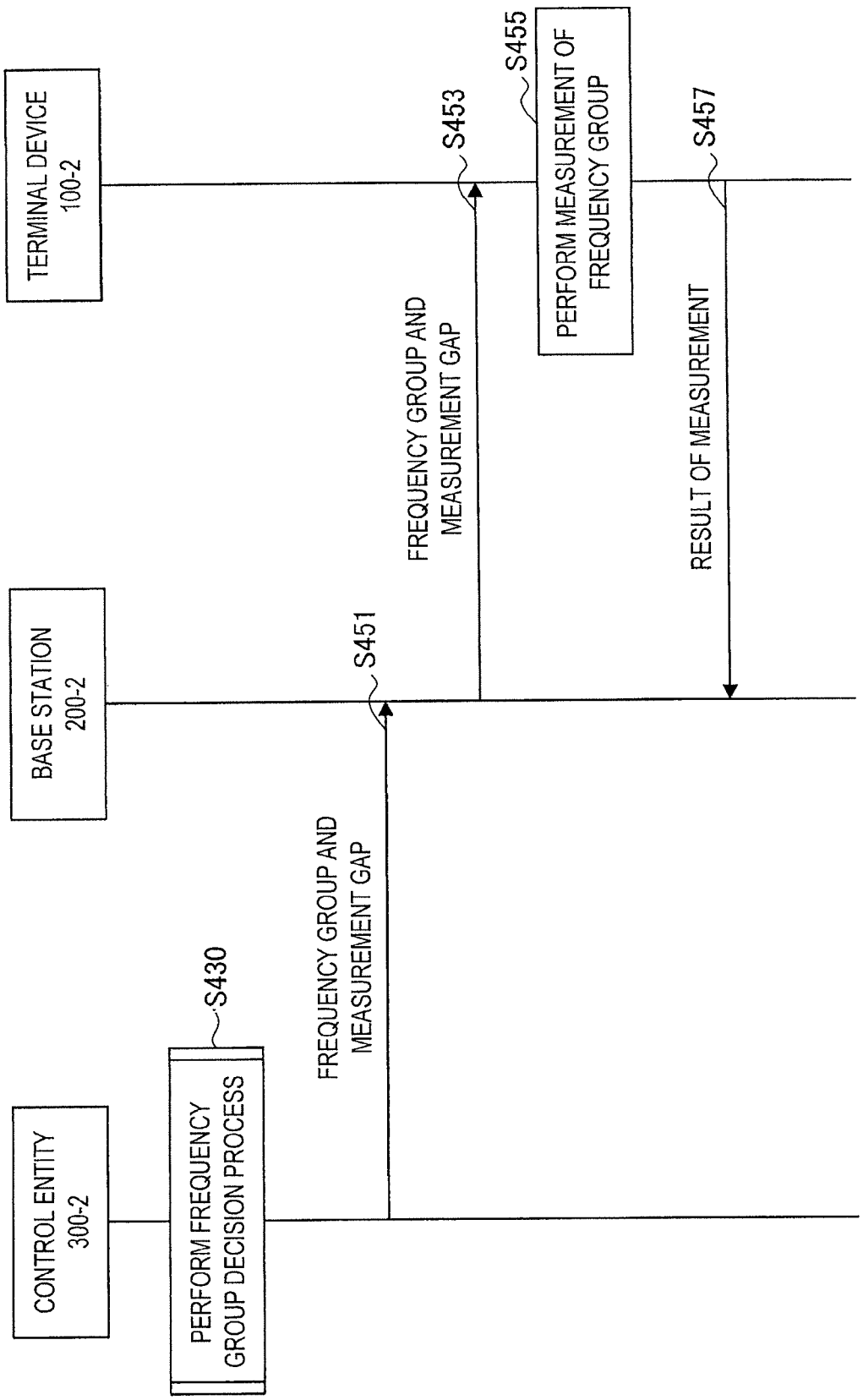
FIG. 28 is a sequence diagram illustrating an example of a schematic flow of a process according to the second embodiment.

FIG. 28 is a sequence diagram illustrating an example of a schematic flow of a process according to the second embodiment.

The control entity 300-2 performs a frequency group decision process (S430). That is, the control entity 300-2 (the control unit 333) decides a frequency group including at least a first frequency band and a second frequency band among two of more frequency bands in which a DRS is transmitted. In addition, for example, the control entity 300-2 decides a measurement gap that is used for measurement of the frequency group.

Then, the control entity 300-2 notifies the base station 200-2 of the frequency group and the measurement gap (S451).

Further, the base station 200-2 notifies the terminal device 100-2 of the frequency group and the measurement gap (S453).

Then, the terminal device 100-2 (the measurement unit 153) performs measurement of the frequency group (S455). Specifically, the measurement unit 153 performs measurement of the first frequency band based on a DRS transmitted in the first frequency band within a first period included in the measurement gap. In addition, the measurement unit 153 performs measurement of the second frequency band based on a reference signal transmitted in the second frequency band within a second period included in the measurement gap.

Then, the terminal device 100-2 (the reporting unit 155) reports a result of measurement of the frequency band to the base station 200-2 (S457).

(Frequency Group Decision Process)
(a) First Example

Figure 29:
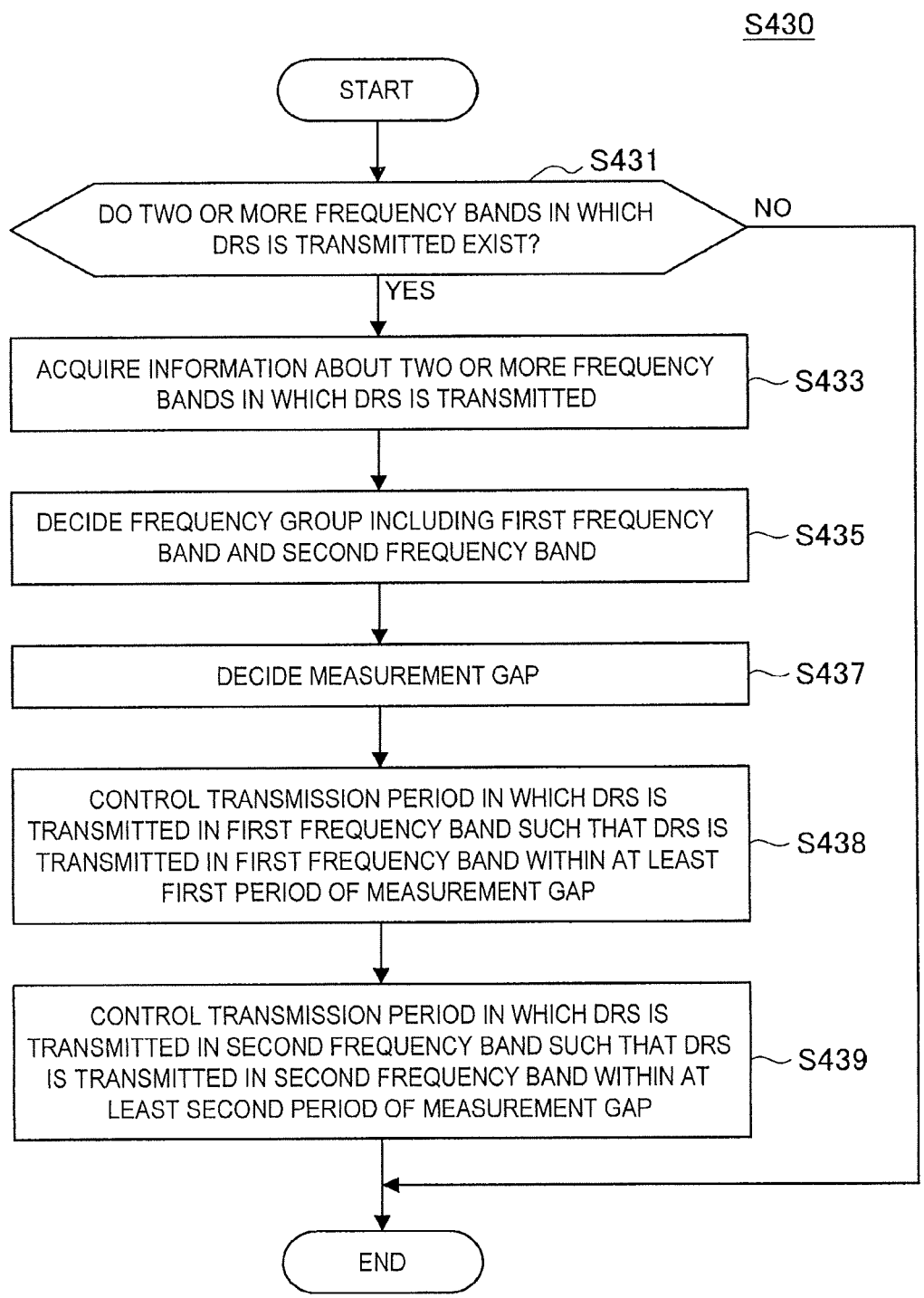
FIG. 29 is a sequence diagram illustrating a first example of a schematic flow of a frequency group decision process according to the second embodiment.

FIG. 29 is a sequence diagram illustrating a first example of a schematic flow of a frequency group decision process according to the second embodiment.

The processing unit 330 determines whether two or more frequency bands in which a DRS is transmitted exist (S431). When two or more frequency bands do not exist (NO in S431), the process ends.

When two or more frequency bands in which a DRS is transmitted exist (YES in S431), the information acquiring unit 331 acquires information about the two or more frequency bands in which a DRS is transmitted (S433).

Then, the control unit 333 decides a frequency group including at least a first frequency band and a second frequency band among the two or more frequency bands (S435).

In addition, the control unit 333 decides a measurement gap (S437).

Then, the control unit 333 controls a transmission period in which a DRS is transmitted in the first frequency band such that the DRS is transmitted in the first frequency band within at least a first period included in the measurement gap (S438). For example, the control unit 333 instructs a base station that transmits a DRS in the first frequency band to transmit the DRS during the measurement gap.

In addition, the control unit 333 controls a transmission period in which a DRS is transmitted in the second frequency band such that the DRS is transmitted in the second frequency band within at least a second period included in the measurement gap (S439). For example, the control unit 333 instructs a base station that transmits a DRS in the second frequency band to transmit the DRS during the measurement gap. Then, the process ends.

(b) Second Example

Figure 30:
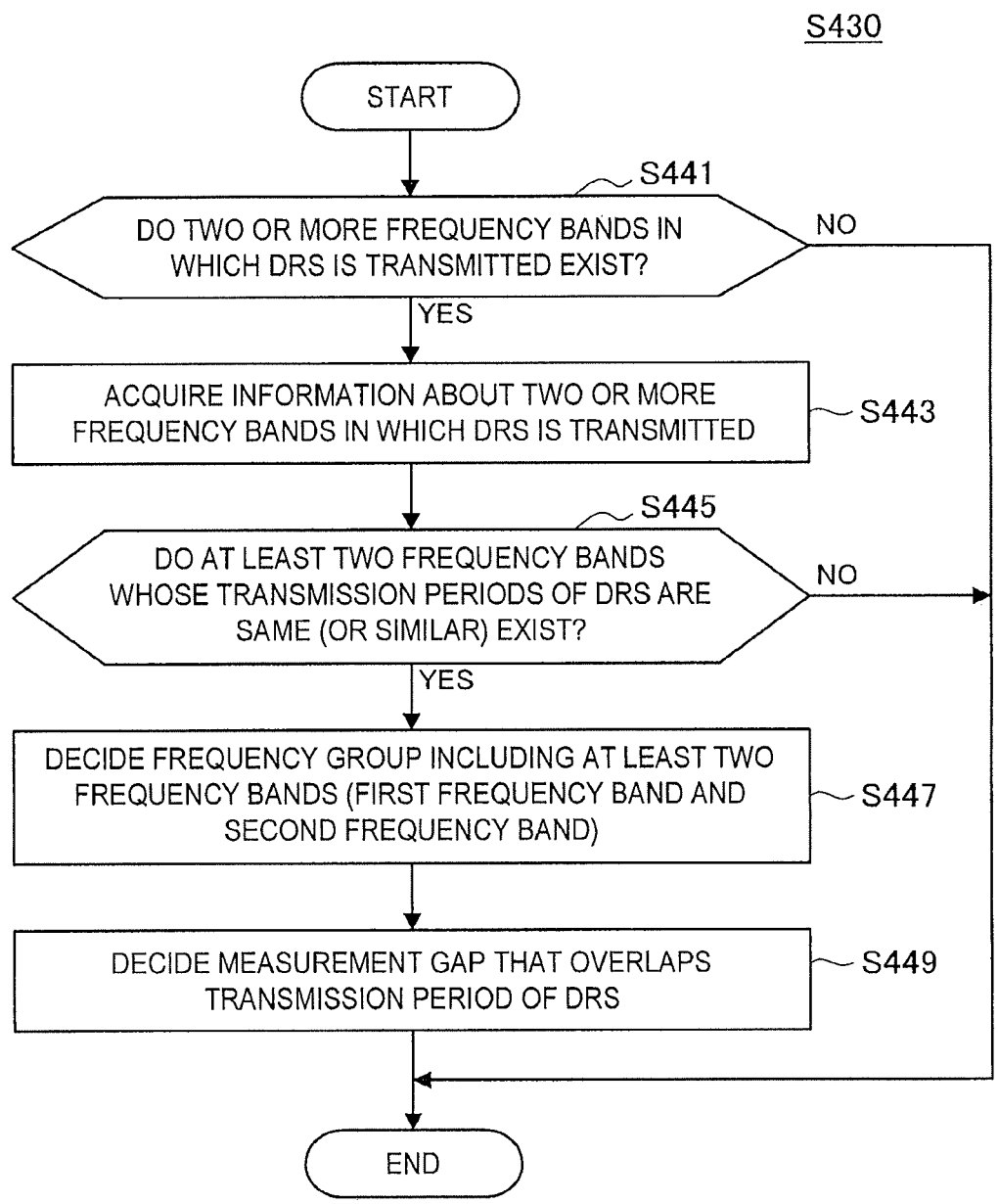
FIG. 30 is a sequence diagram illustrating a second example of a schematic flow of a frequency group decision process according to the second embodiment.

FIG. 30 is a sequence diagram illustrating a second example of a schematic flow of a frequency group decision process according to the second embodiment.

The processing unit 330 determines whether two or more frequency bands in which a DRS is transmitted exist (S441). When two or more frequency bands do not exist (NO in S441), the process ends.

When two or more frequency bands in which a DRS is transmitted exist (YES in S441), the information acquiring unit 331 acquires information about the two or more frequency bands in which a DRS is transmitted (S443). The information about the two or more frequency bands includes information indicating a transmission period in which a DRS is transmitted in each of the two or more frequency bands.

Then, the control unit 333 determines whether at least two frequency bands whose transmission periods of a DRS are the same (or similar) are included in the two or more frequency bands (S445). When the at least two frequency bands are not included (NO in S445), the process ends.

When the at least two frequency bands are included (YES in S445), the control unit 333 decides a frequency group including at least two frequency bands (at least a first frequency band and a second frequency band) whose transmission periods of a DRS are the same (or similar) among the two or more frequency bands (S447).

In addition, the control unit 333 decides a measurement gap that overlaps the transmission period of the DRS (S449). Then, the process ends.

4.5. First Modification Example

Next, a first modification example of the second embodiment will be described.

In the first modification example of the second embodiment, the base station 200-2 decides the frequency group (and the measurement gap) instead of the control entity 300-2. Then, the base station 200-2 notifies the terminal device 100-2 of the frequency group (and the measurement gap) it decided.

For example, in the first modification example of the second embodiment, the processing unit 260 of the base station 200-2 further includes the information acquiring unit 331 and the control unit 333.

4.6. Second Modification Example

Next, a second modification example of the second embodiment will be described.

In the first modification example of the second embodiment, the terminal device 100-2 decides the frequency group (and the measurement gap) instead of the control entity 300-2. Then, the base station 200-2 performs measurement of the frequency group it decided.

(Terminal Device 100-2: Processing Unit 150)

In the second modification example of the second embodiment, the processing unit 150 decides a frequency group including at least a first frequency band and a second frequency band among two or more frequency bands in which a DRS is transmitted. In addition, for example, the processing unit 150 decides a measurement gap that is used for measurement of the frequency group.

As a specific example, the base station 200-2 notifies the terminal device 100-2 of two or more frequency bands in which a DRS is transmitted. For example, the base station 200-2 informs of the inter-frequency NCL (SIB5) including information indicating whether a DRS is transmitted for each frequency band and a transmission period of a DRS. For example, the processing unit 150 decides at least two frequency bands whose transmission periods of a DRS are the same (or similar) among the two or more frequency bands as a frequency group based on information about the transmission period. The processing unit 150 decides frequency bands whose number is equal to or less than a predetermined maximum number as a frequency group. In addition, the processing unit 150 decides a measurement gap that overlaps the same transmission period.

(Terminal Device 100-2: Information Acquiring Unit 151)

As described above, the information acquiring unit 151 acquires information indicating the frequency group including the first frequency band and the second frequency band. In addition, the information acquiring unit 151 acquires information indicating the measurement gap.

In the second modification example of the second embodiment, for example, as described above, the processing unit 150 decides the frequency group and the measurement gap. Then, the information acquiring unit 151 acquires information indicating the decided frequency group and information indicating the decided measurement gap.

5. Third Embodiment

Next, a third embodiment of the present disclosure will be described with reference to FIG. 31 to FIG. 40.

The terminal device 100-3 according to the third embodiment performs measurement of a first frequency band based on a discovery reference signal transmitted in the first frequency band within a first period included in a measurement gap, and performs measurement of a second frequency band based on a reference signal transmitted in the second frequency band within a second period included in the measurement gap. Specifically, in the third embodiment, the measurement gap is an extended measurement gap. Accordingly, for example, it is possible to improve measurement performed by the terminal device 100-3.

5.1. Configuration of Terminal Device

Figure 31:
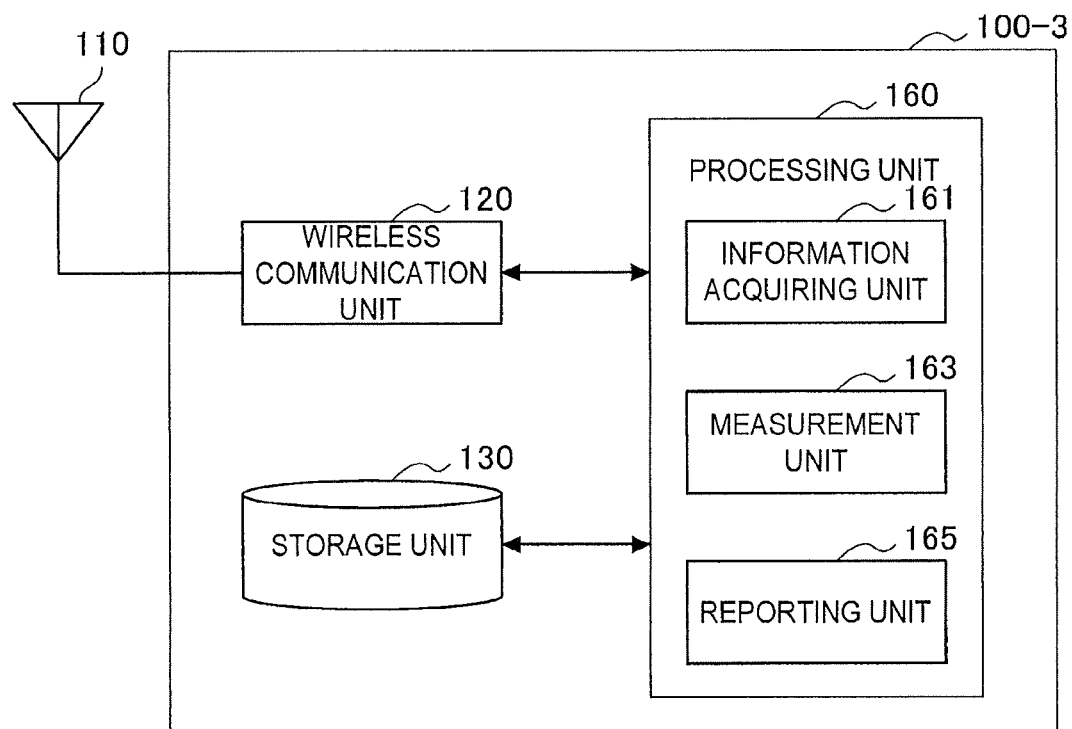
FIG. 31 is a block diagram illustrating an example of a configuration of a terminal device according to a third embodiment.

First, examples of configurations of the terminal device 100-3 according to the third embodiment will be described with reference to FIG. 31 to FIG. 35. FIG. 31 is a block diagram illustrating an example of a configuration of the terminal device 100-3 according to the third embodiment. As illustrated in FIG. 31, the terminal device 100-3 includes the antenna unit 110, the wireless communication unit 120, the storage unit 130 and a processing unit 160.

There is no difference in descriptions of the antenna unit 110, the wireless communication unit 120 and the storage unit 130 between the first embodiment and the third embodiment except for different reference numerals. Therefore, redundant descriptions will be omitted here, and only the processing unit 160 will be described.

(Processing Unit 160)

The processing unit 160 provides various functions of the terminal device 100-3. The processing unit 160 includes an information acquiring unit 161, a measurement unit 163 and a reporting unit 165. The processing unit 160 may further include a component other than these components. That is, the processing unit 160 may also perform an operation other than operations of these components.

(Information Acquiring Unit 161)

The information acquiring unit 161 acquires information indicating a first frequency band in which a DRS is transmitted within at least a first period included in a measurement gap. For example, the information acquiring unit 161 acquires information indicating a frequency group including the first frequency band and a second frequency band. Specifically, in the third embodiment, the measurement gap is an extended measurement gap. In addition, for example, the second frequency band is a frequency band in which a reference signal is transmitted within at least a second period included in the measurement gap (that is, the extended measurement gap).

In addition, the information acquiring unit 161 acquires information indicating the measurement gap. The measurement gap (that is, the extended measurement gap) will be described below in detail.

For example, a base station 200-3 notifies the terminal device 100-3 of the first frequency band (or the frequency group) and the measurement gap. As a specific example, the base station 200-3 transmits information indicating the first frequency band (or the frequency group) and information indicating the measurement gap to the terminal device 100-3. As an example, the base station 200-3 transmits an RRC connection reconfiguration message including a measurement configuration including the information indicating the first frequency band (or the frequency group) and the information indicating the measurement gap to the terminal device 100-3. Then, the information acquiring unit 161 acquires the information indicating the first frequency band (or the frequency group) and the information indicating the measurement gap.

(Measurement Unit 163)

The measurement unit 163 performs measurement of a frequency band.

In the third embodiment, the measurement unit 163 performs measurement of a first frequency band based on a DRS transmitted in the first frequency band within a first period included in a measurement gap. In addition, the measurement unit 163 performs measurement of a second frequency band based on a reference signal transmitted in the second frequency band within a second period included in the measurement gap. Accordingly, for example, it is possible to improve measurement performed by the terminal device 100-3.

(a) Frequency Band

Component Carrier (CC)

For example, each of the first frequency band and the second frequency band is a component carrier (CC) of carrier aggregation.

Frequency Band of Small Cell

For example, each of the first frequency band and the second frequency band is a frequency band that is used by a base station of a small cell.

Frequency Band that is not used

For example, each of the first frequency band and the second frequency band is a frequency band that is not used by the terminal device 100-3.

In view of the above points, for example, each of the first frequency band and the second frequency band is a CC that is used by a base station of a small cell, and the CC is not used by the terminal device 100-3.

(b) Measurement

The measurement of the first frequency band and the measurement of the second frequency band are RRM measurement, for example, measurement of reception power or reception quality. As a specific example, the measurement of the first frequency band and the measurement of the second frequency band are measurement of RSRP or RSRQ.

In addition, for example, measurement is performed in units of a combination of a frequency band and a cell (a base station). For example, the measurement of the first frequency band is performed for each cell in which the first frequency band is used (that is, a base station that uses the first frequency band). In addition, for example, the measurement of the second frequency band is performed for each cell in which the second frequency band is used (that is, a base station that uses the second frequency band).

(c) Reference Signal

For example, the reference signal transmitted in the second frequency band is a CRS. That is, the measurement unit 163 performs measurement of the first frequency band in which a DRS is transmitted and measurement of the second frequency band in which a CRS is transmitted using the measurement gap.

Alternatively, the reference signal transmitted in the second frequency band may be a DRS.

The DRS is a reference signal that is transmitted by a base station of the small cell in the off state. The DRS may also be referred to as a discovery signal (DR).

(d) Measurement Gap

Specifically, in the third embodiment, the measurement gap is an extended measurement gap. More specifically, for example, the extended measurement gap is a period longer than 6 milliseconds (ms). For example, a general measurement gap (that is, a measurement gap that is not extended) is a period having a length of 6 ms.

Further, for example, the first period is a period shorter than the second period. As described above, for example, since the reference signal transmitted in the second frequency band within the second period is a CRS, a shorter period is used for measurement of the first frequency band based on a DRS than measurement of the second frequency band based on a CRS.

(e) Specific Example of Measurement

Hereinafter, examples of measurement according to the third embodiment will be described with reference to FIG. 32 and FIG. 33.

Figure 32:
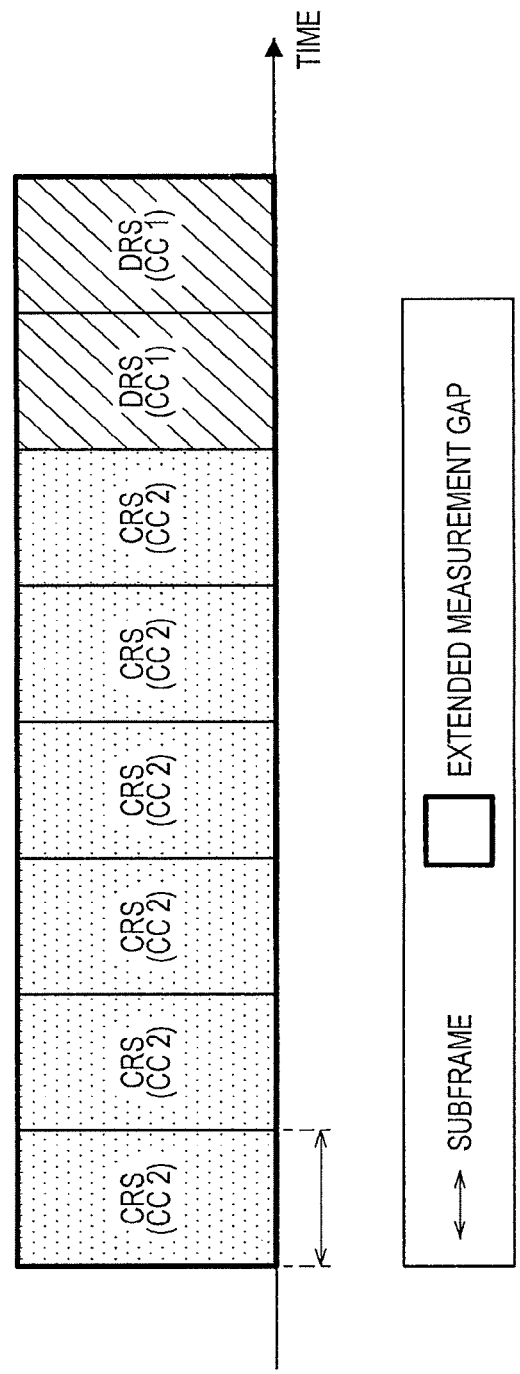
FIG. 32 is an explanatory diagram for describing a first example of measurement according to the third embodiment.

FIG. 32 is an explanatory diagram for describing a first example of measurement according to the third embodiment. Referring to FIG. 32, an extended measurement gap having a length of 8 subframes is shown. In this example, the measurement unit 163 performs measurement of a CC2 based on a CRS transmitted in the CC2 (a second frequency band) within a period (a second period) from a 1st subframe to a 6th subframe within the extended measurement gap. In addition, the measurement unit 163 performs measurement of a CC1 based on a DRS transmitted in the CC1 (a first frequency band) within a period (a first period) including a 7th subframe and an 8th subframe within the extended measurement gap.

Figure 33:
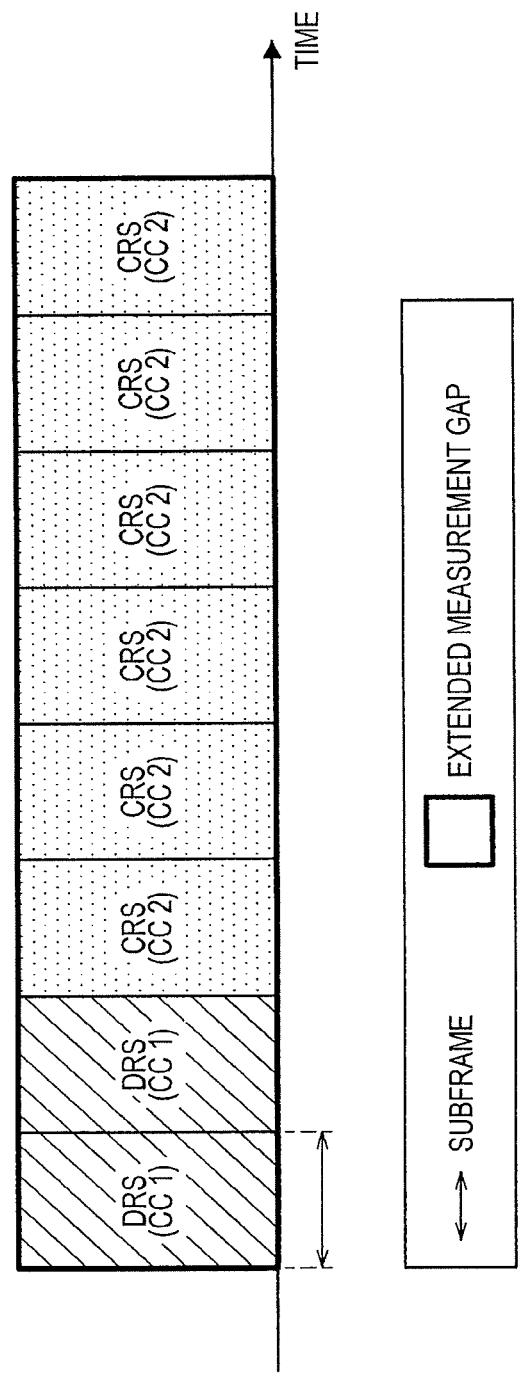
FIG. 33 is an explanatory diagram for describing a second example of measurement according to the third embodiment.

FIG. 33 is an explanatory diagram for describing a second example of measurement according to the third embodiment. Referring to FIG. 33, an extended measurement gap having a length of 8 subframes is shown. In this example, the measurement unit 163 performs measurement of a CC1 based on a DRS transmitted in the CC1 (a first frequency band) within a period (a first period) including a 1st subframe and a 2nd subframe within the extended measurement gap. In addition, the measurement unit 163 performs measurement of a CC2 based on a CRS transmitted in the CC2 (a second frequency band) within a period (a second period) from a 3rd subframe to an 8th subframe within the extended measurement gap.

When measurement of the first frequency band and measurement of the second frequency band are collectively performed using the extended measurement gap, for example, it is possible to perform measurement of the first frequency band and measurement of the second frequency band using fewer measurement gaps. For example, the terminal device 100-3 can perform measurement of the first frequency band based on a DRS while performing measurement of the second frequency band based on a CRS. Alternatively, the terminal device 100-3 can perform measurement of the second frequency band based on a CRS while performing measurement of the first frequency band based on a DRS. Therefore, measurement based on the DRS (that is, inter-frequency measurement of a frequency band that is used by a base station of a small cell) may be efficiently performed. As a specific example, measurement based on the DRS may be performed more quickly.

In addition, as described above, when measurement based on a DRS is performed using a short period, the extended measurement gap may be shortened. That is, a period in which transmission of a signal from the terminal device 100-3 and transmission of a signal to the terminal device 100-3 are not continuous may be shortened.

(f) Measurement of Additional Frequency Band

The measurement gap (that is, the extended measurement gap) may include an additional period. The measurement unit 163 may perform measurement of an additional frequency band based on a DRS transmitted in the additional frequency band within the additional period. Hereinafter, this will be described with reference to a specific example of FIG. 34.

Figure 34:
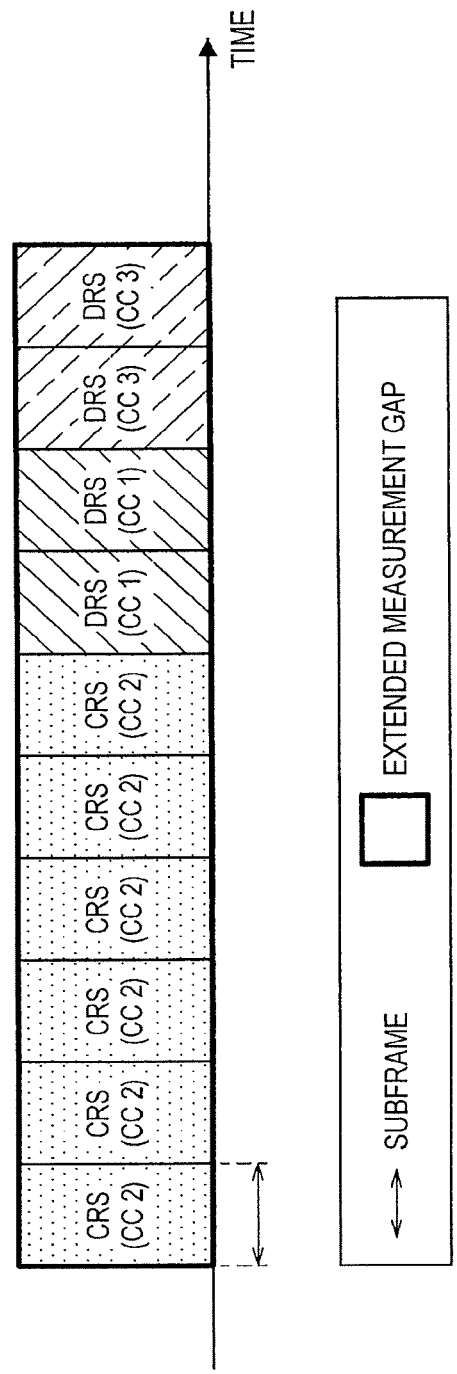
FIG. 34 is an explanatory diagram for describing a third example of measurement according to the third embodiment.

FIG. 34 is an explanatory diagram for describing a third example of measurement according to the third embodiment. Referring to FIG. 34, an extended measurement gap having a length of 10 subframes is shown. In this example, the measurement unit 163 performs measurement of a CC2 based on a CRS transmitted in the CC2 (a second frequency band) within a period (a second period) from a 1st subframe to a 6th subframe within the extended measurement gap. In addition, the measurement unit 163 performs measurement of a CC1 based on a DRS transmitted in the CC1 (a first frequency band) within a period (a first period) including a 7th subframe and an 8th subframe within the extended measurement gap. Further, the measurement unit 163 performs measurement of a CC3 based on a DRS transmitted in the CC3 (an additional frequency band) within a period (an additional period) including a 9th subframe and a 10th subframe within the extended measurement gap.

Accordingly, measurement based on a DRS (that is, inter-frequency measurement) may be further efficiently performed.

While an example in which the measurement gap (that is, the extended measurement gap) includes one additional period and the measurement unit 163 performs measurement of one additional frequency band has been described, it should be understood that the third embodiment is not limited thereto. The measurement gap may include two or more additional periods, and the measurement unit 163 may perform measurement of two or more additional frequency bands.

(g) Measurement Based on CRS and DRS

The measurement unit 163 may perform the measurement of the first frequency band that is used by the same base station based on a DRS and a CRS transmitted by the same base station in the first frequency band within the first period. Additionally or alternatively, the measurement unit 163 may perform the measurement of the second frequency band that is used by the same base station based on a DRS and a CRS transmitted by the same base station in the second frequency band within the second period. In this case, the first period may be a period shorter than 6 milliseconds.

As a specific example, a base station of a small cell in the on state transmits both a DRS and a CRS in the second frequency band. In this case, the measurement unit 163 may perform measurement of the second frequency band that is used by the base station based on the DRS and the CRS transmitted by the base station in the second frequency band within the second period. Hereinafter, hereinafter, this will be described with reference to a specific example of FIG. 35.

Figure 35:
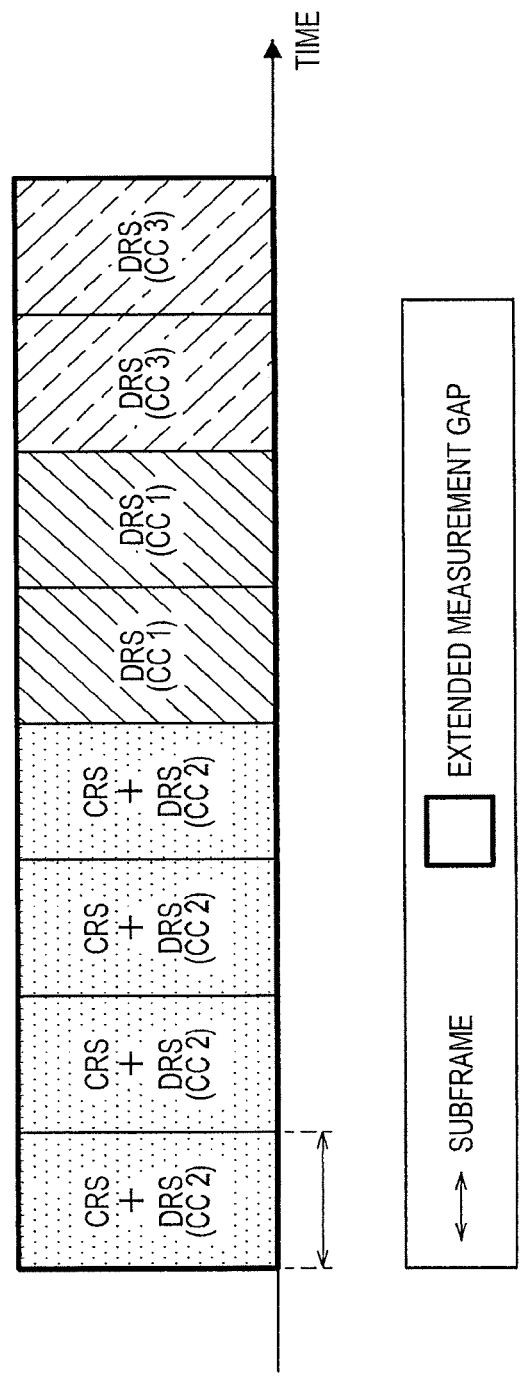
FIG. 35 is an explanatory diagram for describing a fourth example of measurement according to the third embodiment.

FIG. 35 is an explanatory diagram for describing a fourth example of measurement according to the third embodiment. Referring to FIG. 35, an extended measurement gap having a length of 8 subframes is shown. In this example, the measurement unit 163 performs measurement of a CC2 based on a DRS and a CRS transmitted by the same base station, using the CC2 (a second frequency band) within a period (a second period) from a 1st subframe to a 4th subframe within the extended measurement gap. In addition, the measurement unit 163 performs measurement of a CC1 based on a DRS transmitted in the CC1 (a first frequency band) within a period (a first period) including a 5th subframe and a 6th subframe within the measurement gap. Further, the measurement unit 163 performs measurement of a CC3 based on a DRS transmitted in the CC3 (an additional frequency band) within a period (an additional period) including a 7th subframe and an 8th subframe within the extended measurement gap.

Accordingly, for example, measurement of the first frequency band or the second frequency band (that is inter-frequency measurement) is performed based on more reference signals. Therefore, the measurement of the first frequency band or the second frequency band used by the base station may be performed using a shorter period than when it is performed based on only a CRS. Therefore, the extended measurement gap may be shortened.

(h) Priority

For example, the measurement unit 163 performs measurement of a frequency group and measurement of one or more other frequency bands or measurement of one or more other frequency groups based on a priority of the frequency group including the first frequency band and the second frequency band and a priority of the one or more other frequency bands or a priority of the one or more other frequency groups.

As a specific example, a frequency group or a frequency band having a higher priority is sequentially selected from among the frequency group including the first frequency band and the second frequency band, the one or more other frequency bands and the one or more other frequency groups. Then, the measurement unit performs measurement of the selected frequency group or frequency band.

As an example, the priority of the frequency band is a priority included in an inter-frequency NCL contained in the SIB5. As another example, the priority of the frequency band may be a priority that is decided by the terminal device 100-3.

The priority of the frequency group (and/or a priority of each of the one or more other frequency groups) may be decided in consideration of power consumption and/or a communication request of the terminal device 100-3. As an example, when suppression of power consumption is requested, the priority of the frequency group may be higher. This is because, when the priority of the frequency group is high, measurement of more frequency bands using a measurement gap is performed. As another example, when high throughput is requested, the priority of the frequency group may be lower. This is because, when the priority of the frequency group is low, measurement of a frequency band that is used by a base station of a cell in the on state is preferentially performed, and, as a result, a handover is preferentially performed without a transition time.

Measurement in Consideration of Transmission Period of DRS

For example, the measurement unit 163 performs the measurement of the frequency group, the measurement of the one or more other frequency bands or the measurement of the one or more other frequency groups in consideration of a transmission period in which a DRS is transmitted in the first frequency band. As a specific example, the measurement unit 163 performs measurement of another frequency band or another frequency group whose priority is lower than the frequency group before the measurement of the frequency group outside of the transmission period.

Accordingly, for example, measurement may be performed more smoothly without wasting the measurement gap.

(Reporting Unit 165)

The reporting unit 165 reports a result of measurement of the frequency band to the base station 200-3.

For example, the reporting unit 165 reports a result of measurement of the frequency band to the base station 200-3. In addition, for example, the reporting unit 165 reports a result of measurement of the second frequency band to the base station 200-3. In addition, the frequency group may include an additional frequency band, and the reporting unit 165 may report a result of measurement of the additional frequency band to the base station 200-3.

5.2. Configuration of Base Station

Figure 36:
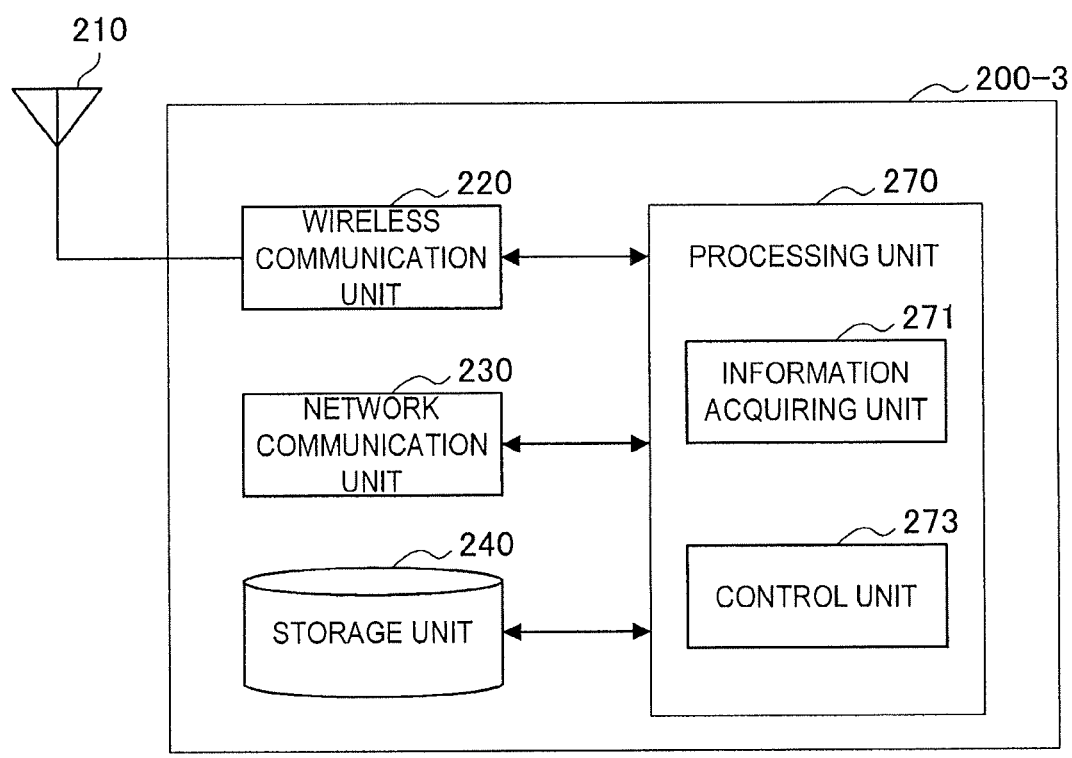
FIG. 36 is a block diagram illustrating an example of a configuration of a base station according to the third embodiment.

Next, an example of a configuration of the base station 200-3 according to the third embodiment will be described with reference to FIG. 36. FIG. 36 is a block diagram illustrating an example of a configuration of the base station 200-3 according to the third embodiment. Referring to FIG. 36, the base station 200-3 includes an antenna unit 210, a wireless communication unit 220, a network communication unit 230, a storage unit 240, and a processing unit 270.

There is no difference in descriptions of the antenna unit 210, the wireless communication unit 220, the network communication unit 230 and the storage unit 240 between the first embodiment and the third embodiment except for different reference numerals. Therefore, redundant descriptions will be omitted here, and only the processing unit 270 will be described.

(Processing Unit 270)

The processing unit 270 provides various functions of the base station 200-3. The processing unit 270 includes an information acquiring unit 271 and a control unit 273. The processing unit 270 may further include any other component in addition to the above-mentioned components. In other words, the processing unit 270 may also perform an operation other than operations of the above-mentioned components.

(Information Acquiring Unit 271)

(a) Frequency Group

The information acquiring unit 271 acquires information indicating a first frequency band in which a DRS is transmitted within at least a first period included in a measurement gap.

Specifically, in the third embodiment, the measurement gap is an extended measurement gap. For example, the measurement gap further includes a second period in which a reference signal is transmitted in a second frequency band. More specifically, for example, the measurement gap includes a second period in which a CRS is transmitted in the second frequency band.

For example, the information acquiring unit 271 acquires information indicating a frequency group including the first frequency band and the second frequency band. The second frequency band is a frequency band in which a DRS is transmitted within at least a second period included in the measurement gap.

More specifically, for example, a control entity 300-3 decides the frequency group and notifies the base station 200-3 of the frequency group. Then, the information indicating the frequency group is stored in the storage unit 240. The information acquiring unit 271 acquires the information indicating the frequency group at any time thereafter.

(b) Measurement Gap

Further, for example, the information acquiring unit 271 acquires information indicating the measurement gap. As described above, the measurement gap is an extended measurement gap.

More specifically, for example, the control entity 300-3 decides an extended measurement gap and notifies the base station 200-3 of the extended measurement gap. Then, the information indicating the extended measurement gap is stored in the storage unit 240. The information acquiring unit 271 acquires the information indicating the extended measurement gap at any time thereafter.

Alternatively, the measurement gap is decided by a device other than the control entity 300-3, and the base station 200-3 may be notified thereof. Alternatively, the measurement gap is decided by the base station 200-3 and may be stored in the storage unit 240.

(Control Unit 263)

(a) Notification of First Frequency Band and Measurement Gap

The control unit 273 notifies the terminal device 100-3 of the first frequency band and the measurement gap. Specifically, in the third embodiment, the measurement gap is an extended measurement gap.

For example, the control unit 273 notifies the terminal device 100-3 of the frequency group including the first frequency band and the second frequency band and the measurement gap.

As a specific example, the control unit 273 transmits information indicating the frequency group and information indicating the measurement gap (that is, the extended measurement gap) to the terminal device 100-3 through the antenna unit 210 and the wireless communication unit 220. As an example, the control unit 273 transmits an RRC connection reconfiguration message including a measurement configuration including the information indicating the frequency group and the information indicating the measurement gap to the terminal device 100-3 through the antenna unit 210 and the wireless communication unit 220.

(b) Priority Notification

For example, the control unit 273 notifies the terminal device 100-3 of a priority of the frequency group and a priority of one or more other frequency bands or a priority of one or more other frequency groups.

As a specific example, the control unit 273 transmits information indicating the priority of the frequency group and the priority of one or more other frequency bands or the priority of one or more other frequency groups to the terminal device 100-3 through the antenna unit 210 and the wireless communication unit 220. As an example, the information is included in the inter-frequency NCL within the SIB5 and the control unit 273 informs the terminal device 100-3 of the SIB5 including the inter-frequency NCL through the antenna unit 210 and the wireless communication unit 220.

5.3. Configuration of Control Entity

Figure 37:
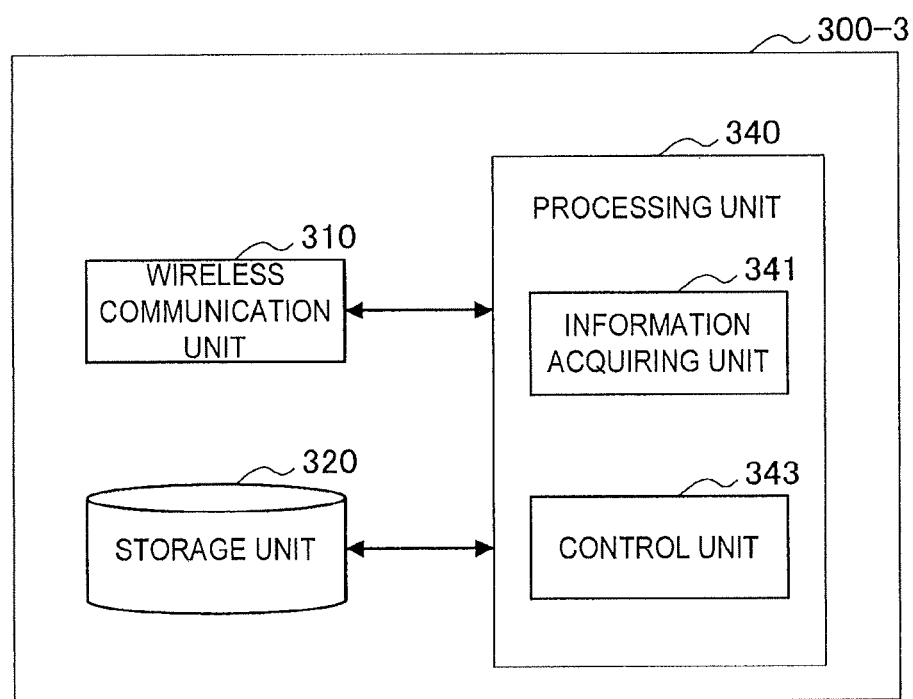
FIG. 37 is a block diagram illustrating an example of a configuration of a control entity according to the third embodiment.

First, an example of a configuration of the control entity 300-3 according to the third embodiment will be described with reference to FIG. 37. FIG. 37 is a block diagram illustrating an example of a configuration of the control entity 300-3 according to the third embodiment. Referring to FIG. 37, the control entity 300-3 includes a communication unit 310, a storage unit 320, and a processing unit 340.

There is no difference in descriptions of the communication unit 310 and the storage unit 320 between the second embodiment and the third embodiment except for different reference numerals. Therefore, redundant descriptions will be omitted here, and only the processing unit 340 will be described.

(Processing Unit 340)

The processing unit 340 provides various functions of the control entity 300-3. The processing unit 340 includes an information acquiring unit 341 and a control unit 343. The processing unit 340 may further include any other component in addition to the above-mentioned components. In other words, the processing unit 340 may also perform an operation other than operations of the above-mentioned components.

(Information Acquiring Unit 341)

The information acquiring unit 341 acquires information about a first frequency band in which a DRS is transmitted.

The first frequency band is a frequency band that is used by a base station of a small cell. When a base station of a small cell in the off state transmits a DRS and a base station of a small cell in the on state does not transmit a DRS, the first frequency band is a frequency band that is used by the base station of the small cell in the off state. Conversely, when a base station of a small cell transmits a DRS regardless of an on/off state, the first frequency band is a frequency band that is used by the base station of the small cell.

(Control Unit 343)

(a) Decision of Extended Measurement Gap

The control unit 343 decides an extended measurement gap including at least a part of a transmission period in which a DRS is transmitted in the first frequency band.

(a-1) First Method

For example, as a first method, the control unit 343 controls the transmission period such that at least a part of the transmission period is included in the extended measurement gap.

More specifically, for example, the control unit 343 decides an extended measurement gap. Then, the control unit 343 instructs a base station that transmits a DRS in the first frequency band to transmit a DRS during the extended measurement gap.

Accordingly, for example, it is possible to more reliably perform measurement of the first frequency band using the extended measurement gap.

(a-2) Second Method

As a second method, the information about the first frequency band (that is, information acquired by the information acquiring unit 341) may include information indicating the transmission period. Then, the control unit 343 may decide the extended measurement gap based on the transmission period (that is, a period in which a DRS is transmitted in the first frequency band).

As an example, the transmission period and the extended measurement gap are periods having the same length, and the control unit 343 decides the extended measurement gap such that the extended measurement gap matches the transmission period. As another example, the transmission period may be a period longer than the extended measurement gap, and the control unit 343 may decide the extended measurement gap such that the extended measurement gap is included in the transmission period. As still another example, the transmission period may be a period shorter than the extended measurement gap, and the control unit 343 may decide the extended measurement gap such that the extended measurement gap includes the entire transmission period.

Accordingly, for example, it is possible to perform measurement of each of the first frequency band and the second frequency band using the extended measurement gap without the control entity 300-3 instructing a base station.

(b) Decision of Frequency Group

For example, the control unit 343 decides a frequency group including at least the first frequency baud and the second frequency band.

The first frequency band is a frequency band in which a DRS is transmitted within at least a first period included in the measurement gap. In addition, the second frequency band is a frequency band in which a reference signal is transmitted within at least a second period included in the measurement gap. For example, the reference signal is a CRS.

For example, the control unit 343 selects any frequency band in which a CRS is transmitted (for example, a frequency band used by a base station of a macro cell or a frequency band used by a base station of a small in the on state) as the second frequency band. Then, the control unit 343 decides a frequency group including the first frequency band and the second frequency band.

Alternatively, the reference signal transmitted in the second frequency band may be a DRS. In this case, the control unit 343 may decide the frequency group in the same manner as in the control unit 333 according to the second embodiment.

(c) Provide Notification to Base Station 200-3

For example, the control unit 343 notifies the base station 200-3 of the extended measurement gap.

For example, the control unit 343 notifies the base station 200-3 of the first frequency band. For example, the control unit 343 notifies the base station 200-3 of the frequency group including the first frequency band and the second frequency band.

As a specific example, the control unit 343 transmits a message including information indicating the frequency group and information indicating the extended measurement gap to the base station 200-3 through the communication unit 310.

5.4. Process Flow

Next, examples of processes according to the third embodiment will be described with reference to FIG. 38 to FIG. 40.

(Overall Process Flow)

Figure 38:
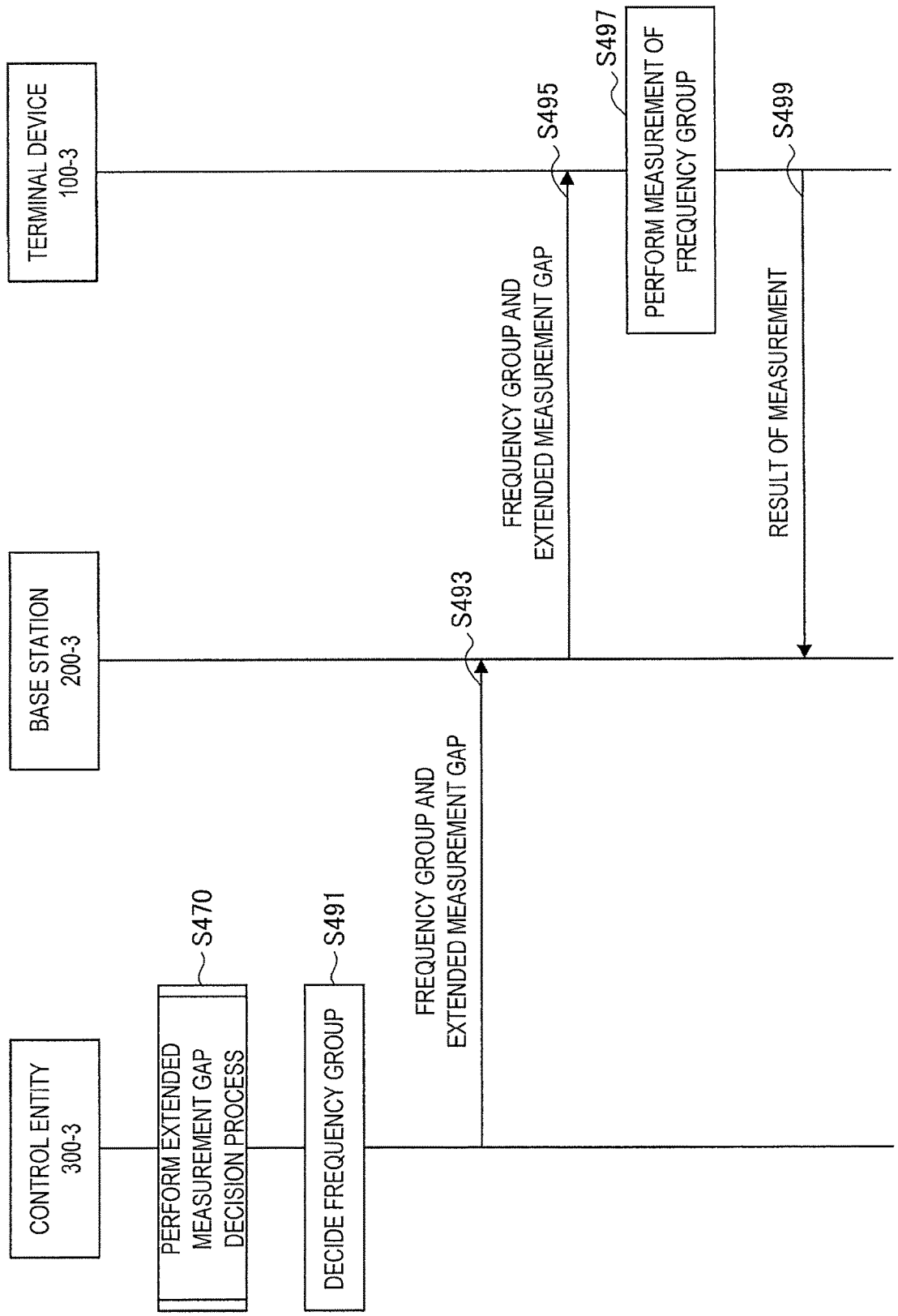
FIG. 38 is a sequence diagram illustrating an example of a schematic flow of a process according to the third embodiment.

FIG. 38 is a sequence diagram illustrating an example of a schematic flow of a process according to the third embodiment.

The control entity 300-3 performs an extended measurement gap decision process (S470). That is, the control unit 343 decides an extended measurement gap including at least a part of a transmission period in which a DRS is transmitted in a first frequency band.

In addition, the control entity 300-3 decides a frequency group including at feast the first frequency band and a second frequency band (S491).

Then, the control entity 300-3 notifies the base station 200-3 of the frequency group and the extended measurement gap (S493).

Further, the base station 200-3 notifies the terminal device 100-3 of the frequency group and the extended measurement gap (S495).

Then, the terminal device 100-3 (the measurement unit 163) performs measurement of the frequency group (S497). As a specific example, the measurement unit 163 performs measurement of the first frequency band based on a DRS transmitted in the first frequency band within a first period included in the extended measurement gap. In addition, for example, the measurement unit 163 performs measurement of the second frequency band based on a reference signal (for example, a CRS) transmitted in the second frequency band within a second period included in the extended measurement gap.

Then, the terminal device 100-3 (the reporting unit 165) reports a result of measurement of the frequency band to the base station 200-3 (S499).

(Extended Measurement Gap Decision Process)

(a) First Example

Figure 39:
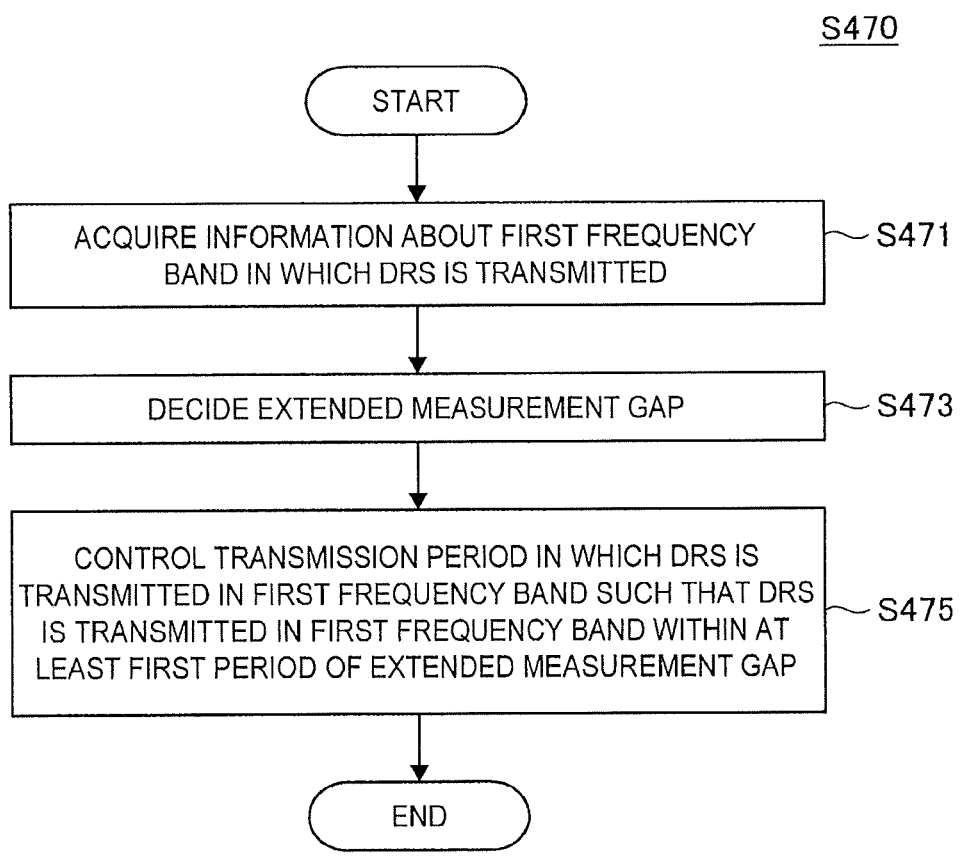
FIG. 39 is a sequence diagram illustrating a first example of a schematic flow of an extended measurement gap decision process according to the third embodiment.

FIG. 39 is a sequence diagram illustrating a first example of a schematic flow of an extended measurement gap decision process according to the third embodiment.

The information acquiring unit 341 acquires information about a first frequency band in which a DRS is transmitted (S471).

Then, the control unit 343 decides an extended measurement gap (S473).

Further, the control unit 343 controls a transmission period in which a DRS is transmitted in the first frequency band such that the DRS is transmitted in the first frequency band within at least a first period included in the extended measurement gap (S475). For example, the control unit 343 instructs a base station that transmits a DRS in the first frequency band to transmit the DRS during the extended measurement gap. Then, the process ends.

(b) Second Example

Figure 40:
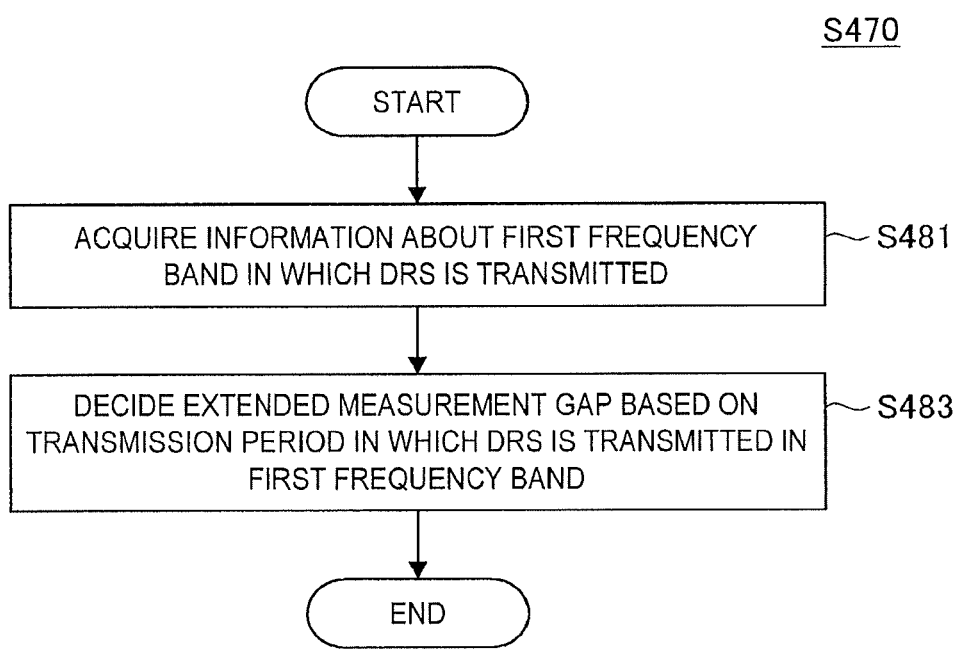
FIG. 40 is a sequence diagram illustrating a second example of a schematic flow of an extended measurement gap decision process according to the third embodiment.

FIG. 40 is a sequence diagram illustrating a second example of a schematic flow of an extended measurement gap decision process according to the third embodiment.

The information acquiring unit 341 acquires information about a first frequency band in which a DRS is transmitted (S481). The information includes information indicating a transmission period in which a DRS is transmitted in the first frequency band.

Then, the control unit 343 decides an extended measurement gap based on the transmission period (that is, a period in which a DRS is transmitted in the first frequency band) (S483). Then, the process ends.

5.5. First Modification Example

Next, a first modification example of the third embodiment will be described.

In the first modification example of the third embodiment, the base station 200-3 decides the extended measurement gap instead of the control entity 300-3. In addition, for example, the base station 200-3 decides the frequency group. Then, the base station 200-3 notifies the terminal device 100-3 of the extended measurement gap and the frequency group it decided.

For example, in the first modification example of the third embodiment, the processing unit 270 of the base station 200-3 further includes, for example, the information acquiring unit 341 and the control unit 343.

5.6. Second Modification Examples

Next, a second modification example of the third embodiment will be described.

In the second modification example of the third embodiment, the terminal device 100-3 decides the extended measurement gap instead of the control entity 300-3. In addition, for example, the terminal device 100-3 decides the frequency group. Then, the base station 200-3 performs measurement of the frequency group it decided by using the extended measurement gap it decided.

(Terminal Device 100-3: Processing Unit 160)

In the second modification example of the third embodiment, the processing unit 160 decides the extended measurement gap. In addition, for example, the processing unit 160 decides a frequency group including at least a first frequency band in which a DRS is transmitted and a second frequency band in which a reference signal (for example, a CRS) is transmitted.

As a specific example, the base station 200-3 notifies the terminal device 100-3 of information about a first frequency band in which a DRS is transmitted. For example, the base station 200-3 informs of the inter-frequency NCL (SIB5) including information indicating whether a DRS is transmitted for each frequency band and a transmission period of a DRS. Then, the processing unit 160 decides an extended measurement gap including at least a part of the transmission period in which a DRS is transmitted in the first frequency band. In addition, the processing unit 160 decides a frequency group including at least the first frequency band and the second frequency band. The processing unit 160 decides frequency bands whose number is equal to or less that a predetermined maximum number as a frequency group.

(Terminal Device 100-3: Information Acquiring Unit 161)

As described above, the information acquiring unit 161 acquires information indicating the first frequency band (or the frequency group). In addition, as described above, the information acquiring unit 161 acquires information indicating the extended measurement gap.

For example, as described above, the processing unit 160 decides the frequency group and the extended measurement gap. Then, the information acquiring unit 161 acquires information indicating the decided frequency group and information indicating the decided extended measurement gap.

6. Fourth Embodiment

Figure 41:
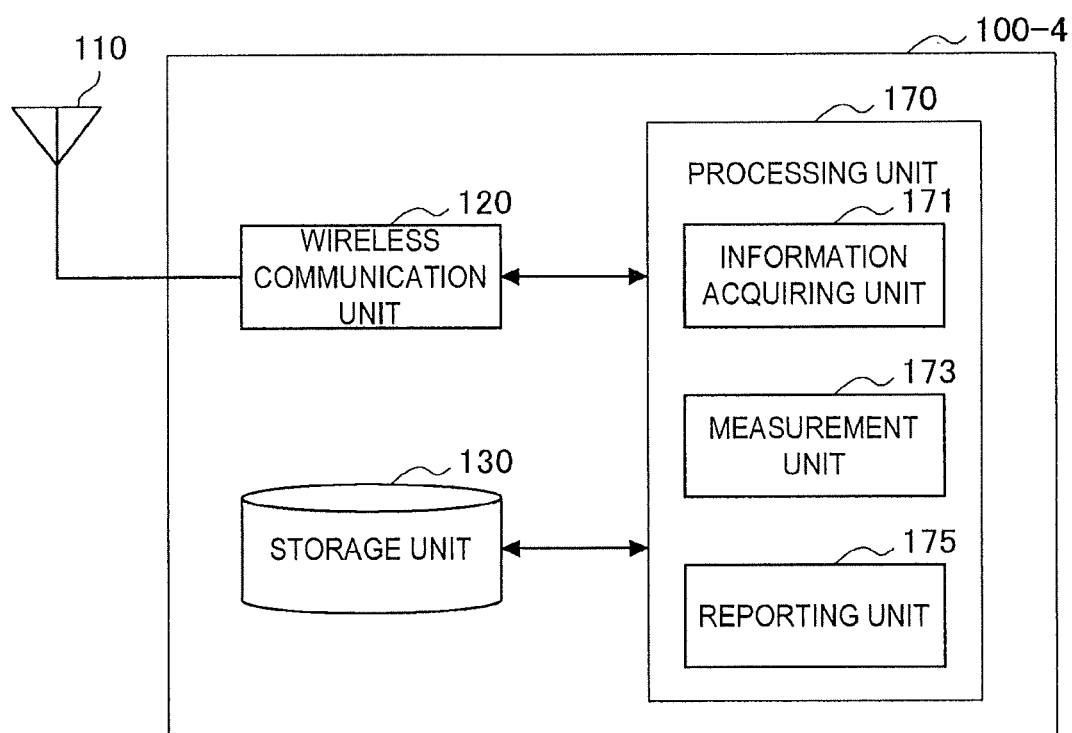
FIG. 41 is a block diagram illustrating an example of a configuration of a terminal device according to the second embodiment.

Next, a fourth embodiment of the present disclosure will be described with reference to FIG. 41 to FIG. 43.

A terminal device 100-4 according to the fourth embodiment performs first measurement of each of a plurality of frequency bands and second measurement of each of one or more frequency bands that are a part of the plurality of frequency bands. The first measurement is measurement that is performed based on a reference signal transmitted within a period having a first length. The second measurement is measurement that is performed based on a reference signal transmitted within a period having a second length that is greater than the first length. That is, in the fourth embodiment, the terminal device 100-4 performs rough measurement of more frequency bands and performs more accurate measurement of fewer frequency bands that are a part of the more frequency bands. Accordingly, for example, it is possible to improve measurement performed by the terminal device 100-4.

6.1. Configuration of Terminal Device

First, an example of a configuration of the terminal device 100-4 according to the fourth embodiment will be described with reference to FIG. 41 and FIG. 42. FIG. 41 is a block diagram illustrating an example of a configuration of the terminal device 100-4 according to the fourth embodiment. As illustrated in FIG. 41, the terminal device 100-4 includes the antenna unit 110, the wireless communication unit 120, the storage unit 130 and a processing unit 170.

There is no difference in descriptions of the antenna unit 110, the wireless communication unit 120 and the storage unit 130 between the first embodiment and the fourth embodiment except for different reference numerals. Therefore, redundant descriptions will be omitted here, and only the processing unit 170 will be described.

(Processing Unit 170)

The processing unit 170 provides various functions of the terminal device 100-4. The processing unit 170 includes an information acquiring unit 171, a measurement unit 173 and a reporting unit 175. The processing unit 170 may further include a component other than these components. That is, the processing unit 170 may also perform an operation other than operations of these components.

(Information Acquiring Unit 171)

The information acquiring unit 171 acquires information about a frequency band.

For example, the information acquiring unit 171 acquires a neighbor cell list. For example, the information acquiring unit 171 acquires an intra-frequency NCL and an inter-frequency NCL. For example, a base station 200-4 informs the information acquiring unit 171 of an intra-frequency NCL within an SIB4, and the information acquiring unit 171 acquires the intra-frequency NCL. In addition, for example, the base station 200-4 informs the information acquiring unit 171 of an inter-frequency NCL within an SIB5 and the information acquiring unit 171 acquires the inter-frequency NCL.

For example, the information acquiring unit 171 acquires a measurement configuration of a frequency band. For example, the base station 200-4 transmits an RRC connection reconfiguration message including a measurement configuration to the terminal device 100-4, and the information acquiring unit 171 acquires the measurement configuration. The measurement configuration includes information such as measurement objects, reporting configurations, measurement IDs and measurement gaps.

(Measurement Unit 173)

The measurement unit 173 performs measurement of a frequency band.

In the fourth embodiment, the measurement unit 173 performs first measurement of each of a plurality of frequency bands and second measurement of each of one or more frequency bands that are a part of the plurality of frequency bands. The first measurement is measurement that is performed based on a reference signal transmitted within a period having a first length. The second measurement is measurement that is performed based on a reference signal transmitted within a period having a second length that is greater than the first length. That is, the measurement unit 173 performs rough measurement of more frequency bands (that is, the plurality of frequency bands) and performs more accurate measurement of fewer frequency bands (that is, the one or more frequency bands) that are a part of the more frequency bands. Accordingly, for example, it is possible to improve measurement performed by the terminal device 100-4. For example, measurement of the frequency band may be performed more efficiently.

(a) First Measurement of each of Plurality of Frequency Bands (a-1) Plurality of Frequency Bands Component Carrier (CC)

For example, each of the plurality of frequency bands is a component carrier (CC) of carrier aggregation.

Frequency Band of Small Cell

For example, each of the plurality of frequency bands is a frequency band that is used by a base station of a small cell.

Accordingly, for example, measurement of the frequency band used in the small cell may be performed more efficiently.

Frequency Band that is not Used

For example, each of the plurality of frequency bands is a frequency band that is not used by the terminal device 100-4. Accordingly, for example, inter-frequency measurement may be performed more efficiently.

In view of the above points, for example, each of the plurality of frequency bands is a CC that is used by a base station of a small cell, and the CC is not used by the terminal device 100-4.

The plurality of frequency bands have been described above. The fourth embodiment is not limited thereto. For example, the plurality of frequency bands may include a frequency band that is used by only a macro base station.

(a-2) First Measurement

As described above, the first measurement (that is, the measurement of each of the plurality of frequency bands) is measurement that is performed based on a reference signal transmitted within a period having the first length.

Period having First Length

For example, the period having the first length is a period including a measurement gap of a first number. That is, the measurement unit 173 performs measurement of each of the plurality of frequency bands based on a reference signal transmitted within the period including the measurement gap of the first number.

Reference Signal

For example, the reference signal is a CRS. Accordingly, for example, measurement regarding a small cell in the on state may be performed more efficiently. In addition, a measurement load regarding a macro cell may be reduced.

Alternatively, the reference signal may be a DRS. Accordingly, for example, measurement regarding a small cell in the off state may be performed more efficiently.

RRM Measurement

The first measurement is RRM measurement, for example, measurement of reception power or reception quality. As a specific example, the first measurement is measurement of RSRP or RSRQ. In addition, the first measurement is performed for each cell (that is, a base station that uses each of the plurality of frequency bands) in which each of the plurality of frequency bands is used.

(b) Second Measurement of One or more Frequency Bands (b-1) One or more Frequency Bands For example, the one or more frequency bands are frequency bands that are selected from among the plurality of frequency bands based on a result of the first measurement of each of the plurality of frequency bands.

More specifically, for example, the one or more frequency bands are frequency bands the first measurement of which has a more favorable result. As an example, for example, the one or more frequency bands are frequency bands having higher RSRP (or RSRQ). Hereinafter, this will be described with reference to a specific example of FIG. 42.

Figure 42:
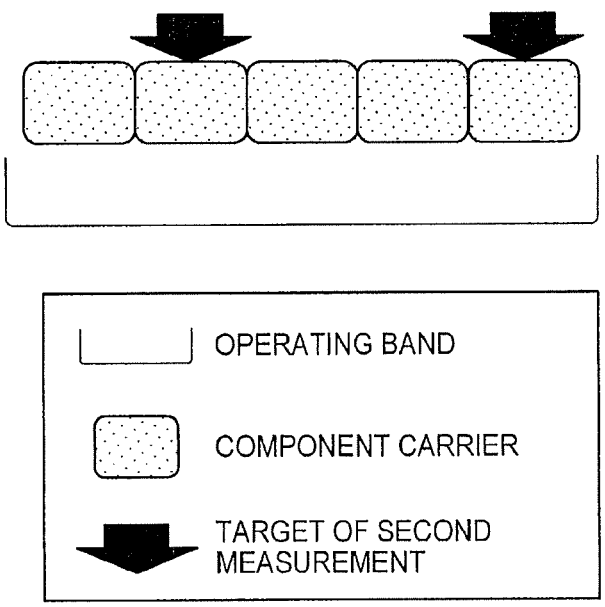
FIG. 42 is an explanatory diagram for describing an example of frequency bands that are targets of first measurement and second measurement according to a fourth embodiment.
Figure 43:
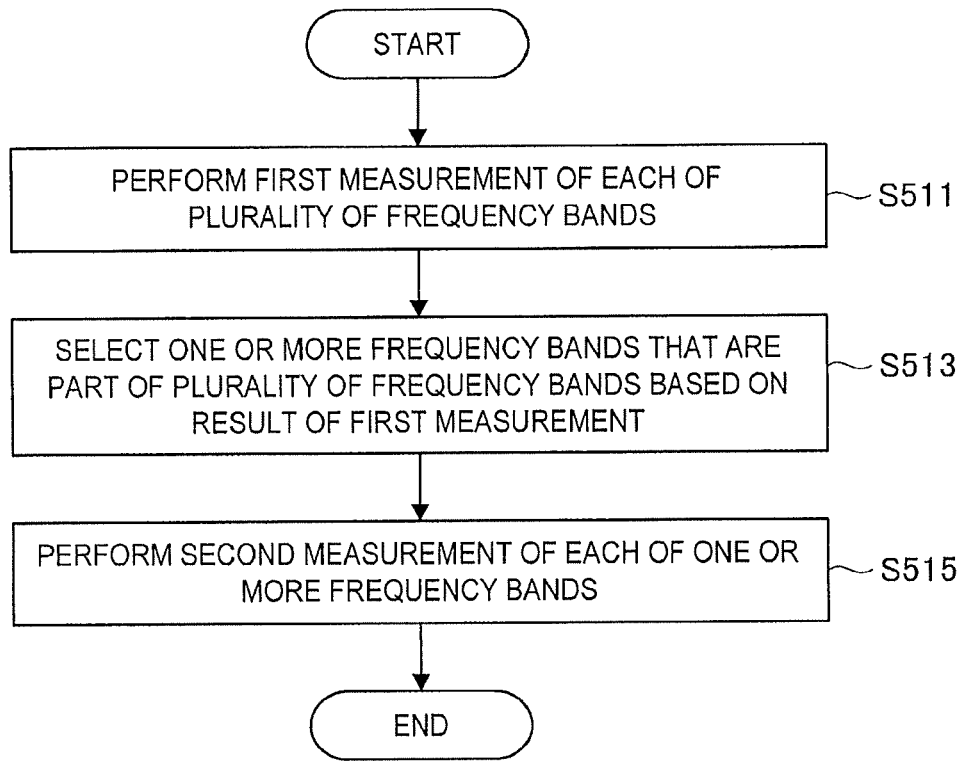
FIG. 43 is a flowchart illustrating an example of a schematic flow of a process according to the fourth embodiment.

FIG. 42 is an explanatory diagram for describing an example of frequency bands that are targets of first measurement and second measurement according to the fourth embodiment. Referring to FIG. 42, five CCs in one operating band are shown. For example, the measurement unit 173 performs first measurement of each of the five CCs. Then, two CCs having higher RSRP (or RSRQ) among the five CCs are selected as targets of the second measurement, and the measurement unit 173 performs the second measurement of the two CCs.

Accordingly, for example, rough measurement of more frequency bands is performed. Accurate measurement of fewer frequency bands favorable for the terminal device 100-4 among the more frequency bands is performed. That is, a frequency band favorable for the terminal device 100-4 may be found quickly from among the more frequency bands.

(b-2) Second Measurement

As described above, the first measurement is measurement that is performed based on a reference signal transmitted within a period having the first length. The second measurement is measurement that is performed based on a reference signal transmitted within a period having a second length that is greater than the first length.

Period having Second Length

As described above, for example, the period having the first length is a period including a measurement gap of a first number. Conversely, for example, the period having the second length is a period including a measurement gap of a second number that is greater than the first number. That is, the measurement unit 173 performs measurement of each of the one or more frequency bands based on a reference signal transmitted within a period including the measurement gap of the second number that is greater than the first number.

Reference Signal

For example, the reference signal is a CRS. Alternatively, the reference signal may be a DRS.

RRM Measurement

The second measurement is RRM measurement, for example, measurement of reception power or reception quality. As a specific example, the second measurement is measurement of RSRP or RSRQ. In addition, the second measurement is performed for each cell in which each of the one or more frequency bands is used (that is, a base station that uses each of the one or more frequency bands).

(Reporting Unit 175)

The reporting unit 175 reports a result of measurement of the frequency band to the base station 200-4.

For example, the reporting unit 175 reports a result of measurement of each of the one or more frequency bands to the base station 200-4.

6.2. Process Flow

Next, an example of a process according to the fourth embodiment will be described with reference to FIG. 42. FIG. 42 is a flowchart illustrating an example of a schematic flow of a process according to the fourth embodiment.

The measurement unit 173 performs first measurement of each of a plurality of frequency bands (S511).

Then, the processing unit 170 (for example, the measurement unit 173) selects one or more frequency bands that are a part of the plurality of frequency bands based on a result of the first measurement of each of the plurality of frequency bands (S513).

Then, the measurement unit 173 performs second measurement of each of foe one or more frequency bands (S515). Then, the process ends.

7. Application Examples

The technology according to the present disclosure is applicable to a variety of products. The control entity 300 may be implemented as any type of server such as tower servers, rack servers, and blade servers. At least a part of components of the control entity 300 may be implemented in a module (e.g. integrated circuit module that includes a single die, or card or blade that is inserted into a slot of a blade server) mounted on a server. In addition, the control entity 300 may be implemented as any of various base stations which will be described.

The base station 200 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 200 may be implemented as another type of base station such as Nodes B or base transceiver stations (BTSs). The base station 200 may include the main apparatus (which is also referred to as base station apparatus) that controls wireless communication and one or more remote radio heads (RRHs) that are disposed at different locations from that of the main apparatus. Further, various types of terminals as will be discussed later may temporarily or semi-persistently execute the base station function to operate as the base station 200. Further, at least part of components of the base station 200 may be implemented in a base station device or a module for the base station device.

The terminal device 100 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal device 100 may also be implemented as a terminal (which is also referred to as machine type communication (MTC) terminal) that performs machine to machine (M2M) communication. Furthermore, at least part of components of the terminal device 100 may be implemented as a module (e.g. integrated circuit module constituted with a single die) that is mounted on these terminals.

7.1. Application Examples for Control Entity

Figure 44:
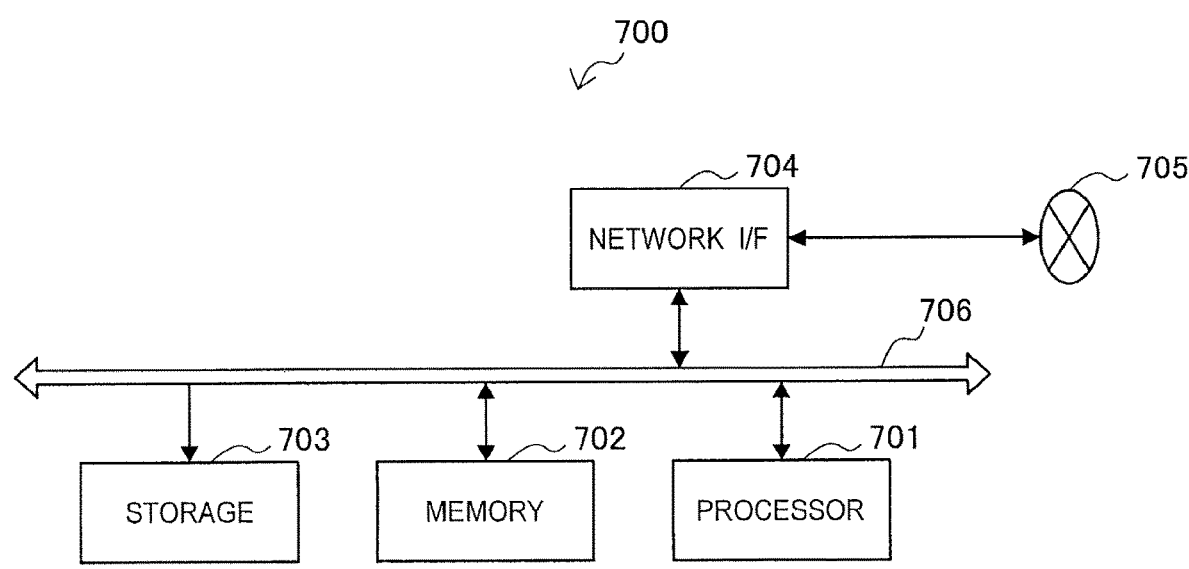
FIG. 44 is a block diagram illustrating an example of a schematic configuration of a server.

FIG. 44 is a block diagram illustrating an example of a schematic configuration of a server 700 to which the technology according to the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls various functions of the server 700. The memory 702 includes a random access memory (RAM) and a read only memory (ROM), and stores a program executed by the processor 701 and data. The storage 703 can include a storage medium such as semiconductor memories and hard disks.

The network interface 704 is a wired communication interface for connecting the server 700 to a wired communication network 705. The wired communication network 705 may be a core network such as evolved packet cores (EPCs), or a packet data network (PDN) such as the Internet.

The bus 706 connects the processor 701, the memory 702, the storage 703, and the network interface 704 to each other. The bus 706 may include two or more buses each having different speed (e.g. high speed bus and low speed bus).

In the server 700 illustrated in FIG. 44, one or more components (the information acquiring unit 331 and/or the control unit 333) included in the processing unit 330 described above with reference to FIG. 27 may be mounted in the processor 701. As an example, a program causing the processor to function as one or more of the components above (that is, a program causing the processor to perform the operation of one or more of the components above) may be installed in the server 700, and the processor 701 may execute the program. As another example, the server 700 may include a module including the processor 701 and the memory 702, and one or more of the components above may be mounted in the module. In this case, the module may store the program causing the processor to function as one or more of the components above in the memory 702, and the program may be executed by the processor 701. As described above, the server 700 or the module may be provided as an apparatus including one or more of the components above, and the program causing the processor to function as one or more of the components above may be provided. A readable recording medium in which the program is recorded may be provided. For these points, one or more components included in the processing unit 340 described above with reference to FIG. 37 (the information acquiring unit 341 and/or the control unit 343) are the same as one or more of the components above included in the processing unit 330.

7.2. Application Examples for Base Station

First Application Example

Figure 45:
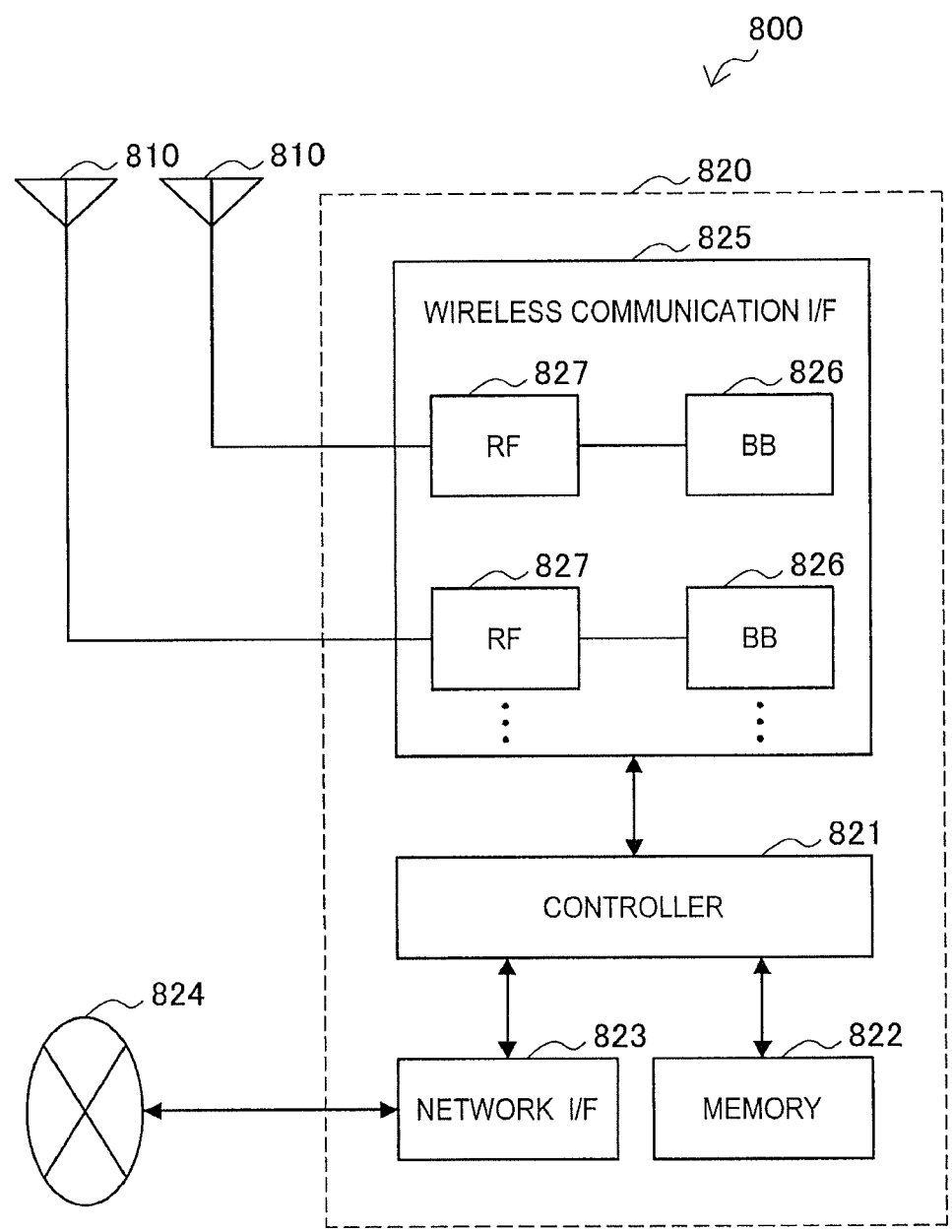
FIG. 45 is a block diagram illustrating a first example of a schematic configuration of art eNB.

FIG. 45 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 45, and the plurality of antennas 810 may, for example, correspond to a plurality of frequency bands used by the eNB 800. It should be noted that while FIG. 45 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 45, and the plurality of BE processors 826 may, for example, correspond to a plurality of frequency bands used by the eNB 800. The wireless communication interface 825 may also include a plurality of the RF circuits 827, as illustrated in FIG. 45, and the plurality of RF circuits 827 may, for example, correspond to a plurality of antenna elements. FIG. 45 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 45, one or more components included in the processing unit 250 described above with reference to FIG. 16 (the information acquiring unit 251 and/or the control unit 253) may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the eNB 800, and the wireless communication interface 825 (for example, the BB processor 826) and/or the controller 821 may execute the program. As described above, the eNB 800, the base station apparatus 820, or the module may be provided as an apparatus including one or more of the components above, and the program causing the processor to function as one or more of the components above may be provided. A readable recording medium in which the program is recorded may be provided. For these points, one or more components included in the processing unit 260 described above with reference to FIG. 26 (the information acquiring unit 261 and/or the control unit 263), and one or more components included in the processing unit 270 described above with reference to FIG. 36 (the information acquiring unit 271 and/or the control unit 273) are the same as one or more of the components above included in the processing unit 250.

In the eNB 800 illustrated in FIG. 45, the wireless communication unit 220 described above with reference to FIG. 16 may be mounted in the wireless communication interface 825 (for example, the RF circuit 827). The antenna unit 210 may be mounted in the antenna 810. The network communication unit 230 may be mounted in the controller 821 and/or the network interface 823.

Second Application Example

Figure 46:
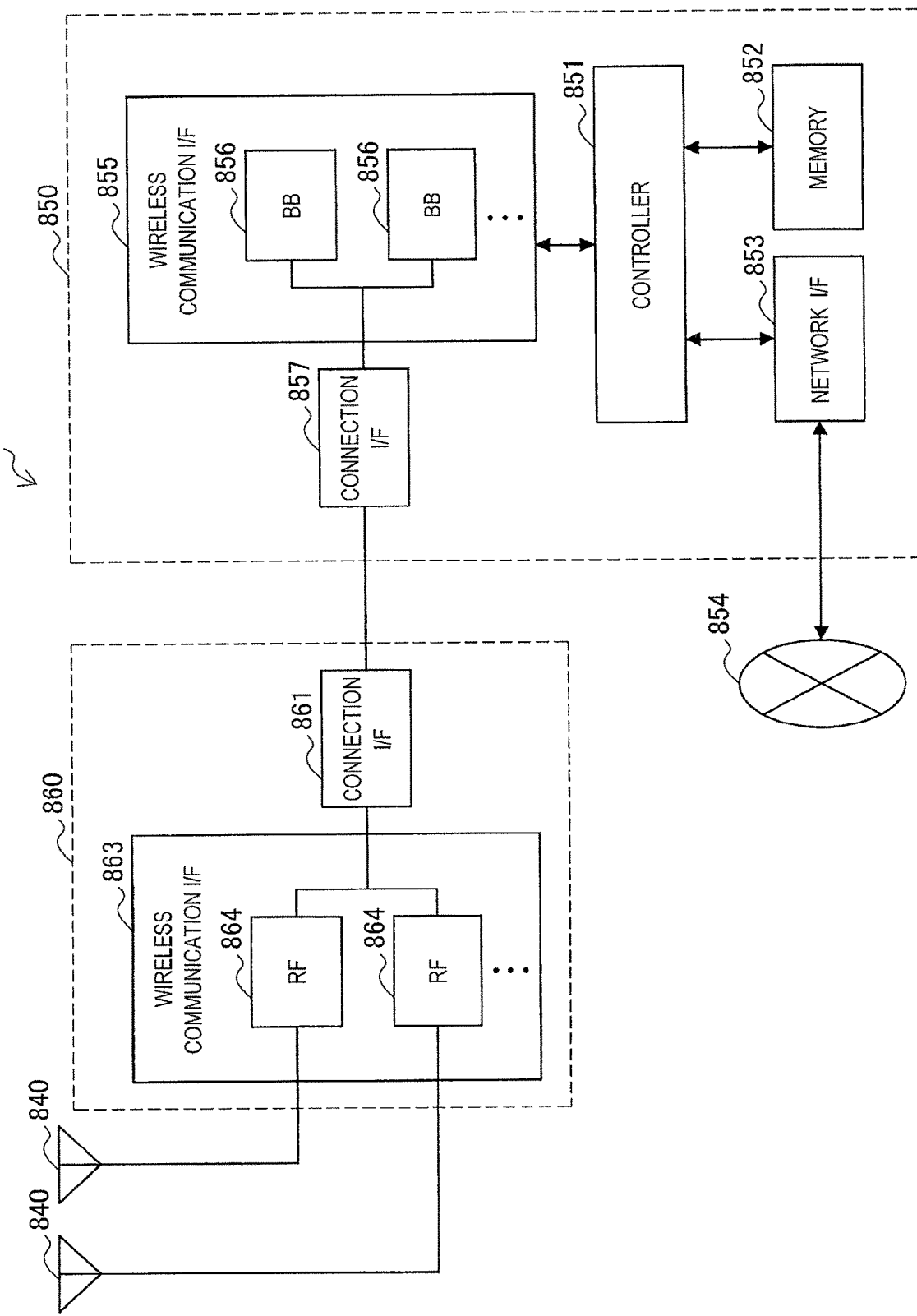
FIG. 46 is a block diagram illustrating a second example of the schematic configuration of the eNB.

FIG. 46 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 46, and the plurality of antennas 840 may, for example, correspond to a plurality of frequency bands used by the eNB 830. FIG. 46 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network, interface 853 are the same as the controller 821, the memory 822, and the network interface 823 described with reference to FIG. 45.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 45 except that the BB processor 856 is connected to an RF circuit 864 of the RRH 860 via the connection interface 857. The wireless communication interface 855 may include a plurality of the BB processors 856, as illustrated in FIG. 46, and the plurality of BB processors 856 may, for example, correspond to a plurality of frequency bands used by the eNB 830 respectively. FIG. 46 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station, apparatus 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interlace 863 may include a plurality of the RF circuits 864 as illustrated in FIG. 46, and the plurality of RF circuits 864 may, for example, correspond to a plurality of antenna elements. FIG. 46 illustrates an example in which the wireless communication interface 863 includes the plurality of RF circuits 864, but the wireless communication interface 863 may include the single RF circuit 864.

In the eNB 830 illustrated in FIG. 46, one or more components included in the processing unit 250 described above with reference to FIG. 16 (the information acquiring unit 251 and/or the control unit 253) may be mounted in the wireless communication interface 855 and/or the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the eNB 830, and the wireless communication interface 855 (for example, the BB processor 856) and/or the controller 851 may execute the program. As described above, the eNB 830, the base station apparatus 850, or the module may be provided as an apparatus including one or more of the components above, and the program causing the processor to function as one or more of the components above may be provided. A readable recording medium in which the program is recorded may be provided. In these points, one or more components included in the processing unit 260 described above with reference to FIG. 26 (the information acquiring unit 261 and/or the control unit 263), and one or more components included in the processing unit 270 described above with reference to FIG. 36 (the information acquiring unit 271 and/or the control unit 273) are the same as one or more of the components above included in the processing unit 250.

In the eNB 830 illustrated in FIG. 46, the wireless communication unit 220 described above with reference to FIG. 16 may be mounted in the wireless communication interface 863 (for example, the RF circuit 864). The antenna unit 210 may be mounted in the antenna 840. The network communication unit 230 may be mounted in the controller 851 and/or the network interface 853.

7.3. Application Examples for Terminal Device

First Application Example

Figure 47:
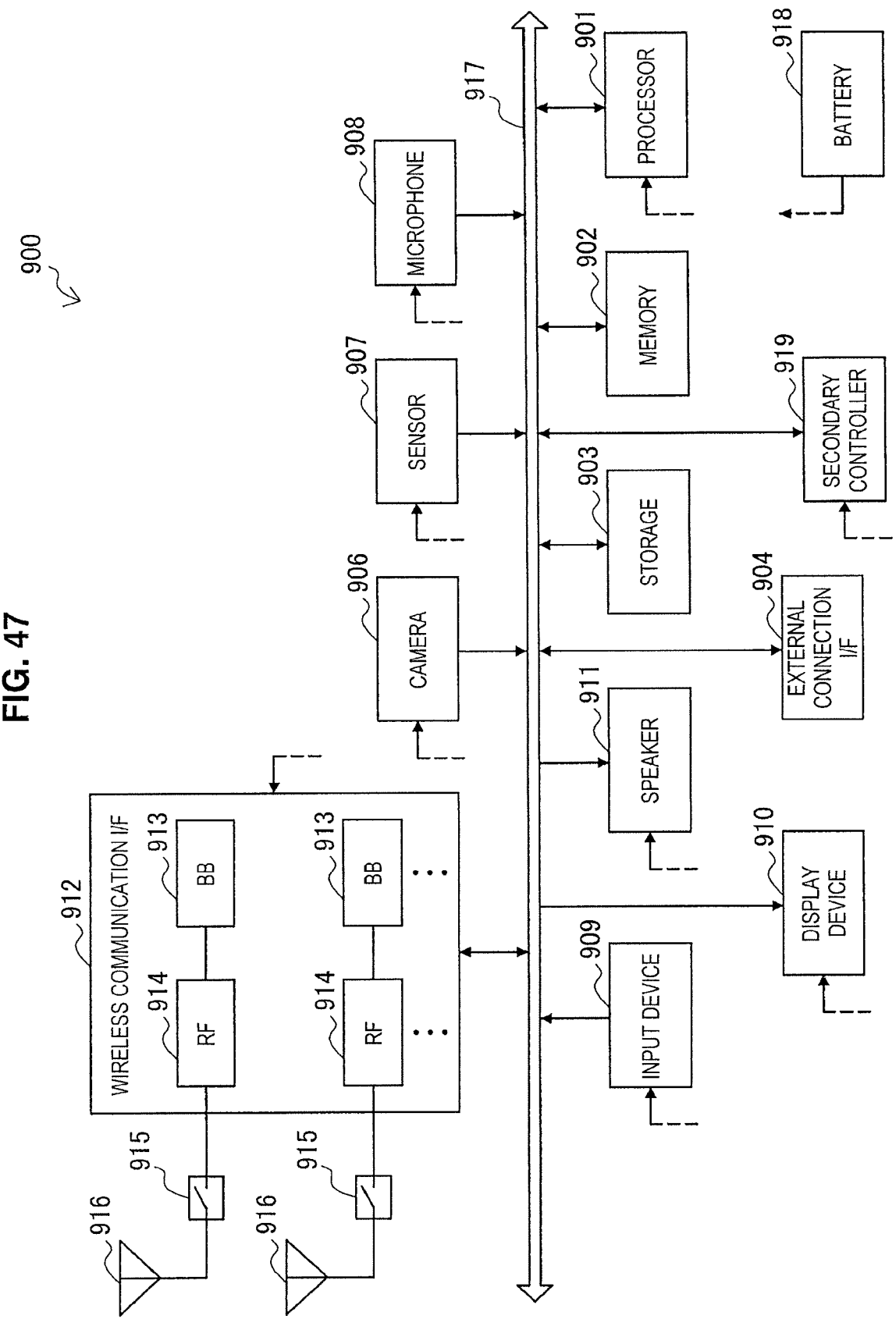
FIG. 47 is a block diagram illustrating an example of a schematic configuration of a smartphone.

FIG. 47 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 47. FIG. 47 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interlace 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 47. FIG. 47 illustrates an example in winch the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interlace 912, and the secondary controller 919 to each other. The battery 918 supplies electric power to each block of the smartphone 900 illustrated in FIG. 47 via a feeder line that is partially illustrated in the figure as a dashed line. The secondary controller 919, for example, operates a minimally necessary function of the smartphone 900 in a sleep mode.

In the smartphone 900 illustrated in FIG. 47, one or more components included in the processing unit 140 described above with reference to FIG. 12 (the information acquiring unit 141, the measurement unit 143, and/or the reporting unit 145) may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and one or more of the components above may be mounted in the module. In this case, the module may store a program causing the processor to function as one or more of the components above (that is, a program causing the processor to perform the operation of one or more of the components above) and execute the program. As another example, the program, causing the processor to function as one or more of the components above may be installed in the smartphone 900, and the wireless communication interface 912 (for example, the BB processor 913), the processor 901, and/or the secondary controller 919 may execute the program. As described above, the smartphone 900 or the module may be provided as an apparatus including one or more of the components above, and the program causing the processor to function as one or more of the components above may be provided. A readable recording medium in which the program is recorded may be provided. For these points, one or more components included in the processing unit 150 described above with reference to FIG. 22 (the information acquiring unit 151, the measurement unit 153, and/or the reporting unit 155), one or more components included in the processing unit 160 described above with reference to FIG. 31 (the information acquiring unit 161, the measurement unit 163, and/or the reporting unit 165), and one or more components included in the processing unit 170 described above with reference to FIG. 41 (the information acquiring unit 171, the measurement unit 173, and/or the reporting unit 175) are the same as one or more of the components above included in the processing unit 140.

In the smartphone 900 illustrated in FIG. 47, for example, the wireless communication unit 120 described above with reference to FIG. 12 may be mounted in the wireless communication interface 912 (for example, the RF circuit 914). The antenna unit 110 may be mounted in the antenna 916.

Second Application Example

Figure 48:
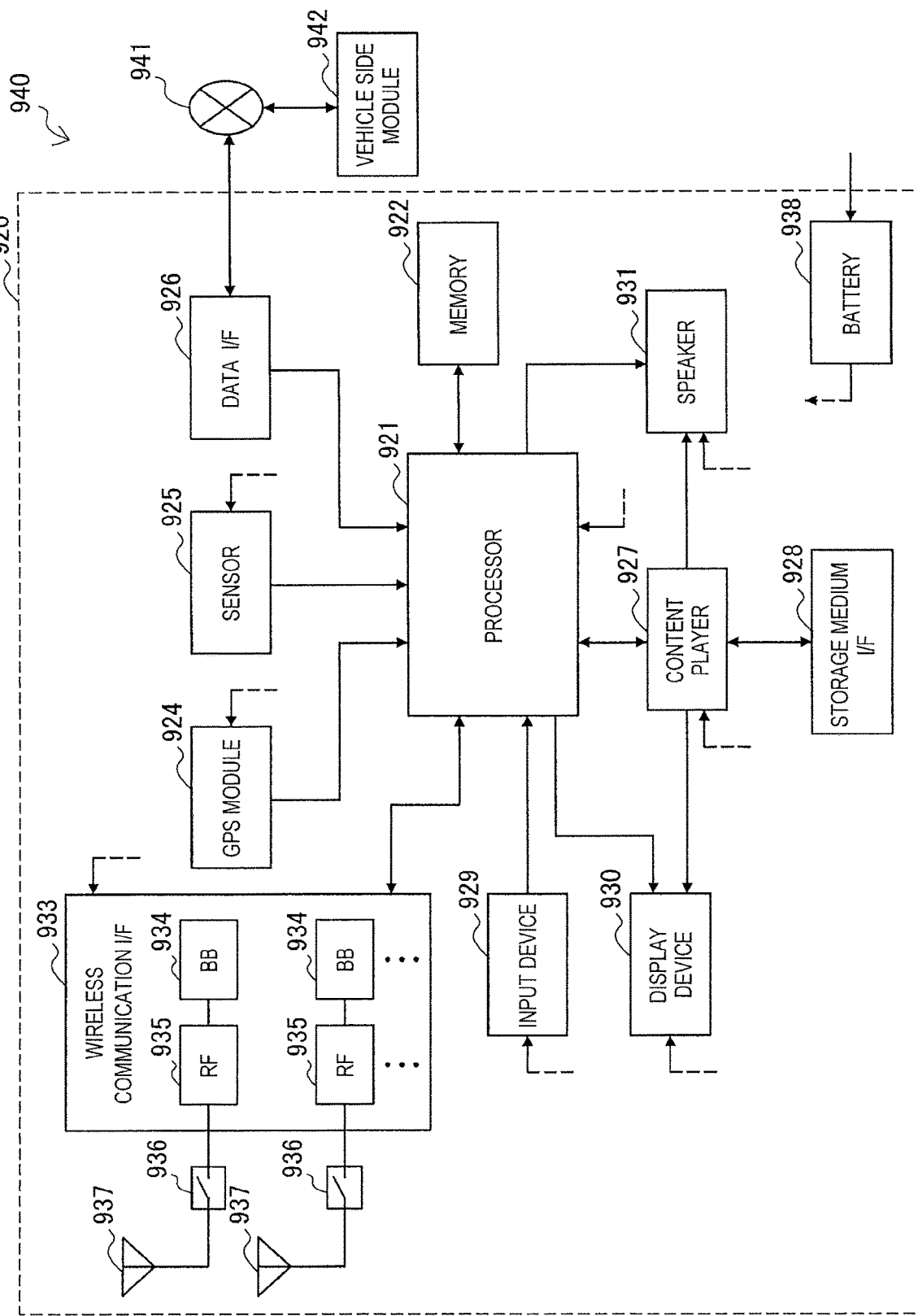
FIG. 48 is a block diagram illustrating an example of a schematic configuration of a car navigation apparatus.

FIG. 48 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and an air pressure sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 48. FIG. 48 illustrates an example in which the wireless communication interface 933 includes a plurality of BB processors 934 and a plurality of RF circuits 935, but the wireless communication interlace 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 48. FIG. 48 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 48 via a feeder line that is partially illustrated in the figure as a dashed line. The battery 950 accumulates the electric power supplied from the vehicle.

In the car navigation apparatus 920 illustrated in FIG. 48, one or more components included in the processing unit 140 described above with reference to FIG. 12 (the information acquiring unit 141, the measurement unit 143, and/or the reporting unit 145) may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and/or the processor 921, and one or more of the components above may be mounted in the module. In this case, the module may store a program causing the processor to function as one or more of the components above (that is, a program causing the processor to perform the operation of one or more of the components above) and execute the program. As another example, the program causing the processor to function as one or more of the components above may be installed in the car navigation apparatus 920, and the wireless communication interface 933 (for example, the BB processor 934), and/or the processor 921 may execute the program. As described above, the car navigation apparatus 920 or the module may be provided as an apparatus including one or more of the components above, and the program causing the processor to function as one or more of the components above may be provided. A readable recording medium in which the program is recorded may be provided. For these points, one or more components included in the processing unit 150 described above with reference to FIG. 22 (the information acquiring unit 151, the measurement unit 153, and/or the reporting unit 155), one or more components included in the processing unit 160 described above with reference to FIG. 31 (the information acquiring unit 161, the measurement unit 163, and/or the reporting unit 165), and one or more components included in the processing unit 170 described above with reference to FIG. 41 (the information acquiring unit 171, the measurement unit 173, and/or the reporting unit 175) are the same as one or more of the components above included in the processing unit 140.

In the car navigation apparatus 920 illustrated in FIG. 48, for example, the wireless communication unit 120 described above with reference to FIG. 12 may be mounted in the wireless communication interface 933 (for example, the RF circuit 935). The antenna unit 110 may be mounted in the antenna 937.

Further, the technique according to the present disclosure may be implemented as an in-vehicle system (or a vehicle) 940 including one or more blocks of the above-described car navigation apparatus 920, an in-vehicle network 941 and a vehicle side module 942. That is, the in-vehicle system (or the vehicle) 940 may be provided as an apparatus including one more of the components above included in the processing unit 140 (or the processing unit 150, the processing unit 160 or the processing unit 170). The vehicle side module 942 generates vehicle side data such as vehicle speed, engine speed and failure information and outputs the generated data to the in-vehicle network 961.

8. Conclusion

The communication apparatuses and each process according to the embodiments of the present disclosure have been described above with reference to FIGS. 9 to 48.

According to the first embodiment, measurement of each of one or more frequency bands that are a part of a plurality of frequency bands that are not used by the terminal device 100-1 is performed. The terminal device 100-1 does not perform measurement of each of the remaining frequency bands among the plurality of frequency bands or performs the measurement of each of the remaining frequency bands at a frequency lower than a frequency of the measurements of each of the one or more frequency bands.

According to the second embodiment and the third embodiment, the terminal device 100-2 performs measurement of a first frequency band based on a discovery reference signal transmitted in the first frequency band within a first period included in a measurement gap, and performs measurement of a second frequency band based on a reference signal transmitted in the second frequency band within a second period included in the measurement gap. Specifically, in the second embodiment, the reference signal transmitted in the second frequency band is a DRS. Conversely, specifically, in the third embodiment, the measurement gap is an extended measurement gap.

According to the fourth embodiment, the terminal device 100-4 performs first measurement of each of a plurality of frequency bands and performs second measurement of each of one or more frequency bands that are a part of the plurality of frequency bands. The first measurement is measurement that is performed based on a reference signal transmitted within a period having a first length. The second measurement is measurement that is performed based on a reference signal transmitted within a period having a second length that is greater than the first length.

According to each of the first to fourth embodiments, it is possible to improve measurement performed by the terminal device 100.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while an example in which a communication system supports LTE or LTE-A has been described in embodiments of the present disclosure, the present disclosure is not limited thereto. For example, the communication system may be a system that supports another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, for example, a CPU and a DSP) provided at apparatuses (such as, for example, the terminal device, the base station or the control entity, or the modules thereof) in the present specification function as the above-described apparatuses (in other words, a computer program for making the processor execute operation of the components of the above-described apparatuses). Further, it is also possible to provide a recording medium having the above-described computer program recorded therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of one or more of the components (for example, a measurement unit and/or a reporting unit, or an information acquiring unit and/or the control unit) of the above-described apparatuses is included in the technique according to the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
A device including:
a measurement unit configured to perform measurement of each of one or more frequency bands that are a part of a plurality of frequency bands that are not used by a terminal device,
wherein the measurement unit does not perform measurement of each of remaining frequency bands among the plurality of frequency bands or performs the measurement of each of the remaining frequency bands at a frequency lower than a frequency of the measurements of each of the one or more frequency bands.

(2)
The device according to (1),
wherein the measurement unit does not perform the measurement of each of the remaining frequency bands.

(3)
The device according to (2), further including:
a reporting unit configured to report a result of the measurement of each of the one or more frequency bands to a base station,
wherein the reporting unit substitutes a result of measurement of a first frequency band included in the one or more frequency bands with a result of measurement of a second frequency band included in the remaining frequency bands, and thus reports the result of the measurement of the second frequency band to the base station.

(4)
The device according to (1),
wherein the measurement unit performs the measurement of each of the remaining frequency bands at a frequency lower than the frequency of the measurements of each of the one or more frequency bands.

(5)
The device according to (4),
wherein the measurement unit performs the measurement of each of the remaining frequency bands using fewer measurement gaps than measurement gaps used for the measurement of each of the one or more frequency bands.

(6)
The device according to (5),
wherein the measurement unit skips a part of measurement gaps assigned to each of the remaining frequency bands without measurement.

(7)
The device according to (5),
wherein measurement gaps assigned to each of the remaining frequency bands are fewer than measurement gaps assigned to each of the one or more frequency bands.

(8)
The device according to any one of (1) to (7),
wherein the measurement of each of the one or more frequency bands is measurement based on a reference signal transmitted in each of the one or more frequency bands, and
the measurement of each of the remaining frequency bands is measurement based on a reference signal transmitted in each of the remaining frequency bands.

(9)
The device according to (8),
wherein the reference signal is a cell-specific reference signal.

(10)
The device according to (8),
wherein the reference signal is a discovery reference signal.

(11)
The device according to any one of (1) to (10),
wherein the remaining frequency bands are frequency bands included in the same operating band as the one or more frequency bands.

(12)
The device according to (11),
wherein each of the remaining frequency bands is a frequency band that is adjacent to any frequency band included in the one or more frequency bands.

(13)
The device according to any one of (1) to (12),
wherein each of the plurality of frequency bands is a frequency band that is used by a base station of a small cell.

(14)
A device including:
an acquiring unit configured to acquire information about a plurality of frequency bands that are not used by a terminal device; and
a control unit configured to instruct the terminal device to perform measurement of each of one or more frequency bands that are a part of the plurality of frequency bands, and not to perform measurement of each of remaining frequency bands among the plurality of frequency bands or to perform the measurement of each of the remaining frequency bands at a frequency lower than a frequency of the measurements of each of the one or more frequency bands.

(15)
The device according to (14),
wherein the control unit instructs the terminal device to perform the measurement of each of the one or more frequency bands and not to perform the measurement of each of the remaining frequency bands,
the control unit substitutes a result of measurement of a first frequency band included in the one or more frequency bands with a result of measurement of a second frequency band included in the remaining frequency bands.

(16)
The device according to (14) or (15),
wherein the control unit instructs the terminal device to skip a part of measurement gaps assigned to each of the remaining frequency bands without measurement.

(17)
A device including:
a measurement unit configured to perform measurement of a first frequency band based on a discovery reference signal transmitted in the first frequency band within a first period included in a measurement gap and perform measurement of a second frequency band based on a reference signal transmitted in the second frequency band within a second period included in the measurement gap.

(18)
The device according to (17),
wherein the measurement gap is an extended measurement gap.

(19)
The device according to (18),
wherein the extended measurement gap is a period longer than 6 milliseconds.

(20)
The device according to (18) or (19),
wherein the reference signal transmitted in the second frequency band is a cell-specific reference signal.

(21)
The device according to (20),
wherein the first period is a period shorter than the second period.

(22)
The device according to (17),
wherein the reference signal transmitted in the second frequency band is a discovery reference signal.

(23)
The device according to (22),
wherein the measurement gap is a period having a length of 6 milliseconds.

(24)
The device according to any one of (17) to (23),
wherein the measurement unit performs the measurement of the first frequency band that is used by the same base station based on a discovery reference signal and a cell-specific reference signal transmitted by the same base station in the first frequency band within the first period or performs the measurement of the second frequency band that is used by the same base station based on a discovery reference signal and a cell-specific reference signal transmitted by the same base station in the second frequency band within the second period.

(25)
The device according to (24),
wherein at least one of the first period and the second period is a period shorter than 6 milliseconds.

(26)
The device according to any one of (17) to (25),
wherein the measurement unit performs measurement of a frequency group and measurement of one or more other frequency bands or measurement of one or more other frequency groups based on a priority of the frequency group including the first frequency band and the second frequency band and a priority of the one or more other frequency bands or a priority of the one or more other frequency groups.

(27)
The device according to (26),
wherein the measurement unit performs the measurement of the frequency group and the measurement of the one or more other frequency bands or the measurement of the one or more other frequency groups in consideration of a transmission period in which a discovery reference signal is transmitted in the first frequency band.

(28)
The device according to (27),
wherein the measurement unit performs measurement of another frequency band or another frequency group whose priority is lower than the frequency group before the measurement of the frequency group outside of the transmission period.

(29)
The device according to any one of (17) to (18),
wherein the measurement gap includes an additional period, and
the measurement unit performs measurement of an additional frequency band based on a discovery reference signal transmitted in the additional frequency band within the additional period.

(30)
A device including:
an acquiring unit configured to acquire information indicating a first frequency band in which a discovery reference signal is transmitted within at least a first period included in a measurement gap; and
a control unit configured to notify a terminal device of the first frequency band and the measurement gap.

(31)
The device according to (30),
wherein the measurement gap further includes a second period in which a reference signal is transmitted in a second frequency band.

(32)
The device according to (30) or (31),
wherein the measurement gap is an extended measurement gap.

(33)
The device according to (32),
wherein the measurement gap includes a second period in which a cell-specific reference signal is transmitted in a second frequency band.

(34)
The device according to any one of (30) to (32),
wherein the acquiring unit acquires information indicating a frequency group including the first frequency band and a second frequency band, and
the control unit notifies a terminal device of the frequency group and the measurement gap.

(35)
The device according to (34),
wherein the second frequency band is a frequency band in which a discovery reference signal is transmitted within at least a second period included in the measurement gap.
(36)
The device according to (34) or (35),
wherein the control unit notifies a terminal device of a priority of the frequency group and a priority of one or more other frequency bands or a priority of one or more other frequency groups.
(37)
A device including:
an acquiring unit configured to acquire information about a first frequency band in which a discovery reference signal is transmitted; and
a control unit configured to decide an extended measurement gap including at least a part of a transmission period in which a discovery reference signal is transmitted in the first frequency band.
(38)
The device according to (37),
wherein the control unit controls the transmission period such that at least a part of the transmission period is included in the extended measurement gap.
(39)
The device according to (37),
wherein the information about the first frequency band includes information indicating the transmission period, and
the control unit decides the extended measurement gap based on the transmission period.
(40)
A device including:
an acquiring unit configured to acquire information about two or more frequency bands in which a discovery reference signal is transmitted; and
a control unit configured to decide a frequency group including at least a first frequency band and a second frequency band among the two or more frequency bands,
wherein the first frequency band is a frequency band in which a discovery reference signal is transmitted within at least a first period included in a measurement gap, and
the second frequency band is a frequency band in which a discovery reference signal is transmitted within at least a second period included in the measurement gap.
(41)
The device according to (40),
wherein the control unit controls a transmission period in which a discovery reference signal is transmitted in the first frequency band such that the discovery reference signal is transmitted in the first frequency band within at least the first period, or controls a transmission period in which a discovery reference signal is transmitted in the second frequency band such that the discovery reference signal is transmitted in the second frequency band within at least the second period.
(42)
The device according to (40),
wherein the information about the two or more frequency bands includes information indicating a transmission period in which a discovery reference signal is transmitted in each of the two or more frequency bands, and
the control unit decides the frequency group based on the transmission period.

(43)
A device including:
a measurement unit configured to perform first measurement of each of a plurality of frequency bands and perform second measurement of each of one or more frequency bands that are a part of the plurality of frequency bands,
wherein the first measurement is measurement that is performed based on a reference signal transmitted within a period having a first length, and
the second measurement is measurement that is performed based on a reference signal transmitted within a period having a second length that is greater than the first length.
(44)
The device according to (43),
wherein the one or more frequency bands are frequency bands that are selected from among the plurality of frequency bands based on a result of the first measurement.
(45)
The device according to (44),
wherein the one or more frequency bands are frequency bands the first measurement of which has a more favorable result.
(46)
The device according to any one of (43) to (45),
wherein the device is a terminal device or a module for the terminal device, and
each of the plurality of frequency bands is a frequency band that is not used by the terminal device.
(47)
The device according to (46),
wherein the period having the first length is a period including a measurement gap of a first number, and
the period having the second length is a period including a measurement gap of a second number that is greater than the first number.
(48)
The device according to any one of (43) to (47),
wherein each of the plurality of frequency bands is a frequency band that is used by a base station of a small cell.
(49)
The device according to (48),
wherein the reference signal is a discovery reference signal.
(50)
The device according to any one of (43) to (48),
wherein the reference signal is a cell-specific reference signal.
(51)
The device according to any one of (1) to (13),
wherein the device is the terminal device or a module for the terminal device.
(52)
A method including:
performing, by a processor, measurement of each of one or more frequency bands that are a part of a plurality of frequency bands that are not used by a terminal device; and
not performing, by a processor, measurement of each of remaining frequency bands among the plurality of frequency bands or performing the measurement of each of the remaining frequency bands at a frequency lower than a frequency of the measurements of each of the one or more frequency bands.
(53)
A program for causing a processor to execute:
performing measurement of each of one or more frequency bands that are a part of a plurality of frequency bands that are not used by a terminal device; and not performing measurement of each of remaining frequency bands among the plurality of frequency bands or performing the measurement of each of the remaining frequency bands at a frequency lower than a frequency of the measurements of each of the one or more frequency bands.

(54)

A readable recording medium having a program recorded thereon, the program causing a processor to execute:

performing measurement of each of one or more frequency bands that are a part of a plurality of frequency bands that are not used by a terminal device; and not performing measurement of each of remaining frequency bands among the plurality of frequency bands or performing the measurement of each of the remaining frequency bands at a frequency lower than a frequency of the measurements of each of the one or more frequency bands.

(55)

The device according to any one of (14) to (16), wherein the device is a base station, a base station device for the base station or a module for the base station device.

(56)

A method including:

acquiring information about a plurality of frequency bands that are not used by a terminal device; and instructing, by a processor, the terminal device to perform measurement of each of one or more frequency bands that are a part of the plurality of frequency bands, and not to perform measurement of each of remaining frequency bands among the plurality of frequency bands or to perform the measurement of each of the remaining frequency bands at a frequency lower than a frequency of the measurements of each of the one or more frequency bands.

(57)

A program for causing a processor to execute:

acquiring information about a plurality of frequency bands that are not used by a terminal device; and instructing the terminal device to perform measurement of each of one or more frequency bands that are a part of the plurality of frequency bands, and not to perform measurement of each of remaining frequency bands among the plurality of frequency bands or to perform the measurement of each of the remaining frequency bands at a frequency lower than a frequency of the measurements of each of the one or more frequency bands.

(58)

A readable medium having a program recorded thereon, the program causing a processor to execute:

acquiring information about a plurality of frequency bands that are not used by a terminal device; and instructing the terminal device to perform measurement of each of one or more frequency bands that are a part of the plurality of frequency bands, and not to perform measurement of each of remaining frequency bands among the plurality of frequency bands or to perform the measurement of each of the remaining frequency bands at a frequency lower than a frequency of the measurements of each of the one or more frequency bands.

(59)

The device according to any one of (17) to (29), wherein the device is a terminal device or a module for the terminal device.

(60)

A method including;

performing, by a processor, measurement of a first frequency band based on a discovery reference signal transmitted in the first frequency band within a first period included in a measurement gap; and performing, by a processor, measurement of a second frequency band based on a reference signal transmitted in the second frequency band within a second period included in the measurement gap.

(61)

A program for causing a processor to execute:

performing measurement of a first frequency band based on a discovery reference signal transmitted in the first frequency band within a first period included in a measurement gap; and performing measurement of a second frequency band based on a reference signal transmitted in the second frequency band within a second period included in the measurement gap.

(62)

A readable recording medium having a program recorded thereon, the program causing a processor to execute:

performing measurement of a first frequency band based on a discovery reference signal transmitted in the first frequency band within a first period included in a measurement gap; and performing measurement of a second frequency band based on a reference signal transmittal in the second frequency band within a second period included in the measurement gap.

(63)

The device according to any one of (30) to (36), wherein the device is a base station, a base station device for the base station or a module for the base station device.

(64)

A method including:

acquiring information indicating a first frequency band in which a discovery reference signal is transmitted within at least a first period included in a measurement gap; and notifying, by a processor, a terminal device of the first frequency band and the measurement gap.

(65)

A program for causing a processor to execute:

acquiring information indicating a first frequency band in which a discovery reference signal is transmitted within at least a first period included in a measurement gap; and notifying a terminal device of the first frequency band and the measurement gap.

(66)

A readable recording medium having a program recorded thereon, the program causing a processor to execute;

acquiring information indicating a first frequency band in which a discovery reference signal is transmitted within at least a first period included in a measurement gap; and notifying a terminal device of the first frequency band and the measurement gap.

(67)

The device according to any one of (37) to (39), wherein the device is a server, a module for the server, a base station, a base station device for the base station, or a module for the base station device.

(68)

A method including:

acquiring information about a first frequency band in which a discovery reference signal is transmitted; and deciding, by a processor, an extended measurement gap including at least a part of a transmission period in which a discovery reference signal is transmitted in the first frequency band.

(69)

A program for causing a processor to execute:

acquiring information about a first frequency band in which a discovery reference signal is transmitted; and deciding an extended measurement gap including at least a part of a transmission period in which a discovery reference signal is transmitted in the first frequency band.

(70)

A readable recording medium having a program recorded thereon, the program for causing a processor to execute:

acquiring information about a first frequency band in which a discovery reference signal is transmitted; and deciding an extended measurement gap including at least a part of a transmission period in which a discovery reference signal is transmitted in the first frequency band.

(71)

The device according to any one of (40) to (42), wherein the device is a server, a module for the server, a base station, a base station device for the base station, or a module for the base station device.

(72)

A method including:

acquiring information about two or more frequency bands in which a discovery reference signal is transmitted; and deciding, by a processor, a frequency group including at least a first frequency band and a second frequency band among the two or more frequency bands, wherein the first frequency band is a frequency band in which a discovery reference signal is transmitted within at least a first period included in a measurement gap, and the second frequency band is a frequency band in which a discovery reference signal is transmitted within at least a second period included in the measurement gap.

(73)

A program for causing a processor to execute;

acquiring information about two or more frequency bands in which a discovery reference signal is transmitted; and deciding a frequency group including at least a first frequency band and a second frequency band among the two or more frequency bands, wherein the first frequency band is a frequency band in which a discovery reference signal is transmitted within at least a first period included in a measurement gap, and the second frequency band is a frequency band in which a discovery reference signal is transmitted within at least a second period included in the measurement gap.

(74)

A readable recording medium having a program recorded thereon, the program causing a processor to execute:

acquiring information about two or more frequency bands in which a discovery reference signal is transmitted; and deciding a frequency group including at least a first frequency band and a second frequency band among the two or more frequency bands, wherein the first frequency band is a frequency band in which a discovery reference signal is transmitted within at least a first period included in a measurement gap, and the second frequency band is a frequency band in which a discovery reference signal is transmitted within at least a second period included in the measurement gap.

(75)

The device according to any one of (43) to (50), wherein the device is a terminal device or a module for the terminal device.

(76)

A method including:

performing, by a processor, first measurement of each of a plurality of frequency bands; and performing, by a processor, second measurement of each of one or more frequency bands that are a part of the plurality of frequency bands, wherein the first measurement is measurement that is performed based on a reference signal transmitted within a period having a first length, and the second measurement is measurement that is performed based on a reference signal transmitted within a period having a second length that is greater than the first length.

(77)

A program for causing a processor to execute:

performing first measurement of each of a plurality of frequency bands; and performing second measurement of each of one or more frequency bands that are a part of the plurality of frequency bands, wherein the first measurement is measurement that is performed based on a reference signal transmitted within a period having a first length, and the second measurement is measurement that is performed based on a reference signal transmitted within a period having a second length that is greater than the first length.

(78)

A readable recording medium having a program recorded thereon, the program causing a processor to execute:

performing first measurement of each of a plurality of frequency bands; and performing second measurement of each of one or more frequency bands that are a part of the plurality of frequency bands, wherein the first measurement is measurement that is performed based on a reference signal transmitted within a period having a first length, and the second measurement is measurement that is performed based on a reference signal transmitted within a period having a second length that is greater than the first length.

REFERENCE SIGNS LIST 1 communication system
100 terminal device
143, 153, 163, 173 measurement unit
145, 155, 165, 175 reporting unit
200 base station
251, 261, 271 information acquiring unit
253, 263, 273 control unit
300 control entity
331, 341 information acquiring unit
333, 343 control unit

The invention claimed is:

1. A base station, comprising:

processing circuitry configured to send, to a device, frequency group information on a frequency group including a first frequency band and a second frequency band, and measurement gap information on a measurement gap including a first period and a second period, the first period and the second, period not overlapping in a time direction, wherein the device is configured to perform, based on the received frequency group information and the received measurement gap information, measurement of the first frequency band based on a first discovery reference signal transmitted in the first frequency band within the first period included in the measurement gap, wherein the device is configured to perform, based on the received frequency group information and the received measurement gap information, measurement of the second frequency band based on a second discovery reference signal transmitted in the second frequency band within the second period included in the measurement gap, and receive, from the device, a result of the measurements of the first and second frequency bands.

2. The base station of claim 1, wherein the measurement gap is an extended measurement gap.

3. The base station of claim 1, wherein the measurement of the first frequency band that is used by the base station is performed by the device based on a discovery reference signal and a cell-specific reference signal transmitted by the base station in the first frequency band within the first period, or the measurement of the second frequency band that is used by the base station is performed by the device based on a discovery reference signal and a cell-specific reference signal transmitted by the base station in the second frequency band within the second period.

4. The base station of claim 1, wherein at least one of the first period and the second period is a period shorter than 6 milliseconds.

5. The base station of claim 1, wherein measurement of a frequency group and measurement of one or more other frequency bands or measurement of one or more other frequency groups is performed by the device based on a priority of the frequency group including the first frequency band and the second frequency band and a priority of the one or more other frequency bands or a priority of the one or more other frequency groups.

6. The base station of claim 1, wherein the measurement gap includes an additional period, and measurement of an additional frequency band is performed by the device based on a discovery reference signal transmitted in the additional frequency band within the additional period.

7. The base station of claim 1, wherein the first period includes a plurality of first subframes and the second period includes a plurality of second subframes, the first subframes and the second subframes not overlapping in the time direction.

8. The base station of claim 1, wherein the frequency group information and measurement gap information are transmitted from a control entity to the base station in a case it is determined that two or more frequency bands in which a discovery reference signal is transmitted exist.

9. The base station of claim 1, wherein the processing circuitry is configured to transmit a radio resource control connection reconfiguration message including a measurement configuration to the device.

10. The base station of claim 1, wherein the processing circuitry is configured acquire information about a plurality of frequency bands that are not used by the device.

* * * * *